(12) United States Patent
Fujimoto et al.

(10) Patent No.: US 12,447,400 B2
(45) Date of Patent: Oct. 21, 2025

(54) SYSTEM, IDENTIFICATION DEVICE, AND IDENTIFICATION METHOD

(71) Applicant: KONAMI DIGITAL ENTERTAINMENT CO., LTD., Tokyo (JP)

(72) Inventors: Yutaka Fujimoto, Tokyo (JP); Naoya Kihara, Tokyo (JP); Michio Horikiri, Tokyo (JP); Masafumi Okuta, Tokyo (JP); Takahiro Yoshida, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 1094 days.

(21) Appl. No.: 17/411,052

(22) Filed: Aug. 24, 2021

(65) Prior Publication Data

US 2021/0379483 A1     Dec. 9, 2021

Related U.S. Application Data

(63) Continuation of application No. PCT/JP2020/007832, filed on Feb. 26, 2020.

(30) Foreign Application Priority Data

Feb. 26, 2019  (JP) ................................. 2019-033172
Feb. 26, 2019  (JP) ................................. 2019-033173
(Continued)

(51) Int. Cl.
A63F 9/24     (2006.01)
A63F 1/06     (2006.01)
(Continued)

(52) U.S. Cl.
CPC ................ *A63F 9/24* (2013.01); *A63F 1/062* (2013.01); *A63F 1/067* (2013.01); *A63F 1/18* (2013.01);
(Continued)

(58) Field of Classification Search
None
See application file for complete search history.

(56) References Cited

U.S. PATENT DOCUMENTS

2006/0054679 A1*   3/2006   Ruping ................... A63F 13/00
                                                          235/375
2009/0115879 A1    5/2009   Nagata et al.
(Continued)

FOREIGN PATENT DOCUMENTS

CN     101155259 A     4/2008
JP     2002-239207 A   8/2002
(Continued)

OTHER PUBLICATIONS

Espacenet, Patent Translate JP2008125972A, 2025, https://translationportal.epo.org/emtp/translate/?ACTION=description-retrieval&COUNTRY=JP&ENGINE=google&FORMAT=docdb&KIND=A&LOCALE=en_EP&NUMBER=2008125972&OPS=ops.epo.org/3.2&SRCLANG=ja&TRGLANG=en , pp. 1-10 (Year: 2025).*

(Continued)

*Primary Examiner* — Tramar Harper
(74) *Attorney, Agent, or Firm* — HEA LAW PLLC

(57) ABSTRACT

At least one memory device of the game system that stores a plurality of instructions, which when executed by the at least one processor, cause the at least one processor to: capture a surface on which an item is placed, read information stored in an IC tag provided to the item, and identify a type and a state of the item placed on the surface based on (Continued)

the captured image of the surface and a read result of the information.

12 Claims, 42 Drawing Sheets

(30) Foreign Application Priority Data

Feb. 26, 2019 (JP) .................................. 2019-033174
Feb. 26, 2019 (JP) .................................. 2019-033175

(51) Int. Cl.
*A63F 1/18* (2006.01)
*G06T 7/70* (2017.01)
(52) U.S. Cl.
CPC ........ *G06T 7/70* (2017.01); *A63F 2009/2425* (2013.01); *A63F 2009/2429* (2013.01); *A63F 2009/2435* (2013.01); *A63F 2009/2457* (2013.01)

(56) References Cited

U.S. PATENT DOCUMENTS

| | | | | |
|---|---|---|---|---|
| 2013/0331182 | A1* | 12/2013 | Tanzawa | ............. A63F 13/2145 463/31 |
| 2015/0290545 | A1* | 10/2015 | Barney | .................... A63F 13/21 463/31 |
| 2016/0287998 | A1* | 10/2016 | Kawanabe | .............. A63F 13/20 |
| 2017/0096270 | A1* | 4/2017 | Jauregui | .................... A63F 1/10 |
| 2017/0302897 | A1* | 10/2017 | Kuji | ...................... G06F 3/0488 |
| 2018/0256971 | A1* | 9/2018 | Tsuda | .................... G06F 3/0488 |
| 2019/0168113 | A1* | 6/2019 | Miyazaki | ................. A63F 13/20 |
| 2019/0168117 | A1* | 6/2019 | Miyazaki | ................. A63F 13/20 |

FOREIGN PATENT DOCUMENTS

| | | | | |
|---|---|---|---|---|
| JP | 2006311965 A | | 11/2006 | |
| JP | 2007061340 A | * | 3/2007 | |
| JP | 2007130453 A | | 5/2007 | |
| JP | 2007-229259 A | | 9/2007 | |
| JP | 2008018186 A | * | 1/2008 | |
| JP | 2008-073256 A | | 4/2008 | |
| JP | 2008125972 A | * | 6/2008 | |
| JP | 2008178499 A | * | 8/2008 | |
| JP | 2009297303 A | * | 12/2009 | ......... A63F 13/2145 |
| JP | 2010-259854 A | | 11/2010 | |
| JP | 2012170515 A | * | 9/2012 | |
| JP | 2015092205 A | * | 5/2015 | |
| JP | 2017023177 A | * | 2/2017 | ............... A63F 1/02 |
| JP | 2017176750 A | | 10/2017 | |
| JP | 2017225851 A | | 12/2017 | |
| JP | 2018167054 A | | 11/2018 | |
| JP | 2018175635 A | | 11/2018 | |
| KR | 10-2009-0007799 A | | 1/2009 | |
| WO | WO-2006081176 A2 | * | 8/2006 | ............... A63F 1/00 |

OTHER PUBLICATIONS

Office Action of Apr. 10, 2024, for corresponding CN Patent Application No. 202080016148.8 with English translation, pp. 1-27.
International Search Report for PCT/JP2020/007832 dated May 12, 2020 with English translation pp. 1-7.
Written Opinion of The International Searching Authority (PCT/ISA/237) with PCT/IB/338 and PCT/IB/373 for PCT/JP2020/007832, dated Sep. 10, 2021, pp. 1-7.
Office Action dated Feb. 4, 2020 for relating JP Patent Application No. 2019-033173 with English translation pp. 1-7.
Office Action dated Aug. 6, 2019 for relating JP Patent Application No. 2019-033174 with English translation pp. 1-5.
Office Action dated Dec. 10, 2019 for relating JP Patent Application No. 2019-033174 with English translation pp. 1-7.
Decision of Refusal dated Apr. 21, 2020 for relating JP Patent Application No. 2019-033174 with English translation pp. 1-7.
Office Action of Jul. 12, 2023, for corresponding KR Patent Application No. 10-2021-7027294 with translation, pp. 1-22.

* cited by examiner

FIG.11

| CARD ID | TAG ID |
|---|---|
| ST17-JP001 | T1 |
| ... | ... |

| AREA ID | ORIENTATION FLAG | SIDE FLAG |
|---|---|---|
| A1 | 0 (VERTICAL) | 1 (BACK) |
| A2 | Null | Null |
| A3 | Null | Null |
| A4 | Null | Null |
| A5 | Null | Null |
| A6 | Null | Null |
| A7 | 0 (VERTICAL) | 1 (BACK) |
| ... | ... | ... |
| A10 | 1 (HORIZONTAL) | 1 (BACK) |
| A11 | Null | Null |
| A12 | 0 (VERTICAL) | 0 (FRONT) |
| ... | ... | ... |

| READER ID | CARD ID |
|---|---|
| R1 | ST17-JP004, --- |
| R2 | Null |
| R3 | Null |
| R4 | Null |
| R5 | Null |
| R6 | Null |
| R7 | ST17-JP005, --- |
| ... | ... |
| R10 | ST17-JP001 |
| R11 | Null |
| R12 | ST17-JP002 |
| ... | ... |

| ZONE ID | CARD ID | ORIENTATION FLAG | SIDE FLAG |
|---|---|---|---|
| Z1 | ST17-JP004, --- | 0 (VERTICAL) | 1 (BACK) |
| Z2 | Null | Null | Null |
| Z3 | Null | Null | Null |
| Z4 | Null | Null | Null |
| Z5 | Null | Null | Null |
| Z6 | Null | Null | Null |
| Z7 | ST17-JP005, --- | 0 (VERTICAL) | 1 (BACK) |
| ... | ... | ... | ... |
| Z10 | ST17-JP001 | 1 (HORIZONTAL) | 1 (BACK) |
| Z11 | Null | Null | Null |
| Z12 | ST17-JP002 | 0 (VERTICAL) | 0 (FRONT) |
| ... | ... | ... | ... |

| AREA ID | SIDE FLAG |
|---|---|
| A1 | 1 (BACK) |
| A2 | Null |
| A3 | Null |
| A4 | Null |
| A5 | Null |
| A6 | Null |
| A7 | 1 (BACK) |
| ... | ... |
| A10 | 1 (BACK) |
| A11 | Null |
| A12 | 0 (FRONT) |
| ... | ... |

| ZONE ID | CARD ID | ORIENTATION FLAG |
|---|---|---|
| Z1 | ST17-JP004, ---- | 0 (VERTICAL) |
| Z2 | Null | Null |
| Z3 | Null | Null |
| Z4 | Null | Null |
| Z5 | Null | Null |
| Z6 | Null | Null |
| Z7 | ST17-JP005, ---- | 0 (VERTICAL) |
| ... | ... | ... |
| Z10 | ST17-JP001 | 1 (HORIZONTAL) |
| Z11 | Null | Null |
| Z12 | ST17-JP002 | 0 (VERTICAL) |
| ... | ... | ... |

| CARD ID | TAG ID | |
|---|---|---|
| | FACE UP | FACE DOWN |
| ST17-JP001 | T2 | T1 |
| ... | ... | ... |

| AREA ID | ORIENTATION FLAG |
|---|---|
| A1 | 0 (VERTICAL) |
| A2 | Null |
| A3 | Null |
| A4 | Null |
| A5 | Null |
| A6 | Null |
| A7 | 0 (VERTICAL) |
| ... | ... |
| A10 | 1 (HORIZONTAL) |
| A11 | Null |
| A12 | 0 (VERTICAL) |
| ... | ... |

| READER ID | CARD ID | SIDE FLAG |
|---|---|---|
| R1 | ST17-JP004 | 1 (BACK) |
| R2 | Null | Null |
| R3 | Null | Null |
| R4 | Null | Null |
| R5 | Null | Null |
| R6 | Null | Null |
| R7 | ST17-JP005 | 1 (BACK) |
| ... | ... | ... |
| R10 | ST17-JP001 | 1 (BACK) |
| R11 | Null | Null |
| R12 | ST17-JP002 | 0 (FRONT) |
| ... | ... | ... |

| CARD ID | SLEEVE ID |
|---|---|
| ST17-JP001 | V1 |
| ... | ... |

| AREA ID | CARD ID |
|---|---|
| A1 | ST17-JP055 |
| A2 | Null |
| A3 | Null |
| A4 | Null |
| A5 | Null |
| A6 | Null |
| A7 | ST17-JP035 |
| ... | ... |
| A10 | ST17-JP001 |
| A11 | Null |
| A12 | ST17-JP002 |
| ... | ... |

D3C

SYSTEM, IDENTIFICATION DEVICE, AND IDENTIFICATION METHOD

CROSS-REFERENCE TO RELATED APPLICATION

This application is a continuation application of International Application PCT/JP2020/007832 filed on Feb. 26, 2020, which claims priority from Japanese applications JP 2019-033172, 2019-033173, 2019-033174, and 2019-033175 filed on Feb. 26, 2019, the content of these applications are incorporated herein by reference in their entirety.

1. FIELD OF THE INVENTION

The present invention relates to an identification system, an identification device, an information storage medium, and an identification method for identifying a type and a state of an item placed on a surface in a game that is performed by using the item placed on the surface; a display control system, a display control device, an information storage medium; and a display control method for controlling display means to display a display relating to the item on the display means, a case for housing a playing medium that is placed on a surface and used in a game that is performed by using the playing medium placed on the surface, and a physical object housed in the case together with the playing medium.

2. DESCRIPTION OF THE RELATED ART

There are known games that are played using real items placed on a surface set in the real world. One example of such a game is known as a card game in which two players play against each other by placing real cards on a game field. For example, a card game similar to the card game described in Patent Literature 1 is played on a game field in the real world using real cards (JP2018-175635A).

SUMMARY OF THE INVENTION

Such a card game as described above are desired to be watched by people other than the players. In order to allow more people or people at a distance to watch the game, a system that displays an image showing the current status of the game field on the display unit for spectators may be considered. Another possible configuration of such a system is that the system identifies the type and status (e.g., position, orientation, front and back sides) of the cards placed on the game field, and displays an image of the current situation on the display unit for spectators based on the result of such identification. In this case, the methods by the system to identify the type and state of the cards placed in the game field may include installing a capturing unit to capture the game field, and identifying the type and state of the cards placed in the game field from the images captured by the capturing unit.

[First Theme]

There are matters that cannot be identified (or are difficult to identify) from the captured image. For example, with the captured image, while it is relatively easy to identify the position and orientation of the card, it may be impossible (or difficult) to identify the type of the card.

For example, cards used in card games generally have text and patterns corresponding to the type of card on the front side, and have common text and patterns that do not depend on the type of the card on the back side. In card games, cards may be placed face down on the game field by rule. In such a case, the surface of the card does not appear in the captured image, and thus the type of card cannot be identified from the captured image.

For example, it may be difficult to identify the type and state of the cards placed on the game field from the captured image due to factors such as environment light. Some types of cards used in card games are applied with special processing (e.g., holograms), and it is difficult to identify the type and condition of such cards from the captured image.

[Second Theme]

The cards used in card games generally have text and patterns corresponding to the type of card on the front side, and have common text and patterns that do not depend on the type of the card on the back side. In a card game, cards are sometimes placed face down on the game field by a player by rule. In such a case, if a spectator wants to know the type of the card placed face down (the description on the front side), it is not possible for the spectator to know the type of the card until the card is turned face up as well as for the opponent player. As such, the spectator may feel that the game is not sufficiently entertaining.

[Third Theme]

The methods by the system to identify the type or state of the cards placed in the game field may include installing a capturing unit to capture the game field, and identifying the type or state of the cards placed in the game field from the images captured by the capturing unit. However, it may be impossible (or difficult) to identify the type or state of the card placed on the game field from the captured image.

For example, in general, a card used in a card game has a front side having an appearance corresponding to the card type and a back side having a common appearance independent of the card type. As such, when identifying the type of the card placed in the game field from the captured image, the card type is identified from the front side of the card in the captured image. However, cards may be placed face down on the game field according to the rule of the card game. In such a case, the front side of the card does not appear in the captured image, and thus the type of card cannot be identified from the captured image.

For example, it may be difficult to identify the type and state of the cards placed on the game field from the captured image due to factors such as environment light. Some types of cards used in card games are applied with special processing (e.g., holograms), and it is difficult to identify the type and condition of such cards from the captured image.

In order to identify (or to easily identify) the type and state of the card placed in the game field, a special function for this purpose may be provided to the card. In this case, however, problems may arise in that existing cards (cards without the special function) cannot be used in the game, for example.

One or more embodiments of the present invention have been conceived in view of the first theme, and an object thereof is to provide an identification system, an identification device, a program, and an identification method capable of identifying (or facilitating identifying) a type and a state of an actual item placed on a surface in the real world.

One or more embodiments of the present invention have been conceived in view of the second theme, and an object thereof is to provide a display control system, a display control device, a program, and a display control method for improving entertainment of viewing a game that is performed by using an actual item placed on a surface in the real world as a spectator, for example.

One or more embodiments of the present invention have been conceived in view of the third theme, and an object thereof is to provide a case and a physical object for allowing an existing playing medium to be used in a game and identifying (or facilitating identifying) a type and a state of a playing medium placed on a surface in the real world.

In order to meet the above described first theme, an identification system according to an aspect of the present invention is for identifying a type and a state of an item placed on a surface in a game that is performed by using the item placed on the surface, and includes at least one processor, and at least one memory device that stores a plurality of instructions, which when executed by the at least one processor, cause the at least one processor to capture the surface on which the item is placed, read information stored in an IC tag provided to the item, and identify the type and the state of the item placed on the surface based on a captured image of the surface and a read result of the information.

An identification device according to an aspect of the present invention identifies a type and a state of an item placed on a surface in a game that is performed by using the item placed on the surface, and includes at least one processor and at least one memory device that stores a plurality of instructions, which when executed by the at least one processor, cause the at least one processor to obtain a captured image of capturing means that captures the surface on which the item is placed; obtain a read result of a reading unit that reads information stored in an IC tag provided to the item; and identify a type and a state of the item placed on the surface based on the captured image of the capturing means and the read result of the reading unit.

An identification method according to an aspect of the present invention for identifying a type and a state of an item placed on a surface in a game that is performed by using the item placed on the surface includes obtaining a captured image of capturing means that captures the surface on which the item is placed, obtaining a read result of a reading unit that reads information stored in an IC tag provided to the item, and identifying a type and a state of the item placed on the surface based on the captured image of the capturing means and the read result of the reading unit.

In order to meet the above described second theme, a display control system according to an aspect of the present invention controls display means to display a display relating to an item placed on a surface in a game that is performed by using the item placed on the surface, wherein the item includes a description surface on which information is described, and a holder that holds identifying information for identifying the information described on the description surface, the display control system includes at least one processor, and at least one memory device that stores a plurality of instructions, which when executed by the at least one processor, cause the at least one processor to read the identifying information held in the holder of the item placed on the surface, identify the information described on the description surface of the item placed on the surface based on the read identifying information, and in a case where the item is placed on the surface such that the description surface faces the surface, display, on the display means, a display according to the identified information described on the description surface of the item.

A display control device according to an aspect of the present invention controls display means to display a display relating to an item placed on a surface in a game that is performed by using the item placed on the surface, wherein the item includes a description surface on which information is described, and a holder that holds identifying information for identifying the information described on the description surface, the display control device includes at least one processor, and at least one memory device that stores a plurality of instructions, which when executed by the at least one processor, cause the at least one processor to obtain a read result of a reading unit that reads the identifying information held in the holder of the item placed on the surface, identify the information described on the description surface of the item placed on the surface based on the read identifying information, and in a case where the item is placed on the surface such that the description surface faces the surface, display, on the display means, a display according to the identified information described on the description surface of the item.

A display control method according to an aspect of the present invention controls display means to display a display relating to an item placed on a surface in a game that is performed by using the item placed on the surface, wherein the item includes a description surface on which information is described, and a holder that holds identifying information for identifying the information described on the description surface, the display control method includes obtaining a read result of a reading unit that reads the identifying information held in the holder of the item placed on the surface, identifying the information described on the description surface of the item placed on the surface based on the identifying information read by the reading unit, and in a case where the item is placed on the surface such that the description surface faces the surface, displaying, on the display means, a display according to the information that is identified in the identifying step and described on the description surface of the item.

In order to meet the above described third theme, a case according to an aspect of the present invention is for housing a playing medium placed on a surface and used in a game that is performed by using the playing medium placed on the surface, the case comprising an IC tag for holding identifying information for identifying a type or a state of the playing medium that is housed in the case and placed on the surface.

A physical object according to an aspect of the present invention is housed in a case together with a playing medium placed on surface and used in a game that is performed by using the playing medium placed on the surface. The physical object includes an IC tag for holding identifying information for identifying a type or a state of the playing medium that is housed in the case and placed on the surface.

Further, in order to meet the above described third theme, a case according to an aspect of the present invention is for housing a playing medium used in a game that is performed by using the playing medium placed on a surface, and includes a first surface portion, a second surface portion that is different from the first surface portion, a first holder that is provided to the first surface portion and holds first identifying information for identifying a type or a state of the playing medium housed in the case, and a second holder that is provided to the second surface portion and holds second identifying information for identifying a type or a state of the playing medium housed in the case, wherein in a case where the playing medium housed in the case is placed on the surface such that the first surface portion is in contact with the surface, a reading unit can read the second identifying information held in the second holder of the second surface portion, and in a case where the playing medium housed in the case is placed on the surface such that the second surface portion is in contact with the surface, the reading unit can read the first identifying information held in the first holder of the first surface portion.

A case according to an aspect of the present invention is for housing a playing medium placed on a surface and used in a game that is performed by using the playing medium placed on the surface, wherein the playing medium includes a face having an appearance according to a type of the playing medium. The case includes a first surface portion that faces the face when the playing medium is housed in the case, and is configured such that the face of the playing medium housed in the case is visible from outside the case through the first surface portion, a second surface portion that is different from the first surface portion, and a holder that is provided to the second surface portion and holds identifying information for identifying a type or a state of the playing medium housed in the case, wherein in a case where the playing medium housed in the case is placed on the surface such that the first surface portion is in contact with the surface, a reading unit can read the identifying information held in the holder of the second surface portion.

BRIEF DESCRIPTION OF THE DRAWINGS

FIG. 11 is a diagram showing an example of the association data;

FIG. 15 is a diagram illustrating an example of first identification result data;

FIG. 16 is a diagram illustrating an example of second identification result data;

FIG. 17 is a diagram illustrating an example of game field status data;

FIG. 26 is a diagram illustrating an example of first identification result data according to the second embodiment;

FIG. 27 is a diagram illustrating an example of second identification result data according to the second embodiment;

FIG. 31 is a flow chart showing an example of association data according to the third embodiment;

FIG. 33 is a diagram illustrating an example of first identification result data according to the third embodiment;

FIG. 34 is a diagram illustrating an example of second identification result data according to the third embodiment;

FIG. 39 is a flow chart showing an example of association data according to the fourth embodiment;

FIG. 41 is a diagram illustrating an example of second identification result data according to the fourth embodiment.

DETAILED DESCRIPTION OF THE INVENTION

[1. First embodiment] The system according to the first embodiment of the present invention will be described.

Figure 1:
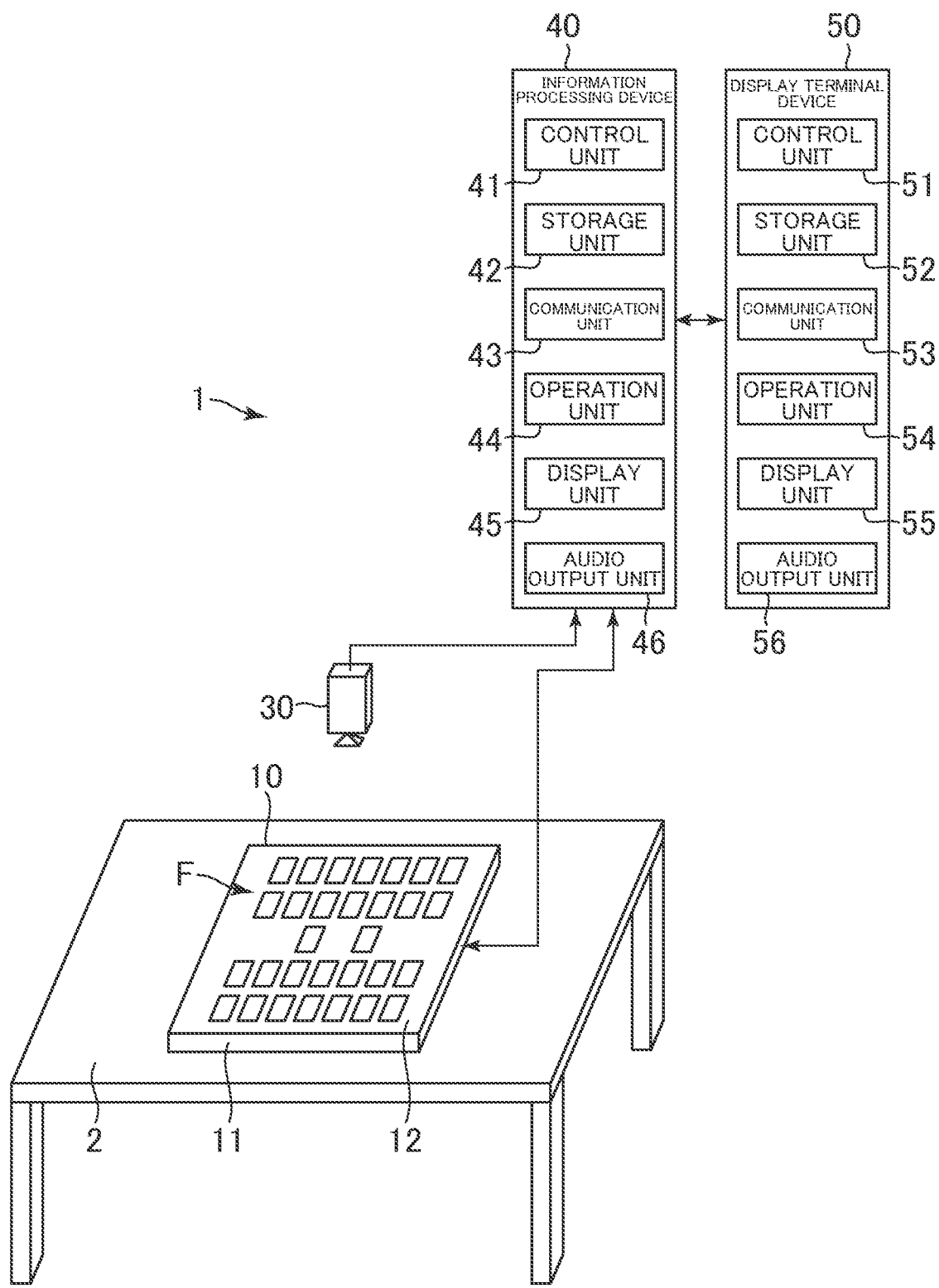
FIG. 1 shows an example of a configuration of a system according to an embodiment of the present invention.

FIG. 1 shows an example of the configuration of the system 1 according to the first embodiment. The system 1 relates to a game played with real items placed on a surface set in the real world. As described below, the system 1 includes functions as an identification system to identify a type and state of the item placed on the surface in the game. The system 1 also includes functions as a display control system that displays the item placed on the surface in the game on display means.

For example, a card game played with cards is an example of a "game played with items placed on a surface." In the following, the system 1 according to the first embodiment will be explained using an example of a competitive card game (trading card game) in which a player sets up a deck by freely combining cards from among the player's cards in accordance with predetermined rules, and plays against other players using the deck.

[1-1. Overview of card game] Before discussing the configuration of the system 1, an overview of the card game will be described.

Figure 2A:
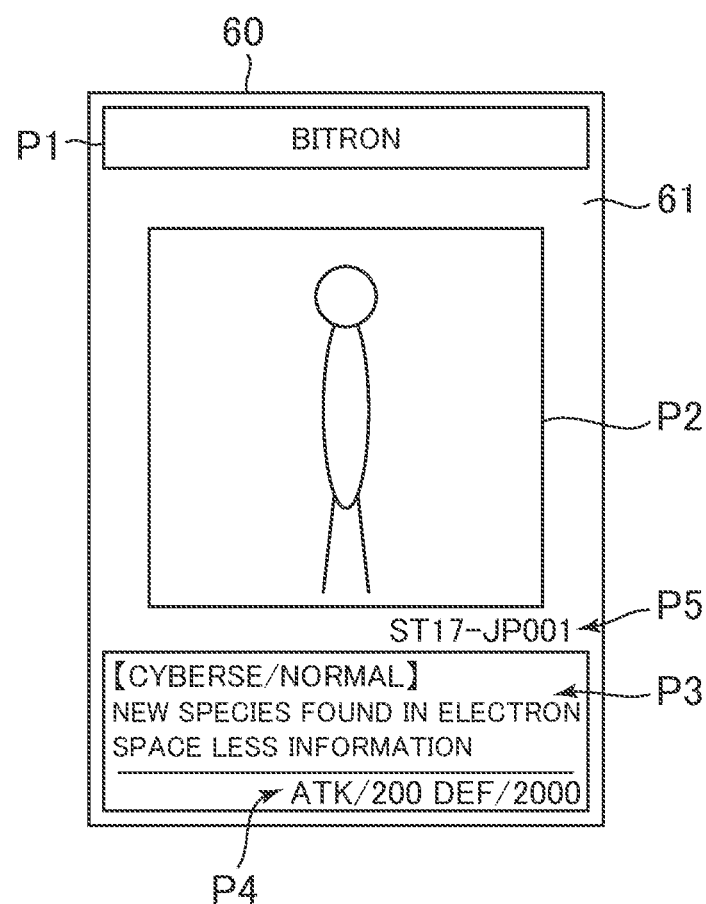
FIG. 2A is a diagram illustrating an example of an appearance of a front side of a card.
Figure 2B:
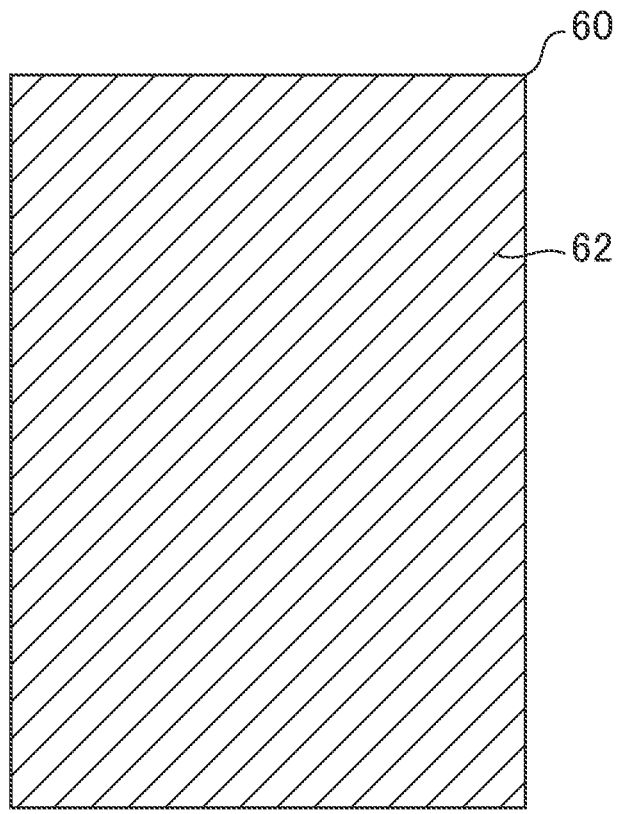
FIG. 2B is a diagram illustrating an example of an appearance of a back side of a card.

FIGS. 2A and 2B show an example of a card used in the card game. A card 60 is a rectangular-shaped object and made of a material such as paper.

FIG. 2A shows an example of appearance of a front side 61 of the card 60. FIG. 2A shows a character card, which shows a character, as an example of the card 60.

As shown in FIG. 2A, the front side 61 of the card 60 contains information about the card 60. FIG. 2A shows the character card, and thus information about the characters is described on the front side 61. For example, the front side 61 includes parts P1, P2, P3, P4, and P5. The part P1 indicates a name of the card 60 (character). The part P2 is an image of the character. The part P3 shows a description of the character. The part P4 shows the character's attack power (ATK) and defense power (DEF). The part P5 shows a card ID. The card ID is information for identifying an individual card type. For example, the appearance (e.g., design, text) of the front side 61 of the card 60 is different for each card type. The cards 60 having the same appearance of the front side 61 have the same card ID, and cards 60 having the different appearances of the front side 61 have the different card IDs. For example, the card IDs of the cards 60 indicating different characters are different. If there is only one type of cards 60 indicating the same name character, the cards 60 indicating the same character have the same card ID. On the other hand, if there are multiple types of cards 60 with different front side 61 appearances indicating the same character, the card IDs of the multiple types of cards are different. For example, if there are multiple types of cards 60 that represent the same character name but with different rarities or ranks, the card IDs of the multiple types of cards 60 are different.

In FIG. 2A, an example of the character card is shown as an example of the card 60 used in the card game, although a card 60 indicating other than a character is also used in the card game. For example, a magic card indicating magic or a trap card indicating a trap is used. Similarly to the character card, the front side 61 of the magic card or the trap card contains information about the magic or the trap.

FIG. 2B shows an example of an appearance of a back side 62 of the card 60. The back side 62 of the card 60 has a common appearance for all cards used in the card game. In other words, the back side 62 of the card has a common appearance for all cards regardless of the type of card 60. This makes it impossible to identify the type of the card 60 from the appearance of the back side 62.

Figure 3:
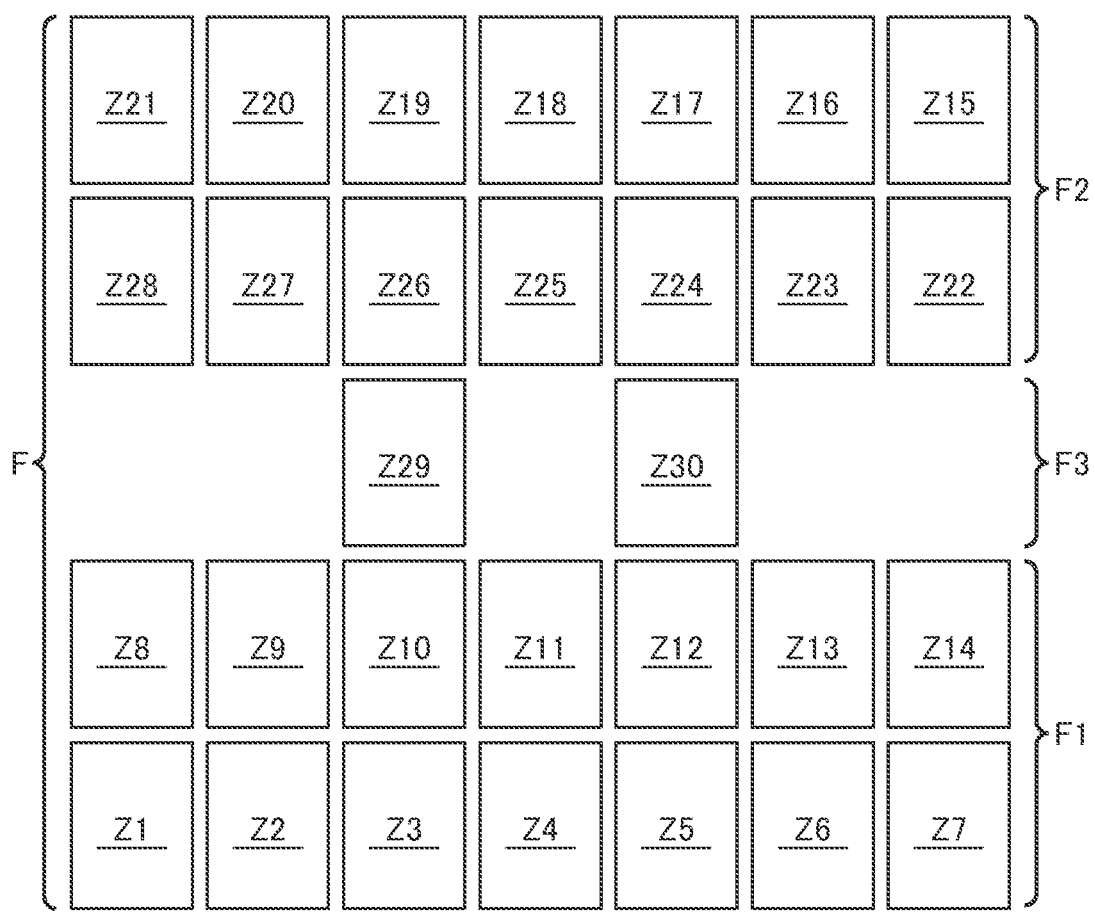
FIG. 3 is a diagram illustrating an example of a game field.

The card game progresses as a first player and a second player competing in the game place the cards 60 on the game field. FIG. 3 shows an example of a game field F. As shown in FIG. 3, the game field F includes a first player field F1, a second player field F2, and a shared field F3.

The first player field F1 is an area for placing the first player's card 60. The first player field F1 contains multiple zones Z1 to Z14.

For example, zone Z7 is an area for placing the first player's deck as a draw deck. Here, "deck" means a set of cards 60 combined by the player freely from the player's cards 60 when playing the card game according to the predetermined rules, and "draw deck" means a deck that are shuffled and placed face down. The first player can draw a card from the draw deck placed in the zone Z7 and add it to his or her hand.

The zones Z2 to Z6 and Z8 to Z13 are areas for the first player to place any card 60 selected from his or her hand.

For example, the zones Z9 to Z13 are areas for the first player to place character cards from his or her hand. The first player puts character cards from his or her hand in the zones Z9 to Z13, thereby setting the characters to be used for a battle (attack etc.).

For example, the zones Z2 to Z6 and Z8 are areas for the first player to place magic or trap cards from his or her hand. The first player can generate magic or trap effect in the card game by placing the magic or trap card in zones Z2 to Z6 and Z8 from his or her hand.

For example, the zone Z14 is an area for placing character cards of defeated characters and used magic or trap cards. The zone Z1 is an area for placing a set of special cards 60 that can be placed in zones Z29 and Z30 in the shared field F3. The first player can place a card 60, which is from the set of special cards 60 in the zone Z1, in the zone Z29 or the Z30 under predetermined conditions.

The second player field F2 is an area for placing the second player's card 60. The second player field F2 contains multiple zones Z15 to Z28. The meanings and roles of the zones Z15 to Z28 are the same as those of the zones Z1 to Z14 in the first player field F1, and their descriptions are thus omitted.

The shared field F3 is an area shared between the first and second players. The shared field F3 contains zones Z29 and Z30, and both the first and second players can place cards 60 in the zones Z29 and Z30 under predetermined conditions.

In the following, when it is not necessary to distinguish the zones Z1 to Z30, they are collectively referred to as "zone Z."

The card game is played by turns. That is, the first player's turn and the second player's turn are played alternately and repeatedly in the card game.

In the first player's turn, the first player draws a card from the set of the cards 60 placed in the zone Z7 (the first player's draw deck) and adds the drawn card to his or her hand. Under the predetermined conditions, the first player puts any card 60 from his hand to the zones Z2 to Z6 and Z8 to Z13, or puts any card 60, which is selected from the set of special cards 60 placed in the zone Z1, to the zones Z29 and Z30, and uses his or her cards 60 placed in the game field F to attack the second player.

Similarly, in the second player's turn, the second player draws a card from the set of the cards 60 placed in the zone Z21 (the second player's draw deck) and adds the drawn card to his or her hand. Under the predetermined conditions, the second player puts any card 60 from his or her hand to the zones Z16 to Z20 and Z22 to Z27, or puts any card 60, which is selected from the set of special cards 60 placed in the zone Z15, to the zones Z29 and Z30, and uses his or her cards 60 placed in the game field F to attack the first player.

In the card game, a plurality of types of card placement formats are determined, and whether the card effects the progress or result of the card game or content of the effect depends on the placement format.

Figure 4:
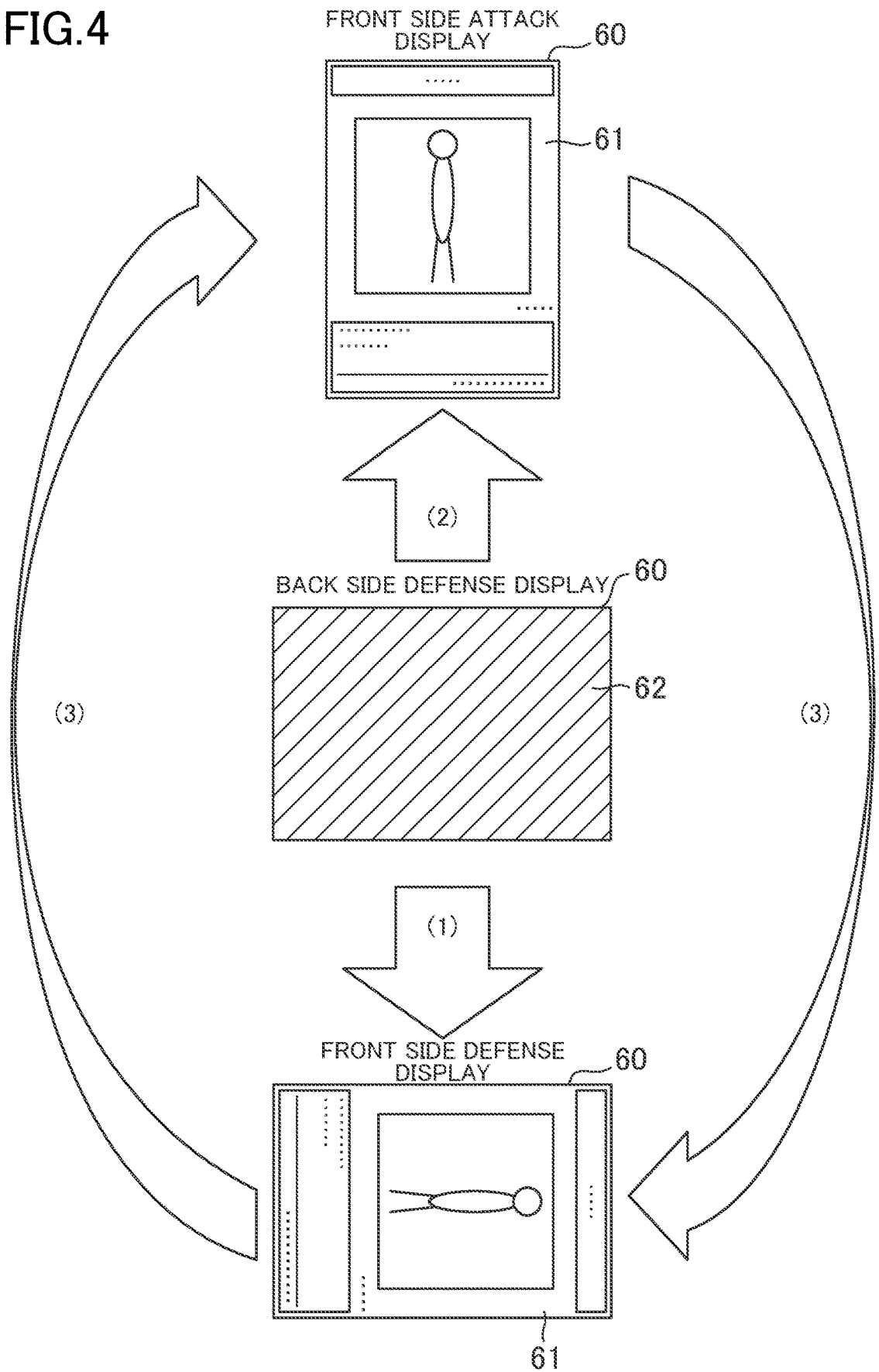
FIG. 4 is a diagram showing an example of a placement format of character cards.

FIG. 4 is a diagram showing the placement format of character cards. As shown in FIG. 4, the card game specifies three placement formats for character cards: front side attack display, back side defense display, and front side defense display.

The "front side attack display" is the state in which the character card is placed face up and vertically. "Face up"

means that the card is placed so that the player can see the front side 61 of the card 60. In other words, "face up" is the state in which the card is placed so that the back side 62 of the card is facing the game field F. "Placed vertically" is a state in which the card 60 is placed to be vertically long as viewed from the player. In other words, "placed vertically" means that the card 60 is placed in such a way that the long side direction of the card 60 is parallel (or substantially parallel) to the vertical direction of the game field F. The player places the character card in the front side attack display, thereby performing a battle based on the attack power (ATK) of the character card.

The "back side defense display" is the state in which the character card is placed face down and laterally. "Face down" means that the card is placed so that the player can see the back side 62 of the card 60 and cannot see the front side 61. In other words, "face down" means that the card 60 is placed so that the front side 61 of the card 60 is facing the game field F. "Placed laterally" is a state in which the card 60 is placed to be laterally long as viewed from the player. In other words, "placed laterally" means that the card 60 is placed laterally in such a way that the long side direction of the card 60 is parallel (or substantially parallel) to the lateral direction of the game field F. The player places the character card in the back side defense display, thereby performing a battle based on the defense power (DEF) of the character card.

The "front side defense display" is the state in which the character card is placed face up and laterally. The player places the character card in the front side defense display, thereby performing a battle based on the defense power (DEF) of the character card.

When placing the character card in the game field, the player basically can choose either the front side attack display or the back side defense display as the placement format. The character card placed in the back side defense display is changed to the front side defense display when attacked by an opponent player (1). When the player places the character card in the back side defense display, the opponent player is to attack the character card without knowing the name and performance (e.g., attack power, defense power) of the character card. When attacking the character card, the opponent player knows the name and performance of the character card. The character card placed in the back side defense display may be changed to the front side defense display when the effect of a certain magic card is activated. The player can also change his or her character card placed in the back side defense display to the front side attack display (2). Further, the player can change the placement of his or her character cards in the game field F between the front side attack display and the front side defense display (3).

Similarly, in the card game, a plurality of types of placement formats are defined for magic or trap cards. For example, there are two types of placement formats for magic cards and trap cards: front side display and back side display. The "front side display" is a state in which a magic card or a trap card is placed face up and vertically and the effect of the magic or the trap indicated by the magic card or the trap card is activated. On the other hand, "back side display" is a state in which the magic card or the trap card is placed face down and vertically, and the effect of the magic or the trap indicated by the magic card or the trap card is waiting to be activated. The magic card or trap card placed in the back side display is changed to the front side display at the player's discretion or when a predetermined activation condition is satisfied, and the effect of the magic or the trap indicated by the magic card or the trap card is activated. When the player puts the magic card or the trap card in the back side display, the opponent player proceeds with the game without knowing the name or the effect of the magic card or the trap card. When the display is changed to the front side display, the opponent player knows the name and effect of the magic card or the trap card.

In view of the characteristics of the placement formats as described above, the player selects or changes the placement format of the cards in order to play against the opponent player.

In the card game, the first player wins and the second player loses when the second player's points (life points), which are reduced by attacks from the first player to the second player, reach zero. On the other hand, the second player wins and the first player loses when the first player's points (life points), which are reduced by attacks from the second player to the first player, reach zero.

Figure 5:
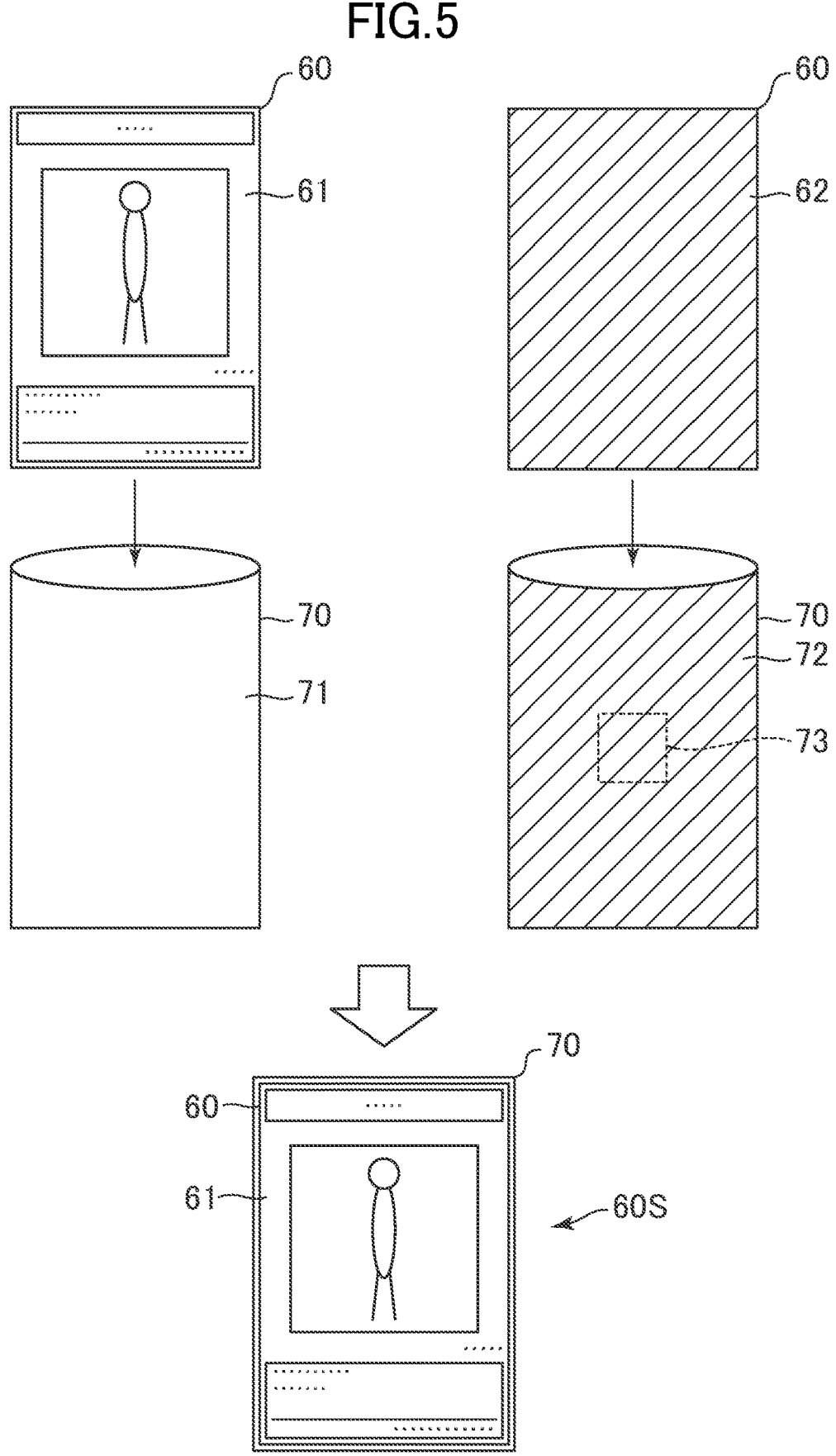
FIG. 5 is a diagram illustrating an example of a sleeve.

In this embodiment, the card 60 is used while being contained in a sleeve. FIG. 5 is a diagram of the sleeve. As shown in FIG. 5, a sleeve 70 is a case for one card 60. The sleeve 70 is a rectangular, bag-shaped object with three sides bonded together and one remaining side formed as an opening, and the card 60 is inserted in the sleeve 70 through the opening. The sleeve 70 is made of synthetic resin, such as polypropylene. For example, the sleeve 70 is provided (sold) separately from the card 60.

The sleeve 70 has a front portion 71 and a back portion 72. The front portion 71 is a surface (facing surface portion) that is facing the front side 61 of the card when the card is housed in the sleeve 70. The back portion 72 is a surface (opposite surface portion) on the opposite side of the front portion 71, and is facing the back side 62 of the card 60 when the card 60 is housed in the sleeve 70. As shown in FIG. 5, the card 60 is housed in the sleeve 70 such that the front side 61 of the card 60 faces the front portion 71 of the sleeve 70 (in other words, such that the back side 62 of the card 60 faces the back portion 72 of the sleeve 70).

The front portion 71 of the sleeve 70 is transparent, and the front side 61 of the card housed in the sleeve 70 is visible from outside the sleeve 70 through the front portion 71. The entire front portion 71 is not necessary to be transparent, and a part of the front portion 71 (e.g., the edge portion) may not be transparent if the front side 61 of the card housed in the sleeve 70 is visible from the outside of the sleeve 70. The back portion 72 of the sleeve 70 is not transparent and has a common appearance with the back portions 72 of other sleeves 70. That is, the appearance of the back portion 72 is common to all the sleeves 70. As such, individual sleeves 70 cannot be distinguished from the appearances of the back portions 72. For example, the back portion 72 has the same appearance as the back side 62 of the card 60.

The sleeve 70 includes an IC tag 73 (RFID tag). The IC tag 73 is a device capable of communicating via radio waves or other wireless means. For example, the IC tag 73 is a passive IC tag including an IC chip and an antenna, and receives a signal from an IC tag reader via the antenna through wireless communication, and, in response to the signal, returns the information stored in the IC chip to the IC tag through wireless communication. The IC tag 73 may include the function of writing and storing, into the IC chip, the information received from the IC tag writer via the antenna. The IC tag 73 is not limited to a passive IC tag, but may also be an active IC tag.

For example, the IC tag is provided to a position other than the front portion 71 of the sleeve 70 so that the IC tag 73 does not hide the front side 61 of the card 60. In this embodiment, the IC tag 73 is provided in the inner surface of the back portion 72 of the sleeve 70. For example, the IC tag 73 is attached to the inner surface of the back portion 72 with means such as a seal. The antenna of the IC tag 73 may be printed on the inner surface of the back portion 72. Further, the IC chip of the IC tag 73 stores a tag ID, which is information for uniquely identifying each IC tag 73.

The back portion 72 of the sleeve 70 is not transparent, and thus the IC tag 73 is not visible from the outside of the sleeve 70. As such, even if there are differences in the installation positions of the IC tags 73 among the sleeves 70 or the IC tags 73 are different from one another, the sleeves 70 cannot be distinguished from the back portions 72 of the sleeves 70 based on such differences.

If there are no differences in the installation positions of the IC tags 73 or the IC tags 73 are not different from one another, or if such differences can be ignored and there is no particular problem even if the IC tag 73 is visible from the outside of the sleeve 70, the back portion 72 of the sleeve 70 may be transparent. In a case where both the front portion 71 and the back portion 72 of the sleeve 70 are transparent, the inner surface of the front portion 71 may include the IC tag 73.

If the IC tag 73 is attached to a part of the back portion 72 of the sleeve 70, the thickness of the part where the IC tag 73 is attached is larger than the rest of the sleeve, which may impair stability when some sleeves 70 are placed on top of each other. For this reason, in order to make the thickness of the sleeve 70 uniform (or substantially uniform), for example, the thickness of the part of the back portion 72 other than the part where the IC tag 73 is attached may be made equivalent to the thickness of the IC tag 73, or the IC tag 73 (antenna) may be disposed over the entire (or a wide area) of the inner surface of the back portion 72.

In this embodiment, the card 60 is used while being contained in the sleeve 70. The sleeve 70 serves to protect the card 60 from damage, for example, and also serves to identify the type and state of the card 60 placed in the game field F, as described below. In the following, the card 60 housed in the sleeve 70 will be referred to as "card 60S" for convenience to distinguish it from the card 60 alone. In other words, when the card 60 is housed in the sleeve 70, the card 60 and the sleeve 70 are regarded as a single physical object and described as "card 60S."

[1-2. System configuration] Returning to FIG. 1, the configuration of the system 1 for the first embodiment will be described. As shown in FIG. 1, the system 1 includes a game board 10, a capturing device 30, an information processing device 40, and a display terminal device 50.

The game board 10 is a board on which cards are placed by the first and second players who play the card game. For example, the game board 10 is placed on a table 2 where the first and second players sit facing each other.

The game board 10 includes a case 11 and a mat 12 placed on the case 11. The game field F (zones Z1 to Z30) is drawn on the mat 12. The case 11 and the mat 12 may be integrally formed. In other words, the game field F may be drawn on the upper surface of the case 11. In the following, placing the card 60S on the game board 10 (mat 12) will be referred to as "placing the card 60S on the game field F."

Figure 6:
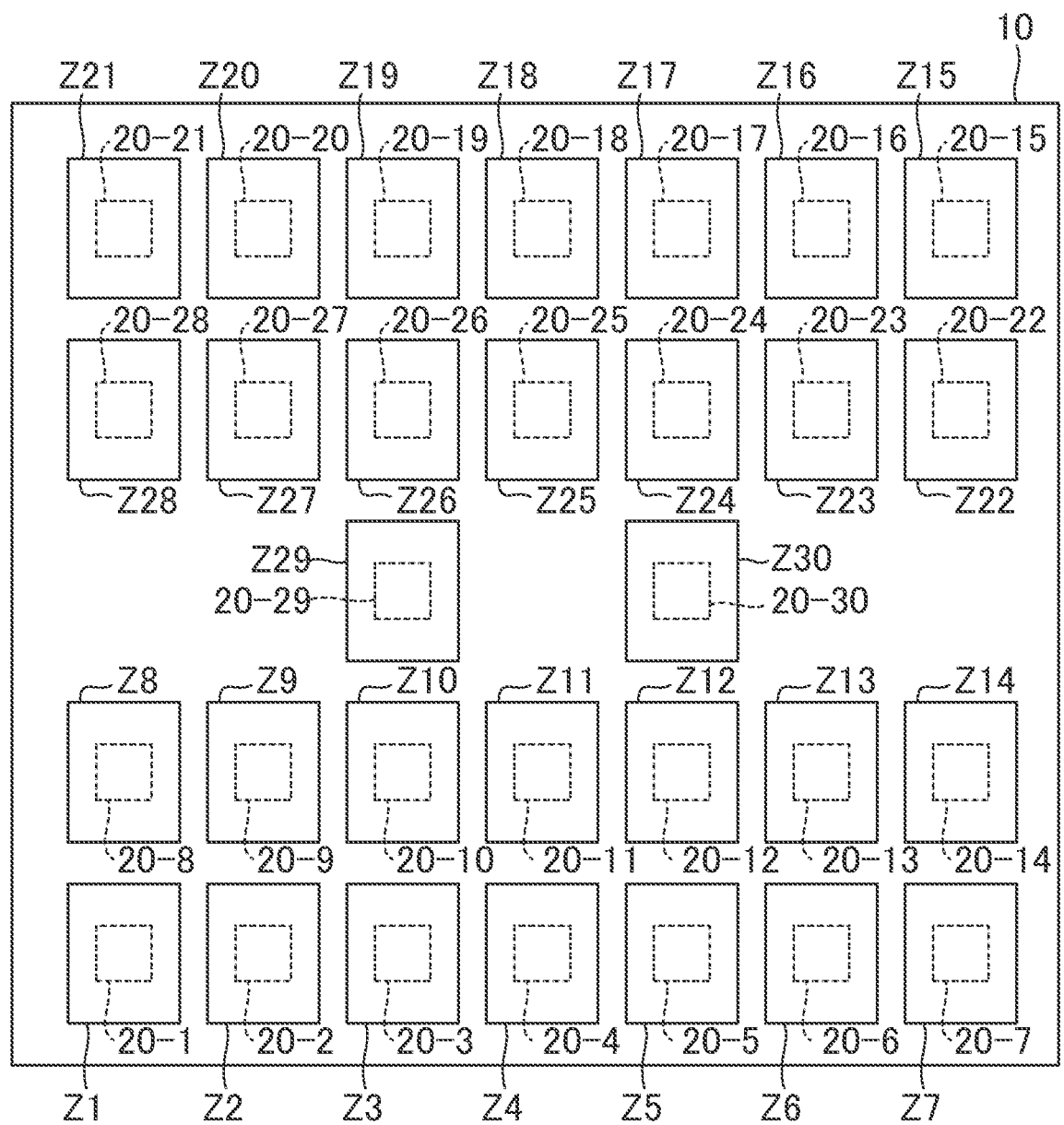
FIG. 6 is a diagram illustrating an example of a game board.

FIG. 6 is a diagram of the game board 10 and showing the game board 10 as seen from above. As shown in FIG. 6, a plurality of readers 20-1 to 20-30 are installed inside the case 11 of the game board 10. Each of the readers 20-1 to 20-30 is an IC tag reader. The IC tag reader includes an antenna for transmitting and receiving signals to and from the IC tag. The IC tag reader transmits a signal through wireless communication and receives a signal returned from IC tag that have received the signal, thereby reading the information stored in the IC tag (IC chip).

The readers 20-1 to 20-30 are disposed in the game field F so as to respectively correspond to the zones Z1 to Z30. For example, the reader 20-1 corresponds to the zone Z1 and is disposed in a position corresponding to the zone Z1. Specifically, the reader 20-1 is disposed below the zone Z1 and used to read the information stored in the IC tag 73 of the card 60S placed in the zone Z1. The same is applied to the readers 20-2 to 20-30. In the following, when there is no need to distinguish between readers 20-1 to 20-30, they will be collectively referred to as "reader 20."

The card 60 and the front portion 71 and the back portion 72 of the sleeve 70 are made of a material that does not interfere with the transmission and reception of signals between the IC tag 73 and the reader 20. As such, even if a card 60S is placed in a zone Z either face up or face down, the reader 20 disposed under the zone Z can read the information stored in the IC tag 73 of the card 60S.

When a plurality of cards 60S are piled up in a single zone Z, a reader 20 disposed under the zone Z can read information stored in IC tags 73 of the respective cards 60S.

A reader 20 disposed under a zone Z is set apart from the other zones Z so as not to read the information stored in the IC tags 73 of the cards 60S placed in the other zones Z.

The game board 10 and the information processing device 40 are connected to each other through a cable that follows a predetermined interface standard. Alternatively, the game board 10 and the information processing device 40 can communicate via a communication network. The reading result data regarding the reading result of the reader 20 is supplied to the information processing device 40 via the cable or the communication network.

The capturing device 30 is a visible light camera, and converts an optical image obtained through the lens into an electronic image signal using an image sensor and outputs the signal. The capturing device 30 is fixed above the game board 10 (game field F) and is used to capture the game field F. The captured image of the capturing device 30 includes at least the zones Z1 to Z30 of the game field F.

The capturing device 30 and the information processing device 40 are connected to each other through a cable that follows a predetermined interface standard. Alternatively, the capturing device 30 and the information processing device 40 can communicate via a communication network. The capturing device 30 captures the game field F at predetermined intervals, and the captured image is supplied to the information processing device 40 via the cable or the communication network.

The information processing device 40 is a computer and includes a control unit 41, a storage unit 42, a communication unit 43, an operation unit 44, a display unit 45, and an audio output unit 46. The control unit 41 includes at least one microprocessor and executes information processing according to programs stored in the storage unit 42. The storage unit 42 includes a main storage unit (e.g., RAM) and an auxiliary storage unit (e.g., non-volatile semiconductor memory, hard disk drive, solid state drive), and stores programs and data. The communication unit 43 is used to communicate with other devices via the communication network. The operation unit 44 is used by the operator to perform operations. The display unit 45 is for displaying images, such as a liquid crystal display or an organic EL display. The audio output unit 46 is for outputting audio, such as a speaker or headphones. The operation unit 44, the display unit 45, and the audio output unit 46 may be installed in the information processing device 40 itself, or installed as external devices connected to the information processing device 40. For example, the display unit 45 may be a head-mounted display (HMD), a monitor, a television receiver, or a projector connected to the information processing device 40 as an external device.

The information processing device 40 identifies the type and state of the card 60S placed on the game field F (i.e., the type and state of the card 60 contained in the sleeve 70 and placed on the game field F) based on the read result data of the reader 20 and the captured image of the capturing device 30. The information processing device 40 displays a game field image showing the current state of the game field F on the display terminal device 50 based on the identification result. The processing executed by the information processing device 40 will be described later (see e.g., FIGS. 10, 12, 13, 18).

The display terminal device 50 is a device that can display images. For example, the display terminal device 50 is a device for spectators to watch a card game match. Specifically, the display terminal device 50 is a terminal device (e.g., a smartphone, tablet computer, laptop computer, desktop computer) used by an individual spectator, and, as shown in FIG. 1, is a computer including a control unit 51, a storage unit 52, a communication unit 53, an operation unit 54, a display unit 55, and an audio output unit 56. The control unit 51, the storage unit 52, the communication unit 53, the operation unit 54, the display unit 55, and the audio output unit 56 are the same as the control unit 41, the storage unit 42, the communication unit 43, the operation unit 44, the display unit 45, and the audio output unit 46. FIG. 1 shows the operation unit 54 and the display unit 55 separately, although the operation unit 54 and the display unit 55 may be integrally formed as a touch panel. The operation unit 54 may be a pointing device such as a mouse, a button (key), or a lever (stick). The operation unit 54 may be used by the spectator to perform operations by voice or gesture.

In the following, assume that the display terminal device is a terminal device (e.g., smart phone) used by each spectator, but the display terminal device 50 is not limited thereto. For example, the display terminal device 50 may be a display-only device having only display functions. For example, the display terminal device 50 may be a large monitor that is installed in a venue and viewed by multiple spectators in the venue.

The display unit 55 of the display terminal device 50 displays, for example, a game field image showing the current state of the game field F (game board 10). The spectator views the game field image and thereby understands the current situation of the game field F.

Figure 7:
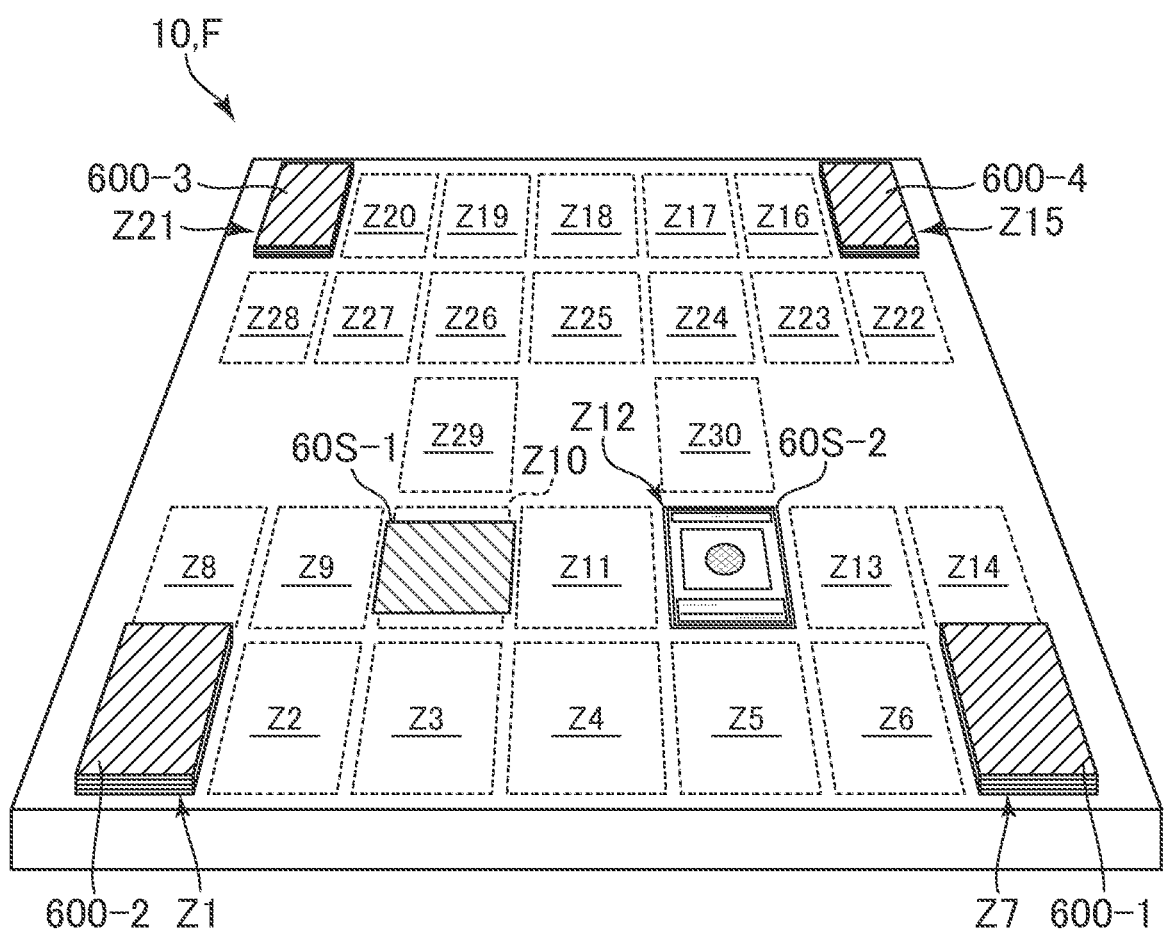
FIG. 7 is a diagram illustrating an example of a state of a game field.
Figure 8:
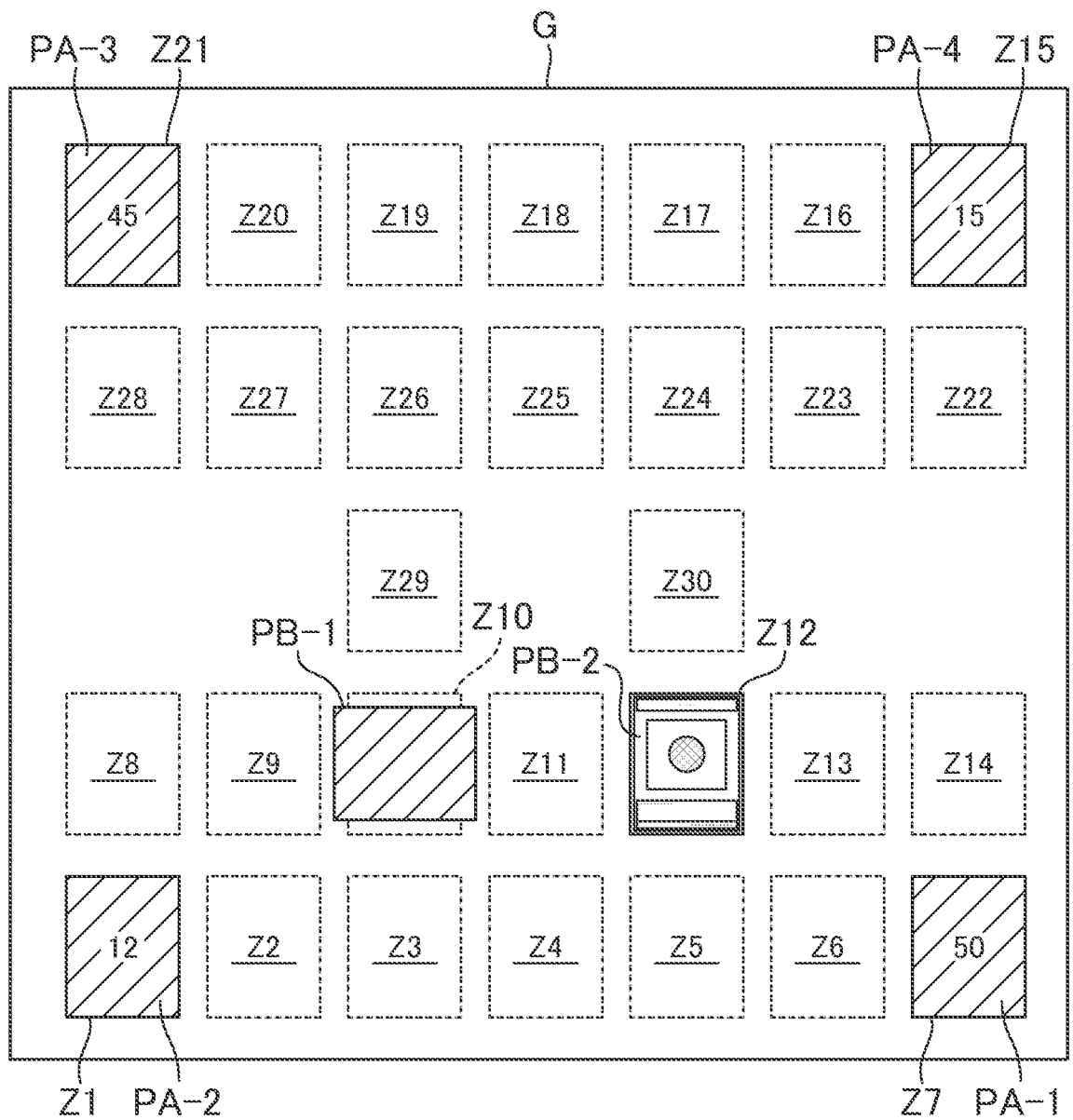
FIG. 8 is a diagram illustrating an example of a game field image.

FIG. 7 shows an example of a situation of the game field F (game board 10), and FIG. 8 shows an example of a game field image of the situation shown in FIG. 7.

In the situation shown in FIG. 7, a card 60S-1 is placed in the zone Z10 in the back side defense display. A card 60S-2 is placed in the zone Z12 in the front side attack display. Further, card sets 600-1 (first player's draw deck), 600-2, 600-3 (second player's draw deck), 600-4, each of which is a plurality of cards 60S piled face down, are respectively placed in the zones Z7, Z1, Z21, and Z15. Assume that the card set 600-1 contains 50 cards 60S and the card set 600-2 contains 12 cards 60S. Further, assume that card set 600-3 contains 45 cards 60S and the card set 600-4 contains 15 cards 60S.

As shown in FIG. 8, the game field image G shows the current state of the game field F. The game field image G shows the zones Z1 to Z30. The game field image G shown in FIG. 8 contains parts PA-1, PA-2, PA-3, PA-4, PB-1, and PB-2.

The part PA-1 is an object corresponding to the card set 600-1 placed in the zone Z7 and displayed in association with the zone Z7. The part PA-2 is an object corresponding to the card set 600-2 placed in the zone Z1 and displayed in association with the zone Z1. The part PA-3 is an object corresponding to the card set 600-3 placed in the zone Z21 and displayed in association with the zone Z21. The part PA-4 is an object corresponding to the card set 600-4 placed in the zone Z15 and displayed in association with the zone Z15. The number shown in the part PA-1 indicates the number of cards 60S in the card set 600-1. The same applies to the parts PA-2 to PA-4.

The part PB-1 is an object corresponding to the card set 60S-1 placed in the zone Z10 and displayed in association with the zone Z10. In the situation shown in FIG. 7, the card 60S-1 is placed in the zone Z10 in the back side defense display. As such, an image showing the card 60 placed laterally and face down (i.e., the image showing the back side 62 of the card 60 placed laterally) is displayed as the part PB-1 in the position corresponding to zone Z10. In other words, as the part PB-1, the image corresponding to the type of the card 60 is not displayed, but the image independent of the type of the card 60 is displayed in the position corresponding to the zone Z10.

The part PB-2 is an object corresponding to the card 60S-2 placed in the zone Z12 and displayed in association with the zone Z12. In the situation shown in FIG. 7, the card 60S-2 is placed in the zone Z12 in the front side attack display. As such, an image showing the card 60 placed vertically and face up (i.e., the image showing the front side 61 of the card 60 placed vertically) is displayed as the part PB-2 in the position corresponding to zone Z12. In other words, unlike part PB-1, the image corresponding to the type of the card 60 is displayed in the position corresponding to the zone Z12 as the part PB-2.

Figure 9:
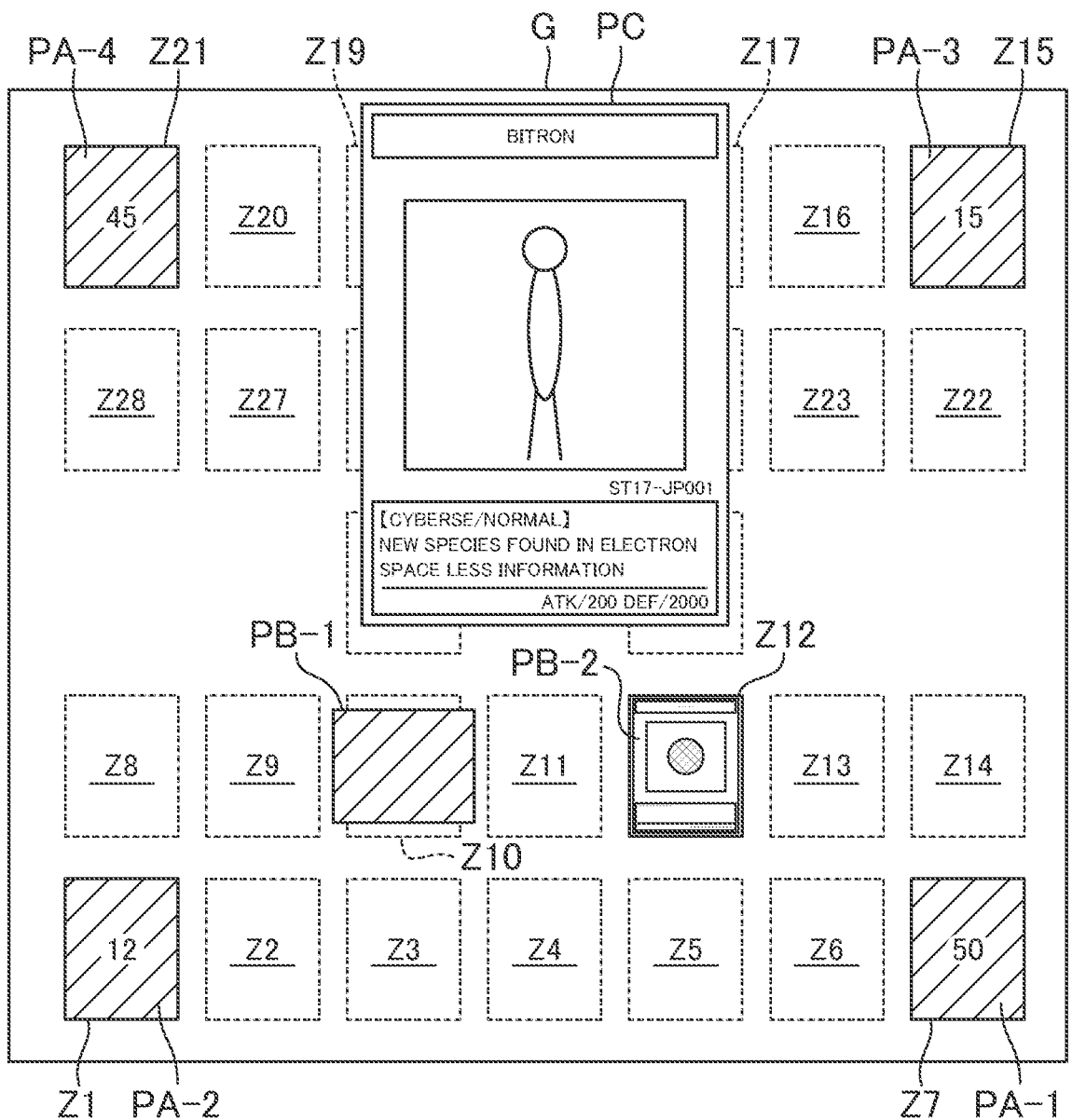
FIG. 9 is a diagram illustrating an example of the game field image where one of the cards is specified.

The part PB-1 is associated with processing to display the information of the card 60S-1 placed in the zone Z10. As such, when a specifying operation to specify the part PB-1 (e.g., a tap operation on the part PB-1) is received, the information of the card 60S-1 is displayed. FIG. 9 shows an example of the game field image G when the specifying operation of the part PB-1 is received. If the specifying operation of the part PB-1 is received, as shown in FIG. 9, the image showing the front side 61 of the card 60S-1 placed in the zone Z10 is displayed as the part PC.

Normally, the spectator does not know the name and performance of the card 60S-1 placed face down, although in this embodiment, the part PC as shown in FIG. 9 is displayed in response to the operation of specifying the part PB-1, and the spectator can thus understand the name and performance of the card 60S-1 placed face down. A text message showing the name and performance of the card 60S-1 may be displayed as the part PC instead of displaying the image showing the front side 61 of the card 60S-1 as the part PC.

Similarly to the part PB-1, the part PB-2 is associated with processing to display the information of the card 60S-2 placed in the zone Z12. As such, if the specifying operation of the part PB-2 is received, the image showing the front side 61 of the card 60S-2 is displayed as the part PC. The part PC is larger than the part PB-2, and thus the spectator can easily know the name and performance of the card 60S-2 placed in the zone Z12 by referring to the part PC.

The part PA-1 may be associated with processing to display a list of the cards 60S included in the card set 600-1 placed in the zone Z7. The list of the cards 60S included in the card set 600-1 may be displayed according to the specifying operation of the part PA-1. In this manner, the spectator may know the list of the cards 60S included in the card set 600-1 placed in the zone Z7. The same applies to the parts PA-2 to PA-4.

In the above description, the game field image G displayed on the display unit 55 of the display terminal device 50 is changed (e.g., from the state shown in FIG. 8 to the state shown in FIG. 9) according to the spectator's operation performed on the display terminal device 50, although the game field image G displayed on the display unit 55 of the display terminal device 50 may be changed according to the operation performed on the information processing device 40. For example, the part PC shown in FIG. 9 may be displayed in the game field G in response to a specifying operation performed by a representative of the card game who provides a live report or commentary using the operation unit 44 of the information processing device 40.

In addition to the game field image G, the captured image of the capturing device 30 may also be displayed on the display unit 55 of the display terminal device 50. For example, both the game field image G and the captured image of the capturing device 30 may be displayed on the display unit 55. For example, the image displayed on the display unit 55 may be switched between the game field image G and the captured image of the capturing device 30 in response to a predetermined switching instruction.

[1-3. Processing] The processing performed by the system 1 will be described.

[1-3-1] As described below, the information processing device 40 performs identifying processing to identify the type and state of the card 60S placed in the game field F based on the reading results of the reader 20. The identifying processing requires that the card ID of the card 60 is associated with the sleeve 70 that contains the card 60. For this reason, prior to starting the card game, the processing for associating the card ID of the card 60 with the sleeve 70 containing the card 60 is performed.

Figure 10:
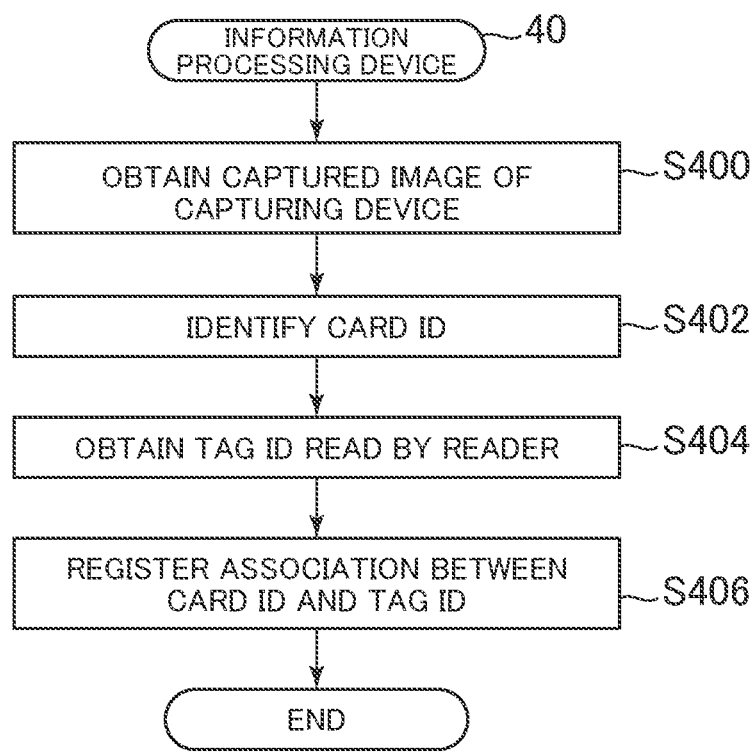
FIG. 10 is a flow chart showing an example of association processing.

[1-3-1-1] FIG. 10 is a flow chart showing an example of the association processing. For example, the player places one card 60S vertically and face up from his or her deck in a predetermined zone Z of the game field F (e.g., zone Z11). In this state, the association processing shown in FIG. 10 is executed.

As shown in FIG. 10, the control unit 41 of the information processing device 40 obtains a captured image of the capturing device 30 (S400). The control unit 41 then identifies the card ID of the card 60S in the captured image (i.e., the card ID of the card 60 contained in the sleeve 70 and placed in the zone Z) from the captured image (S402).

For example, the storage unit 42 previously stores a learned model (a model for identifying the card ID of the card 60S captured in the captured image) generated by executing the machine learning based on the learning data including the captured image of the game field F in which the card 60S is placed and the card ID (correct answer data) of the card 60S. In step S402, the control unit 41 uses the learned model to identify the card ID of the card 60S in the captured image.

The storage unit 42 may previously store feature data that associates a card ID of a card 60S with appearance feature information indicating the appearance features of the card 60S. In step S402, the control unit 41 analyzes a captured image to extract the appearance feature information of the card 60S in the captured image, and identifies the card ID associated with the extracted appearance feature information (or appearance feature information that is most similar to the extracted appearance feature information) as the card ID of the card 60S in the captured image.

After step S402 is executed, the control unit 41 obtains a tag ID read by the reader 20 (S404). When a card 60S is placed in the zone Z, the reader 20 installed under the zone Z reads the tag ID stored in the IC tag 73 of the card 60S, and the read tag ID is supplied to the information processing device 40. The control unit 41 obtains the tag ID supplied in this way.

After step S404 is executed, the control unit 41 registers the association between the card ID identified in step S402 and the tag ID obtained in step S404 in an association data D1 (S406).

Figure 11:
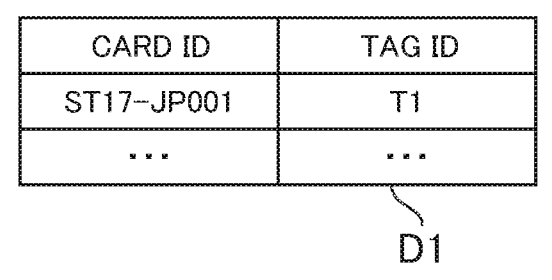

FIG. 11 shows an example of the association data D1 stored in the storage unit 42. The association data D1 includes "card ID" and "tag ID" fields. The "card ID" field is for registering a card ID, and the "tag ID" field is for registering a tag ID.

In step S406, the control unit 41 adds a new record to the association data D1 and registers the card ID identified in step S402 and the tag ID obtained in step S404 in the "card ID" and "tag ID" fields of the added record.

After step S406 is executed, a completion notice indicating that the association process is completed is output. For example, an image indicating a completion notification is displayed on the display unit 45, or audio indicating the completion notification is output from the audio output unit 46. In response to the completion notification, the player removes the card 60S placed in the zone Z and places the next card 60S face up and vertically in the zone Z from his or her deck. In this state, the association processing shown in FIG. 10 is executed again.

The association processing shown in FIG. 10 is executed for each card 60S in the first player's deck, and the information of all of the cards 60S in the first player's deck is registered in the association data D1. Further, the association processing shown in FIG. 10 is also executed for each card 60S in the second player's deck, and the information of all of the cards 60S in the second player's deck is registered in the association data D1.

Figure 12:
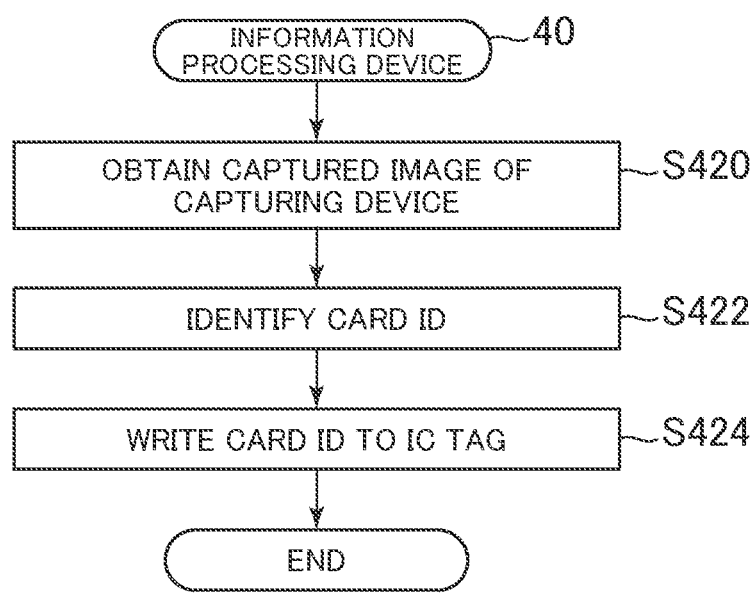
FIG. 12 is a flow chart showing another example of the association processing.

[1-3-1-2] The association processing is not limited to the processing shown in FIG. 10. FIG. 12 is a flow chart showing another example of the association processing. The association processing shown in FIG. 12 may be performed instead of the association processing shown in FIG. 10.

The association processing shown in FIG. 12 is based on a precondition that the IC tag writer for writing information to the IC tag 73 is installed under the zone Z. In the following, assume that the reader 20 installed under the zone Z is an IC tag reader/writer including functions of both an IC tag reader and an IC tag writer.

As shown in FIG. 12, the control unit 41 of the information processing device 40 acquires a captured image of the capturing device 30 (S420). The control unit 41 then identifies the card ID of the card 60S in the captured image from the captured image (S422). The processing of steps S420 and S422 is the same as that of steps S400 and S402 in FIG. 10.

After step S422 is executed, the control unit 41 writes the card ID identified in step S422 to the IC tag 73 of the card 60S placed in the zone Z (S424). In other words, the control unit 41 sends a write instruction for the card ID identified in step S422 to the reader 20 placed under the zone Z. In response to the write instruction, the reader 20 then writes the card ID identified in step S422 into the IC tag 73 of the card 60S placed in the zone Z.

The association processing shown in FIG. 12 is executed for each card 60S included in the first player's deck, and an IC tag 73 of each card 60S included in the first player's deck stores a card ID of such a card 60S. Further, the association processing shown in FIG. 12 is also executed for each card 60S included in the second player's deck, and an IC tag 73 of each card 60S included in the second player's deck stores a card ID of such a card 60S. In this case, the association between the card ID of the card 60 and the sleeve 70 that contains the card 60 is not stored as the association data D1 as shown in FIG. 11 but stored in an IC tag 73 of each sleeve 70.

[1-3-1-3] Here, the case has been described in which the association processing is executed using the system 1, although the association processing is not necessarily executed using the system 1. For example, an association system including a capturing device and an IC tag reader (IC tag reader/writer) may be prepared separately from the system 1 and used to execute the association processing. The association may be completed by the time when the card game starts, and the timing of performing the association may not be just before the start of the card game.

Figure 13:
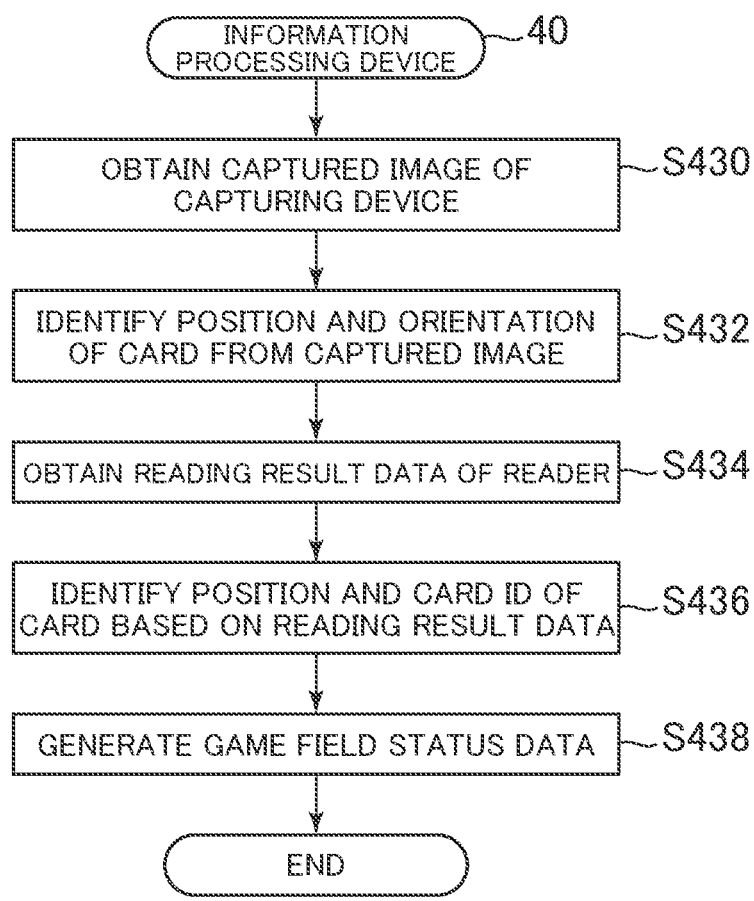
FIG. 13 is a flow chart showing an example of identifying processing.

[1-3-2] During the play of the card game, the information processing device 40 performs identifying processing to identify the type and state of the card 60S placed in the game field F. FIG. 13 is a flow chart showing an example of the identifying processing. The identifying processing shown in FIG. 13 is based on a precondition that the association data D1 shown in FIG. 11 is stored in the storage unit 42.

As shown in FIG. 13, the control unit 41 of the information processing device 40 acquires a captured image of the capturing device 30 (S430). The control unit 41 identifies the position and orientation of the card 60S placed in the game field F from the captured image (S432).

Figure 14:
FIG. 14 is a diagram illustrating an example of areas set in a captured image.

In this embodiment, for example, as shown in FIG. 14, 35 areas A1 to A35 are provided by dividing the captured image I into 5 vertical blocks×7 horizontal blocks. Among these, the areas A1 to A30 are provided so as to correspond to the zones Z1 to Z30 of the game field F. In the following, when it is not necessary to identify each of the areas A1 to A35, they are simply referred to as "area A."

In step S432, the control unit 41 identifies whether a card 60S is captured in each area A in the captured image and the orientations of the captured cards 60S (vertical and lateral orientation or front and back orientation). Here, "identifying the vertical and lateral orientation of the card 60S" means identifying whether the card 60S is placed vertically or laterally, and "identifying the front and back orientation of the card 60S" means identifying whether the card 60S is placed face up or face down.

For example, the storage unit 42 previously stores a learned model (a model for identifying whether a card 60S is captured in each area A of the captured image and the orientation of the captured card 60S) generated by executing the machine learning based on the learning data including the captured image of the game field F in which the card 60S is placed and the correct answer data indicating the area A in which the card 60S is placed and the orientation of the card 60S. In step S432, the control unit 41 uses the learned model to identify whether the cards 60S are captured in respective areas A in the captured image, and the orientations of the captured cards 60S.

The storage unit 42 may previously store data that associates an orientation of a card 60S with appearance feature information indicating the appearance feature of the card 60S placed in that orientation for each card 60S. In step S422, the control unit 41 may analyze the captured image to determines whether the appearance feature information of the card 60S has been extracted from the area A of the captured image, thereby identifying whether the card 60S is captured in the area A, or identifying the orientation of the card 60S captured in the area A from the extracted appearance feature information.

The identification result in step S432 is registered in a first identification result data D2. FIG. 15 shows an example of the first identification result data D2. As shown in FIG. 15, the first identification result data D2 contains the "area ID", "orientation flag", and "side flag" fields.

The "area ID" field indicates an area ID, which is information for uniquely identifying an individual area A set in the captured image. The "orientation flag" field is for registering an orientation flag, which indicates the identification result of a vertical or lateral orientation of a card 60S in an area A. For example, if a card 60S is identified as being oriented vertically, a value "0" is registered in the "orientation flag" field, and if the card 60S is identified as being oriented laterally, a value "1" is registered in the "orientation flag" field. The "side flag" field is for registering a side flag, which indicates the identification result of a front or back side of a card 60S in the area A. For example, if a card 60S is identified as face up, a value "0" is registered in the "side flag" field, and if the card 60S is identified as face down, a value "1" is registered in the "side flag" field. If a card 60S is not captured in the area A, the "orientation flag" and "side flag" fields are set to null. In the following, in the records of the first identification result data D2, a record having "An" (n: natural number) in the "area ID" field is described as a "record of area ID An."

For example, in the situation shown in FIG. 7, the followings are identified from the captured images in step S432: (a) the cards 60S are respectively captured in the areas A1, A7, A10, A12, A15, and A21; (b) the card 60S in the area A10 is oriented laterally and face down; (c) the card 60S in the area A12 is oriented vertically and face up; and (d) the cards 60S captured in the areas A1, A7, A15, and A21 are oriented vertically and face up, and this identification result is registered in the first identification result data D2.

After step S432 is executed, the control unit 41 obtains reading result data of each reader 20 supplied from the game board 10 (S434), and identifies positions and card Ids of the cards 60S placed in the game field F based on the reading result data (S436).

For example, in the situation shown in FIG. 7, the reader 20-10 installed under the zone Z10 reads a tag ID stored in the IC tag 73 of the card 60S-1 placed in the zone Z10, and supplies the tag ID as read result data to the information processing device 40. The control unit 41 refers to the association data D1 and identifies a card ID associated with the tag ID read by the reader 20-10. In this way, the card ID of the card 60S-1 placed in the zone Z10 is identified.

Similarly, the reader 20-12 installed under the zone Z12 reads a tag ID stored in the IC tag 73 of the card 60S-2 placed in the zone Z12, and supplies the tag ID as read result data to the information processing device 40. The control unit 41 refers to the association data D1 and identifies a card ID associated with the tag ID read by the reader 20-12. In this way, the card ID of the card 60S-2 placed in the zone Z12 is identified.

The reader 20-7 installed under the zone Z7 reads tag IDs stored in IC tags 73 of cards 60S included in the card set 600-1 placed in the zone Z7, and supplies those tag IDs as read result data to the information processing device 40. The control unit 41 refers to the association data D1 and identifies card IDs associated with the tag IDs read by the reader 20-7. In this way, the card IDs of respective cards 60S included in the card set 600-1 placed in the zone Z7 are identified. Similarly to the zone Z7, card IDs are identified for zones Z1, Z15, and Z21.

The identification result in step S436 is registered in a second identification result data D3. FIG. 16 shows an example of the second identification result data D3. As shown in FIG. 16, the second identification result data D3 contains "reader ID" and "card ID" fields.

The "reader ID" field indicates a reader ID, which is information for uniquely identifying an individual reader. In FIG. 16, a reader ID of a reader 20-n (n: natural number) is described as "Rn". The "card ID" field is for registering a card ID identified from the read result data of the reader 20. The reader that has not read the tag ID stored in the IC tag 73 has "card ID" field set to null. In the following, in the records of the second identification result data D3, a record having "Rn" (n: natural number) in the "reader ID" field is described as a "reader ID Rn record."

For example, in the situation shown in FIG. 7, the card ID identified from the tag ID read by the reader 20-10 (i.e., the card ID of the card 60S-1 placed in the zone Z10) is registered in the "card ID" field of the record of the reader ID "R10." In addition, the card ID identified from the tag ID read by the reader 20-12 (i.e., the card ID of the card 60S-2 placed in the zone Z12) is registered in the "card ID" field of the record of the reader ID "R12."

Further, a list of card IDs identified from the tag IDs read by the reader 20-7 (i.e., a list of card IDs of the cards 60S in the card set 600-1 placed in the zone Z7) is registered in the "card ID" field of the record of the reader ID "R7." The same applies to the "card ID" field of the records of the reader IDs "R1", "R15", and "R21." The "card ID" fields of the records other than reader IDs "R1", "R7", "R10", "R12", "R15", and "R21" are set to null.

Here, the case has been described in which the association data D1 shown in FIG. 11 has been registered in the storage unit 42 by the association processing shown in FIG. 10. In this regard, if a card ID of a card 60S has been registered in the IC tag 73 of the card 60S by the association processing described in FIG. 12, the processing described below is executed in step S436.

For example, in the situation shown in FIG. 7, the reader 20-10 installed under the zone Z10 reads a card ID stored in the IC tag 73 of the card 60S placed in the zone Z10, and supplies the card ID as read result data to the information processing device 40. The control unit 41 then registers the card ID read by the reader 20-10 into the "card ID" field of the record of the reader ID "R10." The same applies to the zone Z12.

The reader 20-7 installed under the zone Z7 reads card IDs stored in IC tags 73 of cards 60S included in the card set 600-1 placed in the zone Z7, and supplies those card IDs as read result data to the information processing device 40. The control unit 41 then registers the card IDs read by the reader 20-7 into the "card ID" field of the record of the reader ID "R7." The same applies to the zones Z1, Z15, and Z21.

After step S436 is executed, the control unit 41 generates game field status data D4 based on the first identification result data D2 and the second identification result data D3 (S438).

FIG. 17 shows an example of the game field status data D4. The game field status data D4 is data indicating the current status of the game field F. More specifically, the game field status data D4 indicates a current status of each zone Z in the game field F (whether there is a card 60S in the zone Z, and the type and arrangement of cards 60S in the zone Z).

As shown in FIG. 17, the game field status data D4 contains "zone ID", "card ID", "orientation flag", and "side flag" fields. The "zone ID" field indicates a zone ID, which is information for uniquely identifying an individual zone Z in the game field F. The "card ID" field is the same as the "card ID" field in the second identification result data D3. The "orientation flag" and "side flag" fields are the same as the "orientation flag" and "side flag" fields of the first identification result data D2. In the following, in the records of the game field status data D4, a record having "Zn" (n: natural number) in the "zone ID" field is described as a "zone ID Zn record."

In step S438, the control unit 41 matches the "area ID" field of the first identification result data D2 with the "reader ID" field of the second identification result data D3 to combine the first identification result data D2 and the second identification result data D3, thereby generating the game field status data D4.

For example, the record of the reader ID "R1" in the second identification result data D3 and the record of the area ID "A1" in the first identification result data D2 are both records relating to the reader 20-1 or the area A1 corresponding to the zone Z1, and these records correspond to each other. As such, the control unit 41 registers the combination of the card ID registered in the "card ID" field of the record of the reader ID "R1" in the records of the second identification result data D3 and the orientation flag and side flag registered in the "orientation flag" and "side flag" fields of the record of the area ID "A1", which is the record corresponding to the reader ID "R1" in the records of the first identification result data D2, in the game field status data D4 as information indicating the current status of the zone Z1. That is, the control unit 41 registers such a combination in the "card ID", "orientation flag", and "side flag" fields of the record of the zone ID "Z1" in the game field status data D4 record. The same applies to the zones Z2 to Z30.

Figure 18:
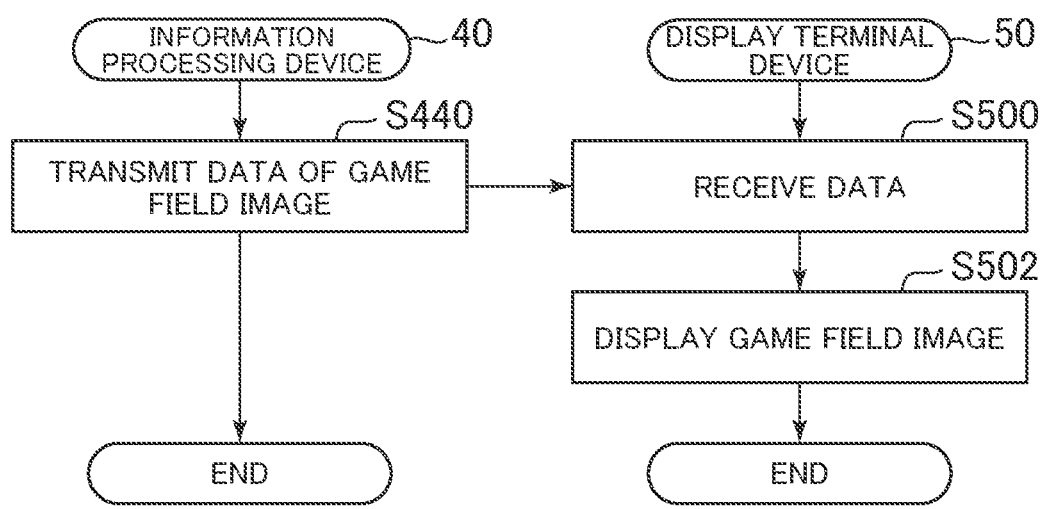
FIG. 18 is a diagram illustrating an example of display control processing.

[1-3-3] During the card game play, display control processing is executed to display the game field image G on the display unit 55 of the display terminal device 50. For example, the storage unit 42 stores the card data that associates the card ID with the information and the image (front side 61) of the card 60. The game field image G is displayed based on such card data and the game field status data D4. FIG. 18 shows an example of the display control processing.

As shown in FIG. 18, the control unit 41 of the information processing device 40 transmits the data related to the game field image G to the display terminal device 50 via the communication unit 43 (S440), and the display terminal device 50 receives such data via the communication unit 53 (S500). The control unit 51 of the display terminal device 50 displays the game field image G on the display unit 55 based on such data (S502).

Here, "data related to the game field image G" is the data necessary to display the game field image G on the display terminal device 50 (display unit 55). For example, the card data and the game field status data D4 are examples of "data related to the game field image G." The card data may be previously stored in the storage unit 52 of the display terminal device 50. In this case, it is not necessary to transmit the card data to the display terminal device 50. The game field image G itself may be sent to the display terminal device 50 as "data related to the game field image G."

When generating the game field image G, it is determined whether the side flag of the card 60S registered in the game field status data D4 is "1" (i.e., whether the orientation of the card 60S identified in step S432 is face down). Subsequently, a part indicating the card 60S is displayed in the game field image G according to the determination result.

For example, when the side flag of the card 60S is not "1" (i.e., when the side of the card 60S identified in step S432 is not face-down but face-up), the image showing the front side 61 of the card 60S is displayed in the game field image G as the part indicating the card 60S, such as the part PB-2 shown in FIG. 7. That is, the image corresponding to the card ID of the card 60S registered in the game field status data D4 (i.e., the image corresponding to the type of the card 60S identified in step S432) is displayed as the part indicating the card 60S.

In contrast, when the side flag of the card 60S is "1" (i.e., when the side of the card 60S identified in step S432 is face-down), the image showing the back side 62 of the card 60S is displayed in the game field image G as the part indicating the card 60S, such as the part PB-1 shown in FIG. 7. That is, the image independent of the card ID of the card 60S registered in the game field status data D4 (i.e., the image independent of the type of the card 60S identified in step S432) is displayed as the part indicating the card 60S.

The game field image G may be displayed on the display unit 45 of the information processing device 40. That is, the control unit 41 of the information processing device 40 may display the game field image G on the display unit 45 based on the game field status data D4.

Figure 19:
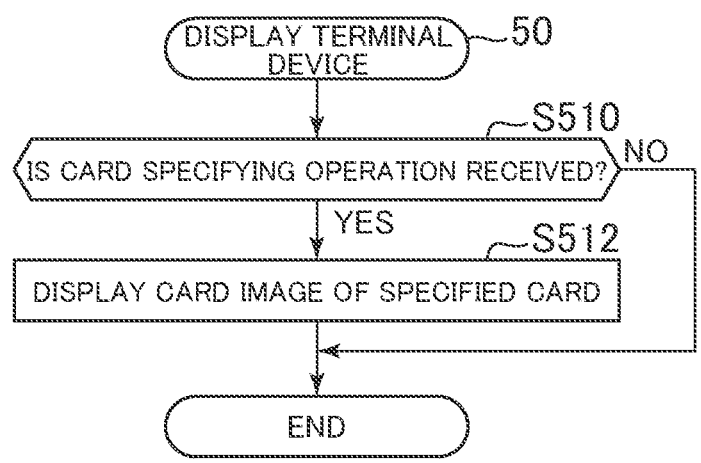
FIG. 19 is a diagram illustrating an example of processing executed in a display terminal device.

[1-3-4] FIG. 19 shows an example of processing repeatedly executed by the display terminal device 50 while the game field image G is displayed.

As shown in FIG. 19, the control unit 51 of the display terminal device 50 determines whether the card specifying operation is received (S510). The "card specifying operation" is an operation to specify the card 60S displayed in the game field image G. For example, in the case of the game field image G shown in FIG. 8, an operation to specify the parts PB-1 or PB-2 (e.g., to tap on parts PB-1 or PB-2) corresponds to the "card specifying operation."

If it is determined that the card specifying operation is received (S510: Yes), the control unit 51 displays a card image of the specified card 60S (S512). For example, the part PC shown in FIG. 9 corresponds to the "card image." For example, the specifying operation is performed on the part PB-1 corresponding to the card 60S-1 placed in the zone Z10 while the game field image G shown in FIG. 8 is displayed on the display unit 55, the control unit 51 displays the part PC indicating the front side 61 of the card 60S-1 placed in the zone Z10.

Although not shown in FIG. 19, the control unit 51 removes the part PC when a predetermined operation to indicate removal (e.g. specifying operation to specify the part PC) is performed while the part PC is displayed.

When the display terminal device 50 receives a card specifying operation, the display terminal device 50 may send a notification that the card specifying operation is received to the information processing device 40, and the control unit 41 of the information processing device 40 may generate a game field image G as shown in FIG. 9 and sends it back to the display terminal device 50. In this manner, the game field image G may be displayed on the display terminal device 50.

If the game field image G is displayed on the display unit 45 of the information processing device 40, the processing shown in FIG. 19 is executed by the control unit 41 of the information processing device 40.

[1-4. Effect] According to the first embodiment described above, the type and state (e.g., position, orientation) of the card 60S placed on the game field F can be identified by using not only the captured image of the capturing device 30 that captures the game field F but also the read result of the reader 20 that reads the information stored in the IC tag 73 of the card 60S. According to the first embodiment, matters that cannot be identified (or are difficult to be identified) from the captured image of capturing device 30 can be identified based on the read result of reader 20.

For example, even if the card 60S is placed face down in the game field F (i.e., the card 60S is placed with the front side 61 not visible in the captured image of the capturing device 30), the type of the card 60S or the information (e.g., name, performance) on the front side 61 of the card 60S can be identified based on the read result of the reader 20. For example, even if a hologram process is applied to the card 60S, the type of the card 60S or the information (e.g., name, performance) on the front side 61 of the card 60S can be identified based on the read result of the reader 20. Further, for example, even if a plurality of cards 60S are piled up, the types of the cards 60S can be identified based on the read result of the reader 20.

In the first embodiment, the identification result (first identification result) from the captured image of the capturing device 30 includes the identification result regarding the position and orientation of the card 60S, and the identification result (second identification result) from the read result of the reader 20 includes the identification result regarding the position and type of the card 60S. As such, the identification result (position identification result) regarding the position of the card 60S is included in both the first identification result and the second identification result. Accordingly, even if a plurality of cards 60S are placed in the game field F, the combination of the first and second identification results for the same card 60S can be identified by matching the position identification results included in both the first and second identification results. That is, even if a plurality of cards 60S are placed on the game field F, a combination of type, position, and orientation of each card 60S can be identified.

In the first embodiment, the IC tag 73 is provided in the sleeve 70. As such, even if the card 60 itself does not include the IC tag, the type and state of the card 60 can be identified from the read result of the reader 20 by placing the card 60 in the sleeve 70.

In other words, the card 60 itself does not need to include the IC tag, and thus it is possible to use an existing card 60 without an IC tag, for example.

If the card 60 itself includes the IC tag, the card 60 cannot be used when the IC tag of the card 60 breaks down, which may cause dissatisfaction of the player. Some of the cards 60 have high rarity, and if such a card 60 with high rarity is unusable due to the failure of the IC tag, the player may feel greatly frustrated. In this regard, if the sleeve 70 includes the IC tag 73, the card 60 continues to be used by replacing the sleeve 70 even if the IC tag 73 breaks down.

In the first embodiment, the IC tag 73 is installed in the back portion 72 of the sleeve 70. This prevents the IC tag 73 from hiding the front side 61 of the card 60 contained in the sleeve 70 and making the front side 61 hard to be seen.

In the first embodiment, the appearance of the back portion 72 of the sleeve 70 is common to all sleeves 70, which ensures that individual sleeves 70 cannot be distinguished from the appearance of the back portion 72.

In the first embodiment, the game field image G is displayed on the display terminal device 50, which allows the spectator (person looking at the display terminal device 50) to understand the current state of the game field F.

In the first embodiment, even if the card 60S is placed face down in the game field F (i.e., when the card 60S is placed with its front side 61 not visible), the part PC indicating the front side 61 of the card 60S is displayed in the game field image G. This provides the spectator with a new entertainment by allowing the spectator to know the information (e.g., name, performance) written on the front side 61 of the card 60S placed face down, which the spectator would not otherwise be able to know. As a result, the entertainment of viewing a card game as a spectator can be improved.

In the first embodiment, when a specifying operation for specifying a card 60S placed face down (e.g., the specifying operation for specifying the part PB-1 in FIG. 8) is received, the part PC that shows the front side 61 of the card 60S is displayed. As such, for example, the information (e.g., name, performance) of the card 60S placed face down is set to be basically unknown, and made known to the spectator by performing the specifying operation only when the spectator desires.

[1-5. Variation] A variation of the first embodiment will be described.

[1-5-1] In the embodiment described above, the sleeve 70 includes the IC tag 73, although the sleeve 70 may contain a physical object provided with the IC tag 73 and the card 60 instead of including the IC tag 73.

Figure 20:
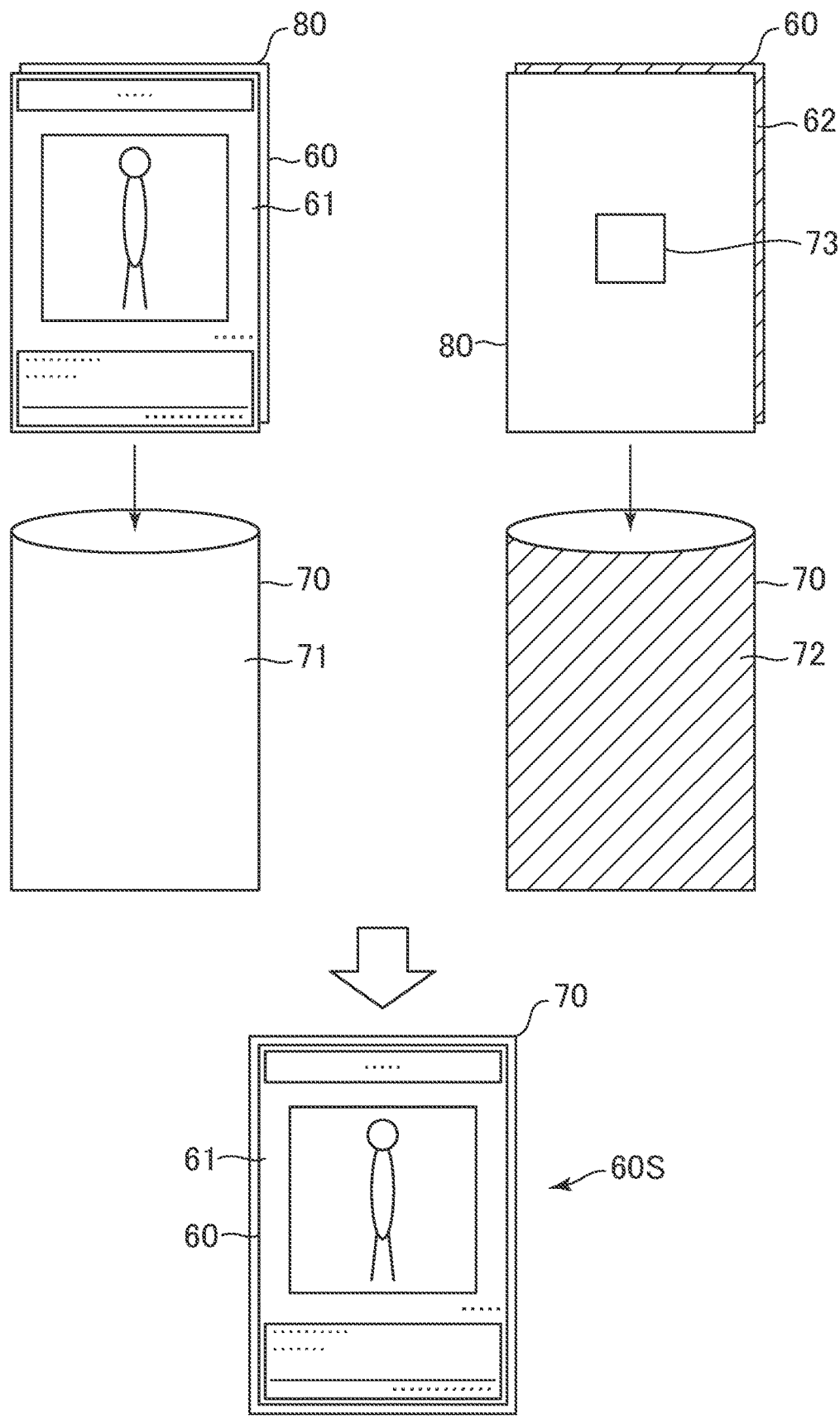
FIG. 20 is a diagram illustrating an example of a physical object housed in a sleeve together with a card.

For example, as shown in FIG. 20, a physical object 80 housed in the sleeve 70 along with a card 60 may include an IC tag 73. The physical object 80 is made of a material that does not interfere with the transmission and reception of signals between the IC tag 73 and the reader 20. For example, the physical object 80 is a sheet-like object having a shape similar to the card 60. In the example shown in FIG. 20, the shape and size of the physical object 80 are identical (or nearly identical) to those of the card 60, although the shape and size of the physical object 80 may be different from those of the card 60. The IC tag 73 may be attached to either side of the physical object 80.

The card 60 is placed in the sleeve 70 so that the front side 61 of the card 60 faces the front portion 71 of the sleeve 70, and the physical object 80 is placed between the back side 62 of the card 60 and the back portion 72 of the sleeve 70. When used in a card game, both the card 60 and the physical object 80 are contained in the sleeve 70. It is sufficient that both the card 60 and the physical object 80 are contained in the sleeve 70 when used in the card game, and it is not necessary to put the card 60 and the physical object 80 together in the sleeve 70 at the same time when the card 60 is contained in the sleeve 70. The physical object 80 may be placed in the sleeve 70 after the card 60 is placed in the sleeve 70, or the card 60 may be placed in the sleeve 70 after the physical object 80 is placed in the sleeve 70. The card 60 and the physical object 80 may be placed together in the sleeve 70 at the same time.

Even if the physical object 80 as described above is housed in the sleeve 70 together with the card 60, it is possible to identify matters that cannot be identified (or are difficult to identify) from the captured image of the capturing device 30 based on the read result of the reader 20 as in the case where the IC tag 73 is attached to the sleeve 70. Further, even if the card 60 itself does not include an IC tag, the card 60 is contained in the sleeve 70 together with the physical object 80, and thus the type and state of the card 60 can be identified from the read result of the reader 20.

[1-5-2] The card 60 itself (e.g., back side 62) may include the IC tag 73. In this manner as well, the matters that cannot be identified (or are difficult to identify) from the captured image of capturing device 30 can be identified based on the read result of the reader 20.

[1-5-3] Before starting a card game, when the player's deck is placed in the zone Z7 or Z21 as a draw deck, the identifying processing shown in FIG. 13 may be executed to determine whether the player's deck placed in the zone Z7 or Z21 is in accordance with the rules based on the game field status data D4. If the deck does not comply with the rules, a warning notice may be output.

[1-5-4] In the above, it has been described that the information stored in the IC tag 73 of the card 60S placed in the zone Z is not read by the reader 20 placed under the other zone Z. However, when the information stored in the IC tag 73 of the card 60S is read by a plurality of readers 20, the reader 20 that has received the signal with the strongest strength from the IC tag 73 among the plurality of readers 20 may be regarded as the reader 20 that has read the information stored in the IC tag 73. For example, when the information stored in the IC tag 73 of the card 60S is read by the readers 20-9 and 20-10, if the strength of the received signal of the reader 20-10 is stronger than that of the reader 20-9, it is possible to identify that the card 60S is placed in the zone Z10.

[1-5-5] In the embodiment described above, the readers 20-1 to 20-30 are installed at the plurality of positions respectively corresponding to the zones Z1 to Z30. Alternatively, the reader 20 including antennas arranged in a grid pattern may be installed inside the case 11 of the game board 10.

Figure 21:
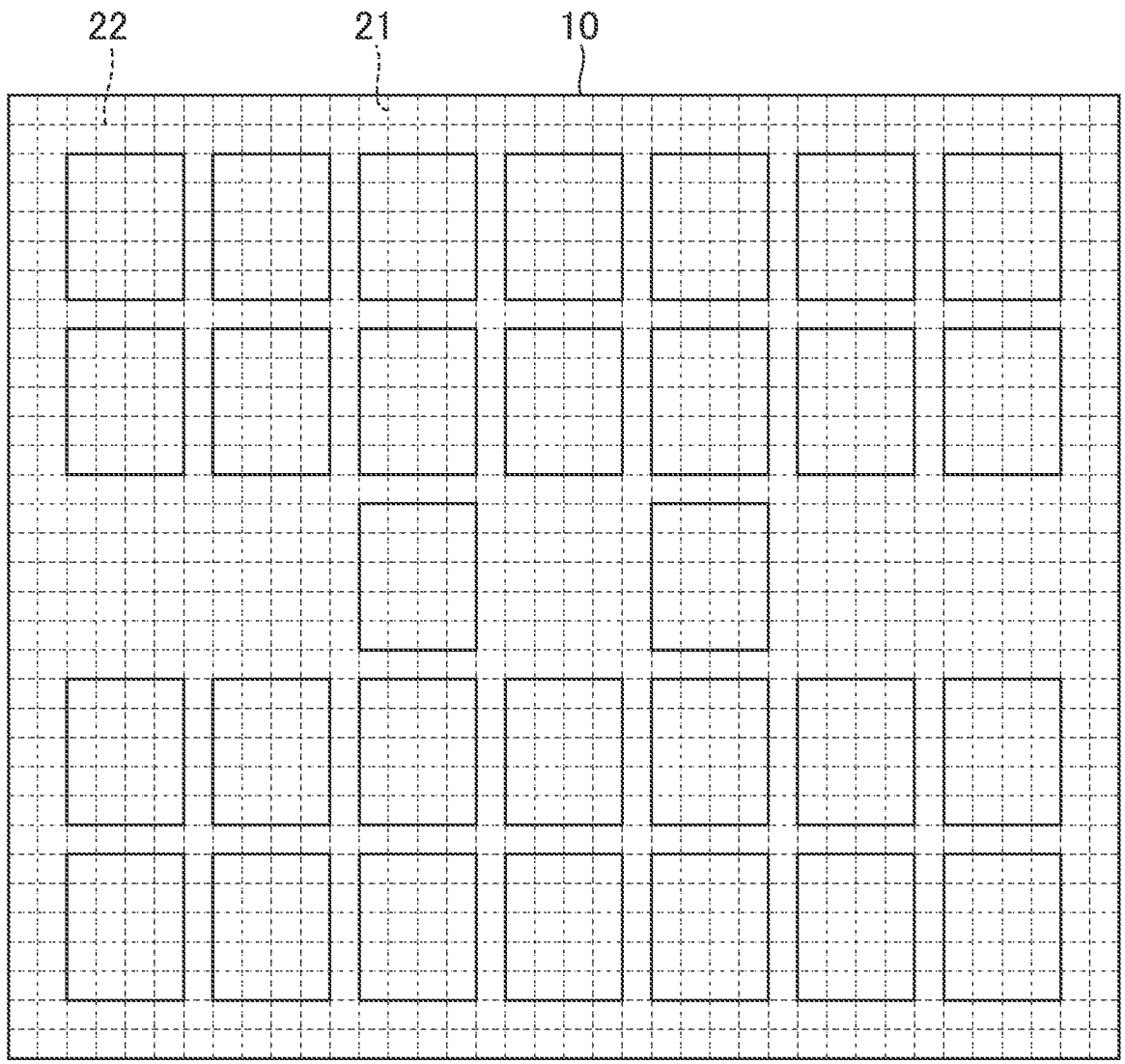
FIG. 21 is a diagram illustrating another example of antennas of a reader.

For example, as shown in FIG. 21, a plurality of first antennas 21 extending in a first direction (e.g., vertical direction) and a plurality of second antennas 22 extending in a second direction (e.g., lateral direction) may be disposed at predetermined intervals as the antennas of the reader 20. In this case, the combination of the first antenna 21 and the second antenna 22 that have received the signals from the IC tag 73 (i.e., the combination of the first antenna 21 and the second antenna 22 that have received the signals with the strongest strength from the IC tag 73) is identified, and the position of the card 60S is thereby identified. For example, the intersection of the first antenna 21 and the second antenna 22 that received signals from the IC tag 73 (i.e., the first antenna 21 and the second antenna 22 that have received the signals with the strongest strength) can be identified as the position where the card 60S is placed.

[1-5-6] In the above, the sleeve 70 is provided (e.g., sold) separately from the card 60, but the sleeve 70 may be provided together with the card 60. In this case, the sleeve 70 may be provided with the card ID being stored in the IC tag 73 (IC chip).

[1-5-7] The card game played by players is not limited to the example described above. For example, the position and number of zones Z in the game field F are not limited to the example shown in FIG. 3. In some card games, areas where the cards 60 are placed, such as the zones Z1 to Z30, are not limited and the player is allowed to put the cards 60 anywhere in the game field F. According to the variation shown in FIG. 21, even if the player places a card 60 at any position in the game field F, the position of the card 60 can be identified.

[1-5-8] A game played by a player may be a game played using a playing medium other than cards 60. For example, a game played by a player may be a game played using a game medium such as a model, a piece, and a tile, or a game medium having a shape like a go stone.

Figure 22:
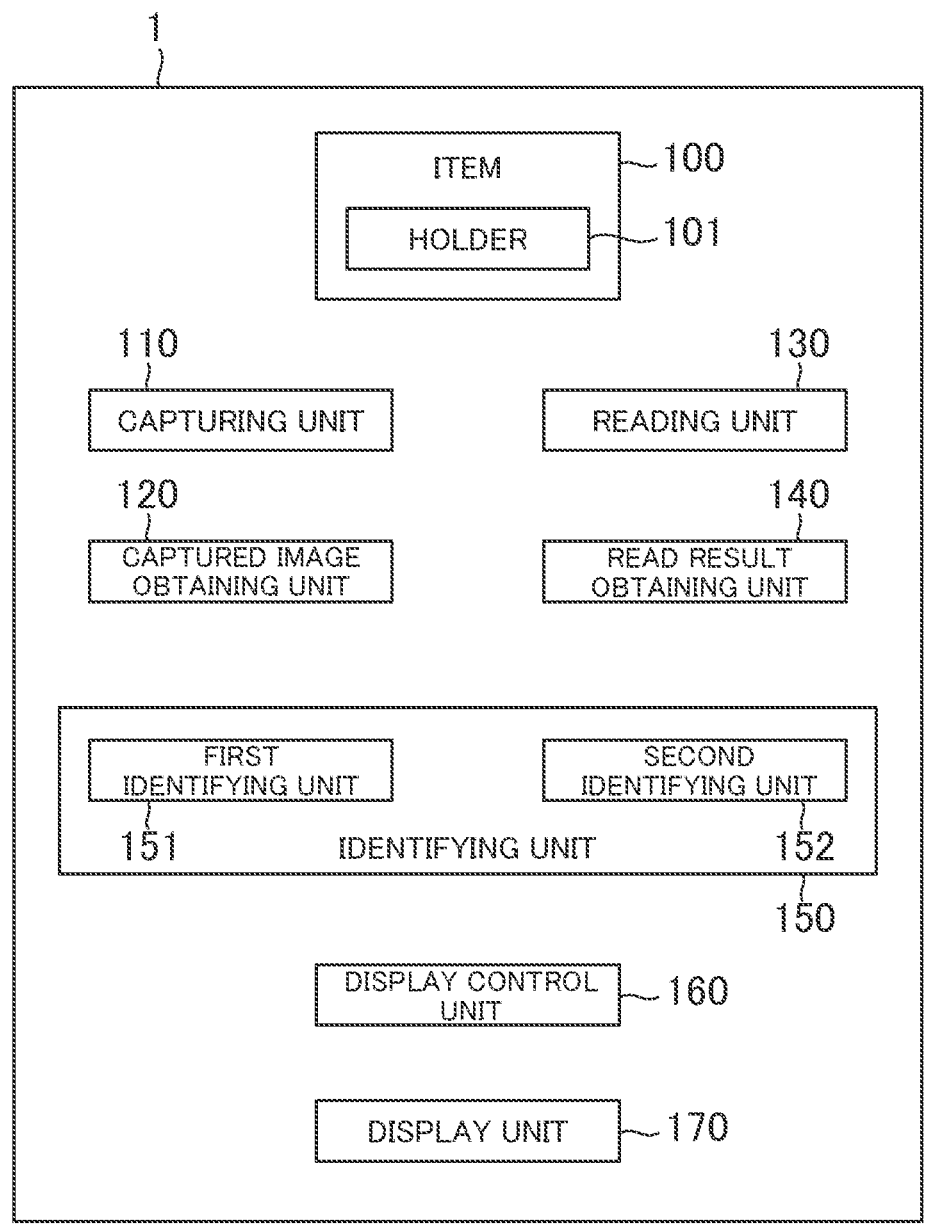
FIG. 22 is a functional block diagram showing functional elements of the system.

[1-6. Functional elements] The functional elements included in the system 1 will be described. FIG. 22 is a functional block diagram showing the functional elements included in the system 1.

[1-6-1] The system 1 relates to a game played with an item 100 placed on a surface, and includes functional elements related to the game.

The "game played with an item 100 placed on the surface" means, for example, a game that proceeds by placing the item 100 on the surface, and specifically, a game in which the type or state (e.g., position or orientation) of the item 100 placed on the surface affect the progress or outcome of the game (e.g., win or loss, success or failure, score). For example, a game in which two players play against each other by placing playing mediums on a game field corresponds to an example of the "game" described above. For example, a card game in which two players play against each other by placing cards 60 on the game field F as described above corresponds to an example of the "game played with item 100 placed on the surface."

The "game" described above is not limited to a game played by two players, but may also be a game played by three or more players, or a game played by a single player. The "game" may also be a game in which two or more players cooperate to achieve the goal.

The "surface (placing surface)" is a surface in the real world on which the item 100 is placed. For example, the "surface" is referred to as a "game field" or a "playing field." The "surface" may be a flat surface, or an uneven surface or a curved surface if the item 100 can be placed.

The item 100 is a real physical object to be placed on the surface and to be used in the game. For example, the item 100 is a physical object including a playing medium in a case. That is, the item 100 is a playing medium housed in a case. In other words, the item 100 is a case containing a playing medium. For example, the item 100 may be the playing medium itself (playing medium alone).

The "playing medium" may be, for example, a card, model, piece, and tile. The "playing medium" may be a physical object shaped like a go stone.

The "case" is a physical object that can contain an individual playing medium. In other words, the "case" is an object in which a playing medium is insertable. The "case" is used to protect the playing medium. The "case" is at least partially transparent so that at least the externally distinctive part of the contained playing medium (the part having externally distinctive features distinguished from other playing mediums) is visible from outside the case. For example, the "case" is a bag-shaped object and referred to as a "sleeve."

For example, item 100 includes a description surface on which information is written. The "description surface" is the surface that contains information about the item 100. For example, the information about the type of the item 100 is written on the description surface. In other words, the information specific to the type of the item 100 is written on the description surface. For example, a text or a pattern specific to the type of the item 100 is written on the description surface. The information written on the description surface may be information that can be identified from the type of the item 100.

For example, if the item 100 is a playing medium contained in a case (or a playing medium by itself), the information about the playing medium contained in the case is written on the description surface. For example, if the item 100 is a card contained in a sleeve (or a card by itself), the name of the card, attributes of the card, the effect on the progress or outcome of the game, or the pattern are written on the description surface.

The "description surface" is a surface from which the type of the item 100 can be identified if such a surface is captured in the captured image. In other words, the "description surface" is a surface on which content that can identify the type of the item 100 is described.

The information in "description surface" is not limited to information about the item 100, but may also be information about the game.

For example, the item 100 includes a first surface portion and a second surface portion that is different from the first surface portion. For example, the second surface portion is a surface on the opposite side of the first surface portion. The angle between the normal direction of the outer surface of the first surface portion and the normal direction of the outer surface of the second surface portion is 180 degrees or substantially 180 degrees. The first surface portion and the second surface portion relate to each other in a way that, if the item 100 is placed on the surface (e.g., game field or playing field) such that the outer surface of the first surface portion is in contact with the surface, the outer surface of the second surface portion faces upward, and if the item 100 is placed on the surface such that with the outer surface of the second surface portion is in contact with the surface, the outer surface of the first surface portion faces upward.

If the item 100 is a physical object formed of a playing medium contained in a case, the case contains the first surface portion and the second surface portion, and the playing medium contains a description surface. When the playing medium is not contained in the case, the inner surface of the first surface portion faces the inner surface of the second surface portion, and when the playing medium is contained in the case, the first surface portion (the inner surface of the first surface portion) faces the description surface of the playing medium. For example, all or part of the first surface portion is made of a transparent material (e.g., transparent film), and the first surface portion is configured so that the description surface of the playing medium contained in the case is visible from outside the case through the first surface portion. If the playing medium is a card, when the card is placed in the case, the inner surface of the first surface portion faces the first surface of the card (e.g., front side or description surface) and the inner surface of the second surface portion faces the second surface of the card (e.g., back side).

As shown in FIG. 22, the item 100 includes a holder 101. The holder 101 is used to hold identifying information as described below. For example, the holder 101 is provided on a surface different from the description surface described above. In other words, the item 100 includes the description surface described above and a holding surface, which is a surface provided with the holder 101.

For example, the identifying information is information for identifying the type or state of the item 100 placed on the surface. In other words, the identifying information is the basis for identifying at least one of the type and the state of the item 100 placed on the surface. In other words, the identifying information includes at least one of the information as the basis for identifying the type of the item 100 and the information as the basis of identifying the state of the item 100. The "information as the basis for identifying the type of the item 100" may be information that indicates the type of the item 100 itself (i.e., information that identifies the type of the item 100). Further, "the information as the basis for identifying the state of the item 100" may be information that indicates the state of the item 100 itself.

If the item 100 is a playing medium housed in a case (or a playing medium alone), the identifying information is information for identifying the type or state of the playing medium placed on the surface while being contained in the case. In other words, the identifying information includes at least one of the information as the basis for identifying the type of playing medium contained in the case (or playing medium alone) and the information as the basis for identifying the state of the playing medium contained in the case (or playing medium alone).

In a case where there is data that associates a case ID, which is information for uniquely identifying the case, with a playing medium ID, which is information for uniquely identifying the type of playing medium housed in the case, and the type of playing medium housed in the case can be identified based on the case ID, the case ID corresponds to an example of "information as the basis of identifying the type of playing medium housed in the case." The information for uniquely identifying the holder 101 may be used as the case ID. For example, if the holder 101 is an IC tag, the tag ID, which is information for uniquely identifying each IC tag, may be used as the case ID.

The information that indicates the type itself of playing medium contained in the case (i.e., information that identifies the type of playing medium) can also correspond to an example of "information as the basis of identifying the type of playing medium housed in the case." Specifically, the playing medium ID, which is the information for uniquely identifying the type of playing medium, can be an example of "information as the basis for identifying the type of playing medium housed in the case."

For example, the identifying information is information for identifying the information described on the description surface of the item 100 placed on the surface. In other words, the identifying information is information as the basis for identifying the information described on the description surface of the item 100 placed on the surface. For example, in a case where the information on the description surface can be identified if the information on the description surface is information related to the type of item 100 and the type of item 100 is identified, then the information as the basis for identifying the type of item corresponds to "the information as the basis for identifying the information described on the description surface of the item 100."

In the card game described above, the game field F (i.e., mat 12) corresponds to an example of "surface (placing surface)." The card 60 corresponds to an example of "playing medium" and the sleeve 70 corresponds to an example of "case." The card 60S, which is the card 60 housed in the sleeve including the IC tag 73, corresponds to an example of the item 100. The front portion 71 and the back portion 72 of the sleeve 70 correspond to examples of the "first surface portion" and the "second surface portion", respectively. Further, the front side 61 of the card 60S corresponds to an example of "description surface," and the inner surface of the back portion 72 of the sleeve 70 corresponds to an example of "holding surface."

The IC tag 73 of the card 60S corresponds to an example of the holder 101. The tag ID is an example of "identifying information held in the holder 101" (information as the basis for identifying the type of playing medium housed in the case). When the association processing shown in FIG. 12 is executed, the card ID written on the IC tag 73 corresponds to an example of "identifying information held in the holder 101" (information as the basis for identifying the type of playing medium housed in the case).

In the case of the variation shown in FIG. 20, the card 60S, which is the sleeve 70 containing the card 60 and the physical object 80 equipped with the IC tag 73, corresponds to an example of the item 100, and the IC tag 73 provided on the physical object 80 corresponds to an example of the holder 101. In the case of the variation where the card 60 itself includes the IC tag 73, the card 60 alone corresponds to an example of the item 100, and the IC tag 73 provided on the card 60 corresponds to an example of the holder 101.

[1-6-2] The system 1 includes a capturing unit 110, a captured image obtaining unit 120, a reading unit 130, a read result obtaining unit 140, an identifying unit 150, and a display control unit 160 as functional elements for identifying the type and state of the item 100 placed on the surface and for displaying the item 100 placed on the surface on the display unit 170.

[1-6-3] The capturing unit 110 captures the surface on which the item 100 is placed. For example, the capturing unit 110 captures the surface (e.g., game field or playing field) from above the surface. The capturing unit 110 may be capable of capturing the entire of the surface, or only the area of the surface where the item 100 may possibly be placed. In this embodiment, the capturing device 30 corresponds to the capturing unit 110.

[1-6-4] The reading unit 130 reads the information held in the holder 101 of the item 100 placed on the surface.

The item 100 includes a description surface on which information is written and a holding surface, which is a surface including the holder 101, and the reading unit 130 is capable of reading the information held in the holder 101 of the holding surface of the item that is placed on the surface (e.g., game field or playing field) with the description surface and the surface facing each other.

For example, the holder 101 is an IC tag, and the reading unit 130 reads the information stored in the IC tag. That is, the reading unit 130 includes one or more IC tag readers. For example, the reading unit 130 includes a plurality of IC tag readers installed at a plurality of positions respectively corresponding to a plurality of positions on the surface. Further, for example, the reading unit 130 includes an IC tag reader with antennas arranged to pass through a plurality of positions on the surface. In other words, the reading unit 130 includes a plurality of antennas that receive signals from the IC tag and are installed to respectively correspond to a plurality of positions on the surface so as to read information stored in the IC tag provided with the item 100. In this embodiment, the readers 20-1 to 20-30, which are installed to respectively correspond to the zones Z1 to Z30 of the game field F, correspond to the reading units 130. In the case of the variation shown in FIG. 21, the reader 20 including antennas (first antenna 21 and second antenna 22) arranged so as to pass through the plurality of positions in the game field F corresponds to the reading unit 130.

In the example of the card game described above, the IC tag 73 of the sleeve 70 corresponds to an example of the holder 101, the front side 61 of the card 60 housed in the sleeve 70 corresponds to an example of "description surface," and the inner surface of the back portion 72 of the sleeve 70 corresponds to an example of "holding surface."

In the example of the card game described above, the reading unit 130 reads the tag ID (an example of information for identifying the holder 101) stored in the IC tag 73 of the card 60S placed in the game field F.

When the association processing shown in FIG. 12 is executed, the card ID (an example of information for identifying the type of item 100) of the card 60S is stored in the IC tag 73 of the card 60S, and thus the reading unit 130 reads the card ID stored in the IC tag 73 of the card 60S placed in the game field F.

[1-6-5] The captured image obtaining unit 120 obtains a captured image of the capturing unit 110. The read result obtaining unit 140 obtains a reading result of the reading unit 130. The identifying unit 150 identifies the type and state of the item 100 placed on the surface based on the captured image of the capturing unit 110 and the read result of the reading unit 130. For example, the captured image obtaining unit 120, the read result obtaining unit 140, and the identifying unit 150 are implemented by the control unit 41 of the information processing device 40.

"Identify the type of the item 100" means to identify whether the item 100 placed on the surface is one of several types of item 100. In other words, one or more of the plurality of types of items 100 can be placed on the surface, and identifying whether at least one of the items 100 placed on the surface is one of the plurality of types of items 100 corresponds to "identify the type of the item 100." For example, each item 100 is assigned identification information that identifies the type of the item 100, and identifying the identification information of the item 100 placed on the surface corresponds to "identify the type of the item 100." If the item 100 is a playing medium housed in a case, identifying the type (identification information) of the playing medium housed in the case corresponds to "identify the type of the item 100."

"Identify the state of the item 100" includes, for example, identifying the position of the item 100 on the surface.

"Identify the state of the item 100" includes, for example, identifying how the item 100 is placed on the surface (identifying a placement format of the item 100). Specifically, identifying the orientation of the item 100 on the surface is an example of "identify the state of the item 100." The "orientation" of the item 100 is a direction in which a reference direction of item 100 is facing.

For example, if the item 100 is a rectangular object, the long side direction of the item 100 corresponds to an example of "reference direction." In this case, identifying which direction the long side of the item 100 is facing is an example of "identifying the orientation of item 100". For example, identifying whether the item 100 is placed such that the long side of the item 100 is facing the first direction or the second direction is an example of "identifying the orientation of the item 100." More specifically, identifying whether the item 100 is placed vertically (i.e., the item 100 appears vertical when viewed from a specific viewpoint, such as the player or the capturing unit 110) or laterally (i.e., the item 100 appears lateral when viewed from a specific viewpoint) is an example of "identifying the orientation of the item 100."

For example, the normal direction of a particular surface (e.g., surface) of the item 100 is an example of "reference direction." In this case, identifying which direction the normal direction of the specific surface (surface, etc.) of the card is facing is an example of "identifying the orientation of the item 100." For example, identifying whether the item 100 is placed with the normal direction facing the first direction or the normal direction facing the second direction is an example of "identifying the orientation of the item 100." More specifically, identifying whether the item 100 is placed with its front side facing up (the front side is visible from a specific viewpoint) or with its back side facing up (the back side is visible from a specific viewpoint: upside down) is an example of "identifying the orientation of the item 100."

For example, if the item 100 is a model (e.g., an action figure) housed in a case or a model alone, the front direction of the model is an example of the "reference direction." In this case, identifying which direction the front of the model is facing is an example of "identifying the orientation of the item 100."

If the item 100 is a playing medium housed in a case, identifying the state of the playing medium housed in the case corresponds to "identifying the state of the item 100."

The "state of the item 100" identified by the identifying unit 150 is a matter that can be included in the phrase "the state of the item 100" and that affects the progress or outcome of the game. In other words, the "state of item 100" identified by the identifying unit 150 is a matter that can be included in the phrase "the state of the item 100" and that is meaningful to the game progress or important to the viewer of the display unit 170.

For example, the identifying unit 150 identifies some of the matters related to the type and state of the item 100 placed on the surface based on the captured image of the capturing unit 110, and identifies other matters based on the read result of the reading unit 130.

[1-6-6] As shown in FIG. 22, the identifying unit 150 includes a first identifying unit 151 and a second identifying unit 152.

[1-6-6-1] The first identifying unit 151 identifies the position of the item 100 placed on the surface based on the captured image of the capturing unit 110. Further, the first identifying unit 151 identifies the orientation of the item 100 on the surface based on the captured image of the capturing unit 110.

For example, the first identifying unit 151 uses a learned model (a model for identifying the position and orientation of the item 100 captured in the captured image) generated by executing the machine learning based on the learning data including the captured image data of the surface on which the item 100 is placed and the correct answer data indicating the position and orientation of the item 100 so as to identify the position and orientation of the item 100 captured in the captured image, thereby identifying the position and orientation of the item 100 placed on the surface.

For example, the first identifying unit 151 may detect the item 100 from the captured image of the capturing unit 110 using an image analysis process so as to identify the position and orientation of the item 100 placed on the surface. That is, the first identifying unit 151 may detect the item 100 from the captured image based on the feature information of the appearance of the item 100 to identify the position and orientation of the item 100 in the captured image, thereby identifying the position and orientation of the item 100 placed on the surface.

In the case of the example of the card game described above, the first identifying unit 151 identifies the position of the card 60S based on the captured image of the capturing device 30. The first identifying unit 151 identifies the vertical and lateral orientation of the card 60S based on the captured image of the capturing device 30. Further, the first identifying unit 151 identifies the front and back orientation of the card 60S based on the captured image of the capturing device 30.

[1-6-6-2] The second identifying unit 152 identifies the position of the item 100 placed on the surface based on the read result of the reading unit 130. The second identifying unit 152 identifies the type of the item 100 placed on the surface based on the read result of the reading unit 130. The second identifying unit 152 identifies the information written on the description surface of the item 100 placed on the surface based on the read result of the reading unit 130. For example, the second identifying unit 152 identifies the information written on the description surface of the item 100 placed on the surface based on the identification result of the type of the item 100 placed on the surface.

The "read result of the reading unit 130" is the information read by the reading unit 130. The "read result of the reading unit 130" may be information on whether the information held in the holder 101 can be read.

In the case where the holder 101 is an IC tag and the reading unit 130 includes a plurality of antennas that receive signals from the IC tag and that are installed to respectively correspond to a plurality of positions on the surface, the "read result of the reading unit 130" may be the information on which of the plurality of antennas received the signal from the IC tag of the item placed on the surface. For example, if the reading unit 130 includes a plurality of IC tag readers installed at a plurality of positions respectively corresponding to a plurality of positions on the surface, "read result of the reading unit 130" may be information on which IC reader of the plurality of IC readers reads the information stored in the IC tag. For example, if the reading unit 130 includes an IC tag reader having an antenna arranged to pass through a plurality of positions on the surface, "read result of the reading unit 130" may be information on which part of the antenna receives the signal from the IC tag.

In the example of the card game described above, the information read by the reader 20 (the information stored in the IC tag 73) corresponds to an example of the "read result of the reading unit 130." The information on whether the reader 20 has read the information stored in the IC tag 73 also corresponds to an example of "read result of the reading unit 130." Further, the information on which of the readers 20-1 to 20-30 reads the information stored in the IC tag 73 (i.e., which of the readers 20-1 to 20-30 receives the signal from the IC tag 73) also corresponds to an example of "read result of the reading unit 130." In the case of the variation shown in FIG. 21, the information on which of the first antenna 21 and the second antenna 22 receives the signal from the IC tag 73 corresponds to an example of "read result of the reading unit 130."

In the example of the card game described above, the second identifying unit 152 identifies the position and type of the card 60S placed on the game field F based on the read result of the reader 20.

For example, the second identifying unit 152 identifies a position of a card 60S based on which reader 20 has read the information stored in an IC tag 73 of the card 60S. That is, the second identifying unit 152 identifies the position on the game field F corresponding to the position of the reader 20 that reads the information stored in the IC tag 73 of the card 60S (the reader 20 that has received the signal from the IC tag 73 of the card 60S) as the position of such a card 60S. For example, if the information stored in the IC tag 73 of the card 60S is read by the reader 20-10, the second identifying unit 152 identifies the zone Z10 associated with the reader 20-10 as the zone Z where the card 60S is placed.

In the case of the variation shown in FIG. 21, the second identifying unit 152 may identify the position of the card 60S based on which part of the antenna receives the signal from the IC tag 73 of the card 60S. That is, the second identifying unit 152 may identify the position on the game field F that corresponds to the part of the antenna that receives the signal from the IC tag 73 of the card 60S as the position of the card 60S. For example, the second identifying unit 152 may identify the zone Z including the intersection of the first antenna 21 and the second antenna 22 that have received signals from the IC tag 73 of the card 60S (i.e., the first antenna 21 and the second antenna 22 that have received the signals with the strongest strength) as the zone Z where the card 60S is placed.

The second identifying unit 152 identifies the type of the card 60S placed in the game field F based on the information read by the reader 20.

For example, when the association processing shown in FIG. 10 is executed, the association data D1 (FIG. 11), which associates the tag ID with the card ID, is stored in the storage unit 42. In this case, the second identifying unit 152 identifies the card ID associated with the tag ID read by the reader 20 based on the association data D1.

For example, when the association processing shown in FIG. 12 is executed, the card ID of the card 60S is stored in the IC tag 73 of the card 60S, and the card ID is read by the reading unit 130. In this case, the second identifying unit 152 obtains the card ID read by the reader 20.

[1-6-6-3] There may be a case in which a plurality of items 100 are placed on the surface. In this case, the identification result of the first identifying unit 151 for each of the items 100 based on the captured image of the capturing unit 110 is obtained. Similarly, the identification result of the second identifying unit 152 for each of the items 100 based on the read result of the reading unit 130 is obtained. In such a case, it is necessary to identify the combination of the identification result of the first identifying unit 151 and the identification result of the second identifying unit 152 for the same item 100 placed on the surface.

In this regard, the identification result of the first identifying unit 151 and the identification result of the second identifying unit 152 commonly include the identification result for a predetermined matter of the item 100. The identifying unit 150 matches the identification results for the predetermined matter commonly included in the identification result of the first identifying unit 151 and the identification result of the second identifying unit 152 so as to identify the combination of the identification result of the first identifying unit 151 and the identification result of the second identifying unit 152 for the same item 100 placed on the surface.

In this embodiment, the identification result for the position of the item 100 (an example of the predetermined matter) is commonly included in the identification result of the first identifying unit 151 and the identification result of the second identifying unit 152. As such, the identifying unit 150 identifies the combination of the identification result of the first identifying unit 151 and the identification result of the second identifying unit 152 for the same item 100 placed on the surface based on the position identified by the first identifying unit 151 and the position identified by the second identifying unit 152.

That is, the identifying unit 150 identifies the identification result of the first identifying unit 151 and the identification result of the second identifying unit 152 as the identification result for the same item 100 placed on the surface based on the comparison between the position identified by the first identifying unit 151 and the position identified by the second identifying unit 152.

In other words, if the position identified by the first identifying unit 151 corresponds to the position identified by the second identifying unit 152, the identifying unit 150 determines that the combination of the type identified by the first identifying unit 151 and the orientation identified by the second identifying unit 152 is the identification result for the same item 100 placed on the surface.

"If the position identified by the first identifying unit 151 corresponds to the position identified by the second identifying unit 152" is a case where the position identified by the first identifying unit 151 and the position identified by the second identifying unit 152 may be regarded as the same position. For example, in other words, the case may be where the position identified by the first identifying unit 151 and the position identified by the second identifying unit 152 correspond to the same area.

For example, in the example of the card game described above, the zones Z1 to Z30 (partial areas) are defined in the game field F as the areas for placing the cards 60S, and the readers 20-1 to 20-30 are installed to correspond to the zones Z1 to Z30. When a card 60S is placed in one of the zones Z, the captured image of the capturing device 30 is used to identify in which zone Z the card 60 is placed. In addition, the read result of reader 20 also identifies in which zone Z the card 60 is placed. In other words, the zone Z corresponding to the reader 20 that reads the information stored in the IC tag 73 of the card 60S is identified as the zone Z where the card 60S is placed. In such a case, "if the position identified by the first identifying unit 151 corresponds to the position identified by the second identifying unit 152" means that the zone Z identified from the captured image of the capturing device 30 is the same as the zone Z identified from the read result of the reader 20.

"If the position identified by the first identifying unit 151 corresponds to the position identified by the second identifying unit 152" may be a case where the distance between the position identified by the captured image of the capturing unit 110 and the position identified by the read result of the reading unit 130 is less than a threshold value.

[1-6-6-4] The second identifying unit 152 is capable of identifying a type of a card 60S (first card) placed on the game field F with other card 60S (second card) stacked on top of it based on the information read by the reading unit 130 from the IC tag 73 of the card 60S (first card). For example, as in the situation shown in FIG. 7, when the card set 600-1 is placed in the zone Z7, the second identifying unit 152 can identify a type of each of the cards 60S included in the card set 600-1 based on the information read by the reading unit 130 from an IC tags 73 of each of the cards 60S.

[1-6-7] The display control unit 160 displays an object corresponding to the item 100 placed on the surface on the display unit 170. For example, the display control unit 160 is implemented by at least one of the control unit 41 of the information processing device 40 or the control unit 51 of the display terminal device 50. The display unit 170 is implemented by at least one of the display unit 45 of the information processing device 40 or the display unit 55 of the display terminal device 50.

An "object" is to be displayed on the display unit 170. For example, the "object" is an object imitating the item 100. In other words, the "object" is an image of the item 100. The "object" may be an object (e.g., text, icon) that indicates the item 100's type, name, or effect on the progress and outcome of the game.

For example, the display control unit 160 displays an object corresponding to the type of the item 100 identified by the identifying unit 150 on the display unit 170 such that the state of the object corresponds to the state of the item 100 identified by the identifying unit 150. Specifically, the display control unit 160 displays the object corresponding to the type of the item 100 identified by the identifying unit 150 at a display position corresponding to the position (position on the surface) of the item 100 identified by the identifying unit 150. The display control unit 160 displays the object corresponding to the type of the item 100 identified by the identifying unit 150 in the orientation corresponding to the orientation of the item 100 identified by the identifying unit 150.

For example, the display control unit 160 displays the object corresponding to the type of the item 100 identified by the identifying unit 150 in the display unit 170 according to the state of the item 100 identified by the identifying unit 150.

Specifically, the display control unit 160 determines whether to display, in the display unit 170, the object corresponding to the type of the item 100 identified by the identifying unit 150 as an object corresponding to the item 100 in accordance with the state of the item 100 identified by the identifying unit 150.

In other words, the display control unit 160 determines whether the state of the item 100 identified by the identifying unit 150 is a predetermined state. If it is determined that the state of the item 100 identified by the identifying unit 150 is not the predetermined state, the display control unit 160 displays the object corresponding to the type of the item 100 identified by the identifying unit 150 on the display unit 170 as the object corresponding to the item 100. On the other hand, if it is determined that the state of the item 100 identified by the identifying unit 150 is the predetermined state, the display control unit 160 does not display the object corresponding to the type of the item 100 identified by the identifying unit 150 on display unit 170 as the object corresponding to item 100. In this case, the display control unit 160 displays an object regardless of the type of the item 100 identified by the identifying unit 150 on the display unit 170 as the object corresponding to item 100.

When the item 100 is placed on the surface such that the description surface described above (the surface on which the information is written) of the item 100 is facing the surface, the display control unit 160 displays a display according to the information written on the description surface of the item 100 identified by the identifying unit 150 (second identifying unit 152) on the display unit 170.

"The item 100 is placed on the surface such that the description surface is facing the surface" is the case where the item 100 is placed on the surface such that the description surface is not visible from the capturing unit 110.

For example, if the item 100 is a playing medium housed in a case, "the item 100 is placed on the surface such that the description surface is facing the surface" means that the item 100 is placed on the surface such that the description surface of the playing medium is facing the surface through the case. In other words, the item 100 is placed on the surface such that the description surface of the playing medium is in contact with the surface via the case.

If the item 100 is a playing medium alone, "the item 100 is placed on the surface such that the description surface is facing the surface" means the case where the item 100 (playing medium) is placed on the surface such that the description surface of the playing medium is in contact with the surface.

To "display a display according to the information written on the description surface on the display unit 170" means, for example, to display the information described on the description surface of item 100 on the display unit 170. In this case, all of the information on the description surface may be displayed on the display unit 170, or some of the information on the description surface may be displayed on the display unit 170.

Specifically, "display a display according to the information written on the description surface on the display unit 170" means to display an object imitating the description surface of the item 100 on the display unit 170. In other words, an object that is an image of the description surface of item 100 is displayed on the display unit 170.

For example, if the type of the item 100 or the content of the effect on the progress or outcome of the game is described in the description surface, "display a display according to the information written on the description surface on the display unit 170" may be to display text or a pattern indicating the type of the item 100 or the content of the effect on the progress or outcome of the game on the display unit 170. In this case, the way in which the display unit 170 displays the type of the item or the content of the effect on the progress or outcome of the game in a different way from the way indicated on the description surface.

For example, if the type of the item 100 is described in the description surface, "display a display according to the information written on the description surface on the display unit 170" may be to display text or a pattern indicating a matter that is not described in the description surface and is identified by the type of the item 100 (e.g., the effect of the item 100 on the progress or outcome of the game) on the display unit 170.

Further, "display a display according to the information written on the description surface on the display unit 170" may be to transmit data related to the display corresponding to the information described in the description surface to the other device so as to display the display corresponding to the information described in the description surface on the display unit 170 of the other device.

The display control unit 160 displays a display according to the information written on the description surface of the item 100 identified by the identifying unit 150 (second identifying unit 152) on the display unit 170 at least when the item 100 is placed on the surface such that the description surface is facing the surface.

In a case where the item 100 is placed on the surface such that the description surface and the surface do not face each other (i.e., in a case where the item 100 is placed on the surface with the description surface visible) as well, the display control unit 160 may display a display according to the information described on the description surface of the item 100 identified by the identifying unit 150 (the second identifying unit 152) on the display unit 170, or may display a display according to the information described on the description surface of the item 100 identified using a different identifying method on the display unit 170. For example, in a case where the item 100 is placed on the surface such that the description surface and the surface do not face each other (i.e., in a case where the item 100 is placed on the surface with the description surface visible), the information on the description surface of the item 100 may be read to display the display according to the read information on the display unit 170. For example, in a case where the item 100 is placed on the surface with the description surface captured in the captured image of the capturing unit 110, the information on the description surface of the item 100 may be identified from the captured image of the capturing unit 110, and the display according to the information thus identified may be displayed on the display unit 170.

If the item 100 is placed on the surface such that the description surface and the surface are facing each other and a predetermined operation is received for the object corresponding to the item 100, the display control unit 160 may display a display according to the information written on the description surface of the item 100 on the display unit 170.

The "predetermined operation" is, for example, an operation to specify (or select) an object. The "predetermined operation" may be an operation to identify one of the objects, or to identify the type, position, or orientation of the object. Based on such an operation, the object corresponding to the identified type, position, or orientation is identified. For example, based on such an operation, processing for displaying a display according to the information written on the description surface of the item 100 corresponding to the object on the display unit 170 is executed.

In the example of the card game described above, each of the parts PB-1 and PB-2 shown in FIG. 8 corresponds to an example of an "object", and the part PC shown in FIG. 9 corresponds to an example of a "display according to the information written on the description surface." In the example of the card game described above, the display control unit 160 displays the game field image G on the display unit 170.

For example, the display control unit 160 determines whether the orientation of the card 60S identified by the first identifying unit 151 is face-up or face-down.

If the orientation of the card 60S identified by the first identifying unit 151 is face-up, the display control unit 160 displays an image of the front side 61 of the card 60S as a part to be associated with the card 60S, such as part PB-2 shown in FIG. 8 (i.e., an image corresponding to the type of the card 60S identified by the second identifying unit 152) at the position in the game field image G corresponding to the position of the card 60S identified by the first identifying unit 151 or the second identifying unit 152.

On the other hand, if the orientation of the card 60S identified by the first identifying unit 151 is face-down, the display control unit 160 does not display the image of the front side 61 of the card 60S as a part to be associated with the card 60S, such as part PB-2 shown in FIG. 8 (i.e., the image corresponding to the type of the card 60S identified by the second identifying unit 152) but displays an image of the back side 62 of the card 60S as a part to be associated with the card 60S, such as part PB-1 shown in FIG. 8 (i.e., an image irrelevant to the type of the card 60S identified by the second identifying unit 152) at the position in the game field image G corresponding to the position of the card 60S identified by the first identifying unit 151 or the second identifying unit 152.

Further, in response to the specifying operation of the part associated with the card 60S placed face down, such as the part PB-1 shown in FIG. 8, the display control unit 160 displays the part PC indicating the front side 61 of the card 60S.

[2. Second embodiment] The second embodiment of the present invention will be described.

The second embodiment is different from the first embodiment in that the orientation (vertical and lateral orientation) of the card is identified based on the information stored in the IC tag. In the following, the differences from the first embodiment will be described. In the following, the same reference numerals will be used for the same elements in the first embodiment and the descriptions thereof will be omitted.

Figure 23:
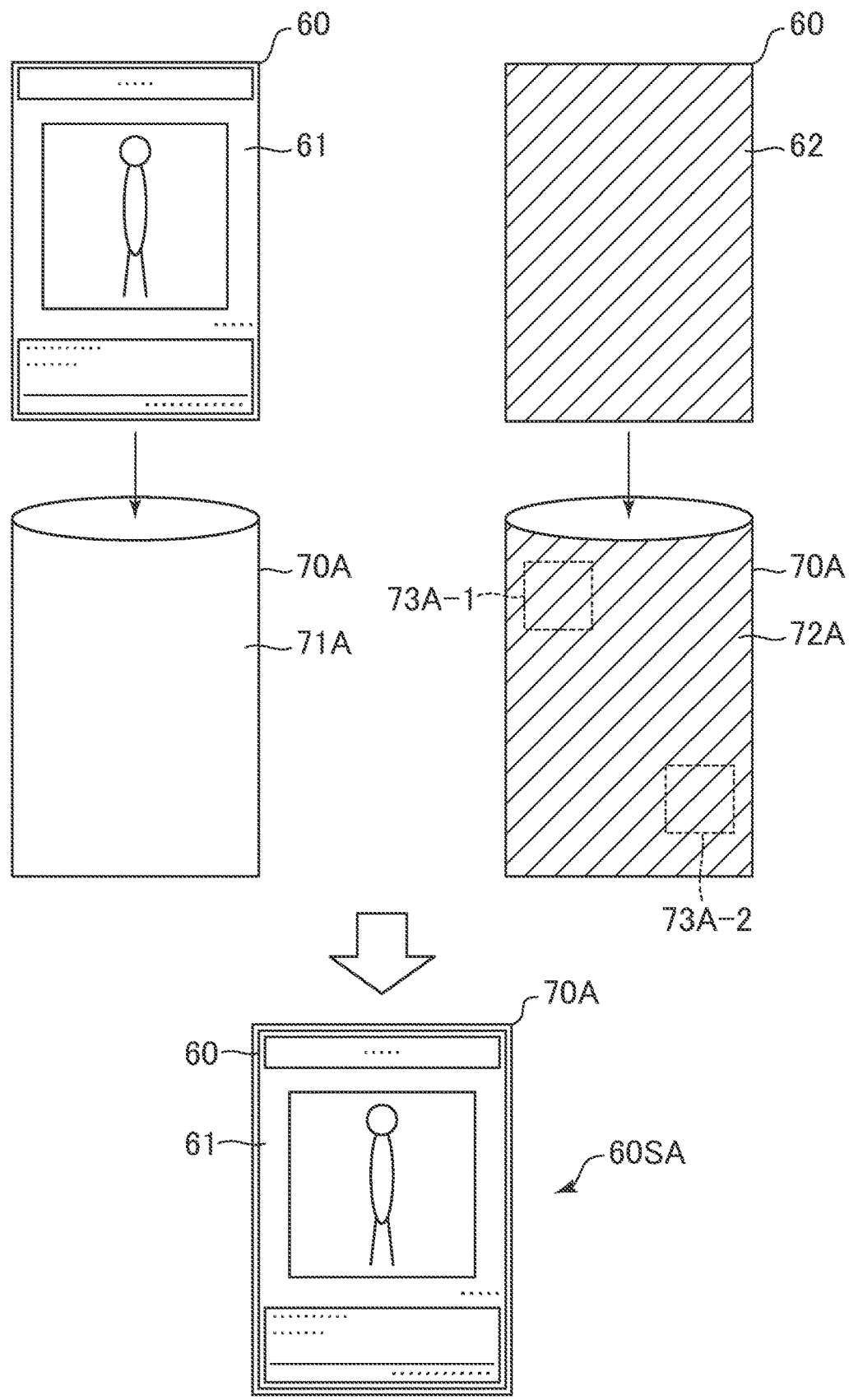
FIG. 23 is a diagram illustrating an example of a sleeve according to the second embodiment.

[2-1. Overview] FIG. 23 shows an example of the sleeve 70A of the second embodiment. Similarly to the sleeve 70 of the first embodiment, the front portion 71A of the sleeve 70A is transparent so that the front side 61 of the card 60 contained in the sleeve 70A is visible from outside the sleeve 70A. Further, similarly to the sleeve 70 of the first embodiment, the back portion 72A of the sleeve 70A is not transparent and all the sleeves 70A have the common appearance.

As shown in FIG. 23, the sleeve 70A includes a first IC tag 73A-1 and a second IC tag 73A-2. The first IC tag 73A-1 and the second IC tag 73A-2 are provided on the inner surface of the back portion 72A. For example, the first IC tag 73A-1 and the second IC tag 73A-2 are disposed on different positions in the inner surface of the back portion 72A. For example, the first IC tag 73A-1 and the second IC tag 73A-2 are positioned such that the difference in the first direction (e.g., the vertical direction) between their positions differs from the difference in the second direction (e.g., the lateral direction) between their positions.

The first IC tag 73A-1 stores a tag ID of the first tag 73A-1 and the second IC tag 73A-2 stores a tag ID of the second IC tag 73A-2. The first IC tag 73A-1 and the second IC tag 73A-2 are different IC tags, and thus these tag IDs are different from each other.

In the second embodiment, the card 60 is housed in the sleeve 70A as described above. In the following, the card 60 housed in the sleeve 70A is described as a "card 60SA" for convenience in order to be distinguished from the card 60 alone. In other words, when the card 60 is housed in the sleeve 70A, the card 60 and the sleeve 70A are regarded as a single physical object and described as "card 60SA."

In the second embodiment, in order to identify the positions of the first IC tag 73A-1 and the second IC tag 73A-2 of the card 60SA placed on the game field F, a reader 20 is installed and includes a plurality of antennas, which receive signals from each of the first IC tag 73A-1 and the second IC tag 73A-2 and correspond to a plurality of positions on the game field F. For example, in the second embodiment, as shown in FIG. 21, the reader 20 including a plurality of first antennas 21 and second antennas 22 is installed.

That is, if the card 60SA is placed on the game field F, the position of the first IC tag 73A-1 on the game field F can be identified by identifying a combination of the first antenna 21 and the second antenna 22 that have received the signal (ID tag of the first IC tag 73A-1) from the first IC tag 73A-1 (i.e., a combination of the first antenna 21 and the second antenna 22 that have received the strongest strength of the signal from the first IC tag 73A-1). For example, the intersection of the first antenna 21 and second antenna 22 that have received the signal from the first IC tag 73A-1 (i.e., the first antenna 21 and the second antenna 22 that have received the strongest strength of the signal) can be identified as the position of the first 73A-1 on the game field F.

Similarly, the position of the second IC tag 73A-2 on the game field F can be identified by identifying a combination of the first antenna 21 and the second antenna 22 that have received the signal (ID tag of the second IC tag 73A-2) from the second IC tag 73A-2 (i.e., a combination of the first antenna 21 and the second antenna 22 that have received the strongest strength of the signal from the second IC tag 73A-2).

Figure 24:
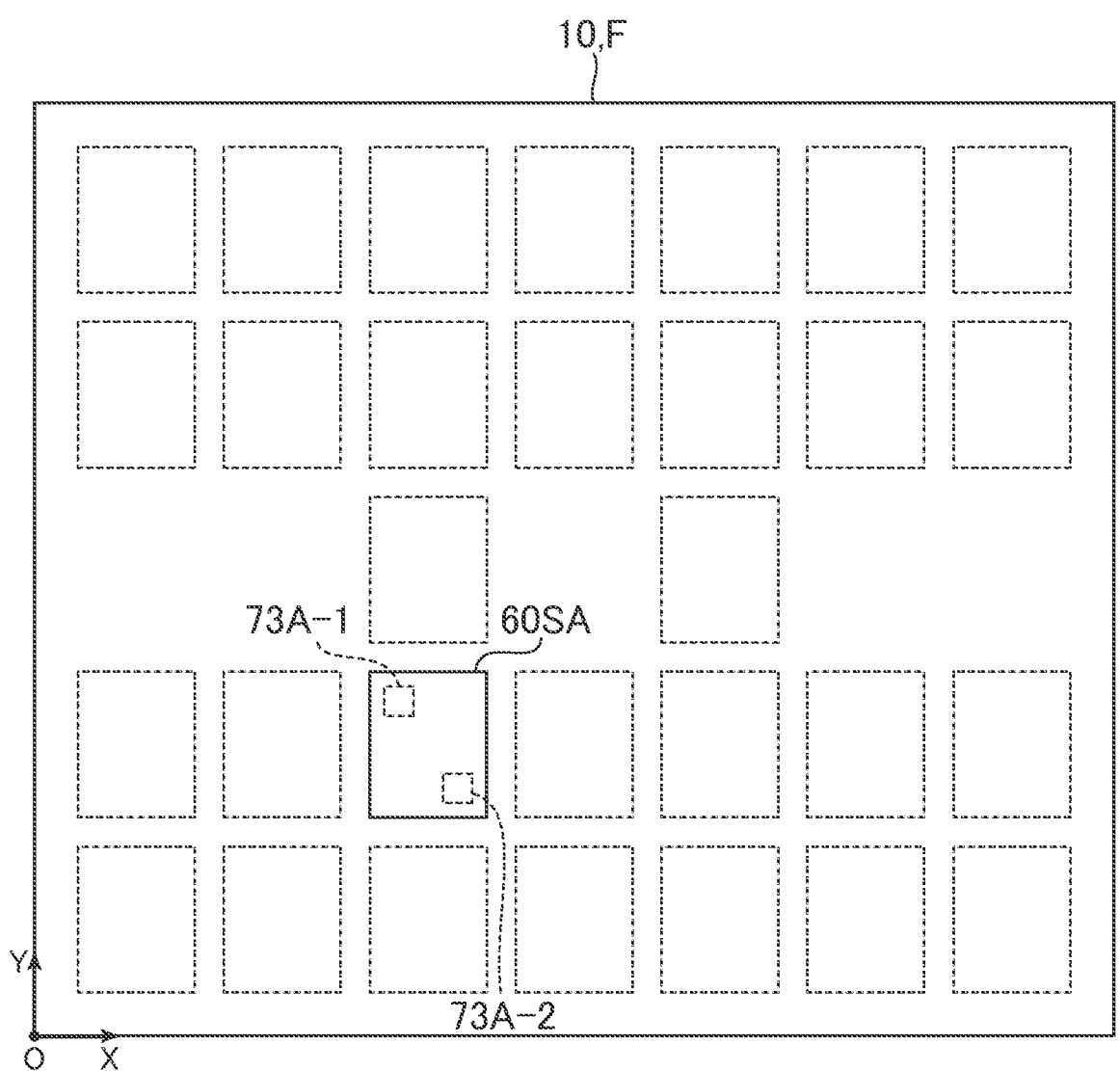
FIG. 24 is a diagram illustrating identifying an orientation of a card.
Figure 25:
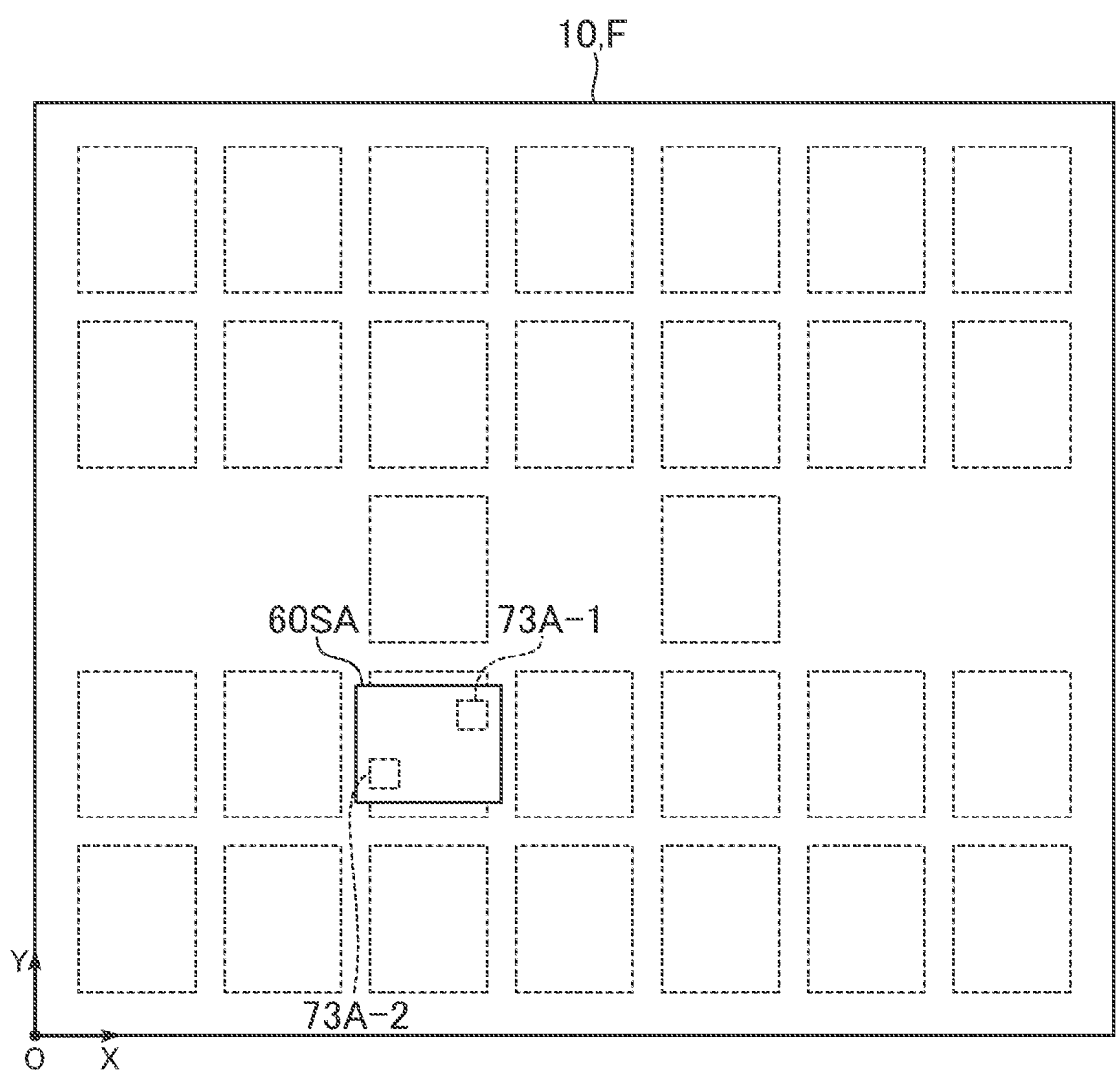
FIG. 25 is a diagram illustrating identifying an orientation of a card.

FIG. 24 shows a case where the card 60SA is placed on the game field F in the vertical orientation, and FIG. 25 shows a case where the card 60SA is placed on the game field F in the lateral orientation. Here, as shown in FIGS. 24 and 25, a coordinate system is assumed where a predetermined point (e.g., lower left point) on the game field F is set to the origin O, and the lateral direction of the game field F is the X-axis direction and the vertical direction of the game field F is the Y-axis direction. The position of the first IC tag 73A-1 on the game field F is (X1, Y1), and the position of the second IC tag 73A-2 on the game field F is (X2, Y2).

As shown in FIG. 24, if the card 60SA is placed in the vertical direction, the long side direction of the card 60SA is parallel (or substantially parallel) to the Y-axis direction, and the card 60SA is in a vertical state. In this case, the absolute value of the difference between Y1 and Y2 (|Y1−Y2|) is larger than the absolute value of the difference between X1 and X2 (|X1−X2|). As such, when the identified positions of the first IC tag 73A-1 and the second IC tag 73A-2 have a relationship of |Y1−Y2|>|X1−X2|, it can be identified that the card 60SA is placed in the vertical direction.

On the other hand, as shown in FIG. 25, if the card 60SA is placed in the lateral direction, the long side direction of the card 60SA is parallel (or substantially parallel) to the X-axis direction, and the card 60SA is in a lateral state. In this case, the absolute value of the difference between X1 and X2 (|X1−X2|) is larger than the absolute value of the difference between Y1 and Y2 (|Y1−Y2|). As such, when the identified positions of the first IC tag 73A-1 and the second IC tag 73A-2 are |X1−X2|>|Y1−Y2|, it can be identified that the card 60SA is placed in the lateral direction.

As described above, in the second embodiment, the positions of the first IC tag 73A-1 and the second IC tag 73A-2 can be identified based on the read result of the reader 20, and the vertical and lateral orientations of the card 60SA can be identified based on such positional relationship.

[2-2. Processing] The processing executed by the system 1A according to the second embodiment will be described.

[2-2-1] In the second embodiment as well, the association processing similar to the association processing shown in FIG. 10 is executed. In this regard, in step S404, the control unit 41 acquires each tag ID of the first IC tag 73A-1 and the second IC tag 73A-2, and in step S406, registers the tag IDs of the first IC tag 73A-1 and the second IC tag 73A-2 in the "tag ID" fields of the association data D1.

[2-2-2] In the second embodiment as well, the association processing similar to the association processing shown in FIG. 12 may be executed. In this regard, in step S424, the control unit 41 writes the card ID identified in step S422 to both the first IC tag 73A-1 and the second IC tag 73A-2.

[2-2-3] In the second embodiment as well, the identifying processing similar to the identifying processing shown in FIG. 13 is executed.

In the second embodiment, in step S432, the control unit 41 identifies the position and the front and back orientations of the card 60SA, and does not identify the vertical and lateral orientations of the card 60SA. In this case, the identification result in step S432 is registered in the first identification result data D2A. FIG. 26 shows an example of the first identification result data D2A in the second embodiment. As shown in FIG. 26, the first identification result data D2A includes "area ID" and "side flag" fields. The "area ID" and "side flag" fields are similar to the "area ID" and "side flag" fields of the first identification result data D2 in the first embodiment.

In the second embodiment, in step S436, the control unit 41 identifies the card ID, position, and vertical and lateral orientations of the card 60SA placed on the game field F.

For example, the control unit 41 refers to the association data D1 and identifies the card ID associated with the tag ID read from the first IC tag 73A-1 and the tag ID read from the second IC tag 73A-2.

If the tag ID read from the first IC tag 73A-1 and the ID tag read from the second IC tag 73A-2 are associated with the same card ID, the control unit 41 assumes that the first IC tag 73A-1 and the second IC tag 73A-2 are provided to the same card 60SA. The control unit 41 then executes the processing described below regarding the first IC tag 73A-1 and the second IC tag 73A-2 provided to the same card 60SA.

That is, the control unit 41 identifies a combination of the first antenna 21 and the second antenna 22 that have received the signal (tag ID) from the first tag 73A-1 (i.e., a combination of the first antenna 21 and the second antenna 22 that have received the strongest strength of the signal from the first IC tag 73A-1), thereby identifying the position of the first IC tag 73A-1 on the game field F.

Similarly, the control unit 41 identifies a combination of the first antenna 21 and the second antenna 22 that have received the signal (tag ID) from the second tag 73A-2 (i.e., a combination of the first antenna 21 and the second antenna 22 that have received the strongest strength of the signal from the second IC tag 73A-2), thereby identifying the position of the second IC tag 73A-2 on the game field F.

The control unit 41 then identifies the midpoint between the position of the first IC tag 73A-1 and the position of the second IC tag 73A-2 as the position of the card 60SA and determines in which zone Z the identified position is included, thereby identifying the zone Z in which the card 60SA is placed.

Further, the control unit 41 identifies the vertical and lateral orientations of the card 60SA based on the positional relationship between the position of the first IC tag 73A-1 and the position of the second IC tag 73A-2.

For example, if the difference between the position of the first IC tag 73A-1 and the position of the second IC tag 73A-2 in the vertical direction (|Y2−Y1|) is greater than the difference in the lateral direction (|X2−X1|), the control unit 41 determines that the card 60SA is placed vertically. On the other hand, if the difference between the position of the first IC tag 73A-1 and the position of the second IC tag 73A-2 in the vertical direction (|Y2−Y1|) is smaller than the difference in the lateral direction (|X2−X1|), the control unit 41 determines that the card 60SA is placed laterally.

In the second embodiment, the identification result in step S436 is registered in the second identification result data D3A. FIG. 27 shows an example of the second identification result data D3A. As shown in FIG. 27, the second identification result data D3A includes "zone ID," "card ID," and "orientation flag" fields. The zone ID field is the same as the zone ID field of the game field status data D4 in the first embodiment. The "card ID" field is the same as the "card ID" field of the second identification result data D3 in the first embodiment. The "orientation flag" field is the same as the "orientation flag" field of the first identification result D2 in the first embodiment.

In the second embodiment, in step S438, the control unit generates game field status data D4 based on the first identification result data D2A and the second identification result data D3A. The game field status data D4 is the same as in the first embodiment. The processing in step S438 is the same as step S438 in the first embodiment except that the orientation flag registered in the "orientation flag" field of the second identification result data D3A is registered in the "orientation flag" field of the game field status data D4.

[2-2-4] In the second embodiment as well, the display control processing shown in FIG. 18 and the processing shown in FIG. 19 are executed.

[2-3. Advantage] According to the second embodiment, the vertical and lateral orientations of the card 60SA placed on the game field F can be identified based on the read result of the reader 20.

[2-4. Variation] A variation of the second embodiment will be described.

[2-4-1] In the embodiment described above, the positions to dispose the first IC tag 73A-1 and the second IC tag 73A-2 are not limited to the examples shown in FIG. 23. If the positions of the first IC tag 73A-1 and the second IC tag 73A-2 of the card 60SA placed on the game field F can be identified, the installation positions of the first IC tag 73A-1 and the second IC tag 73A-2 may be set so as to have a positional relationship such that the vertical and lateral orientations of the card 60SA can be identified from the positional relationship.

For example, the first IC tag 73A-1 may be placed at the upper left position on the back portion 72A, and the second IC tag 73A-2 may be placed at the upper right position on the back portion 72A. Further, for example, the first IC tag 73A-1 may be placed at the upper left position on the back portion 72A, and the second IC tag 73A-2 may be placed at the lower left position on the back portion 72A.

[2-4-2] In addition to the first IC tag 73A-1 and the second IC tag 73A-2, one or more IC tags may be installed in the back portion 72A. That is, three or more IC tags may be installed in the back portion 72A, the vertical and lateral orientations of the card 60SA may be identified based on the positional relation between the three or more IC tags.

[2-4-3] In the second embodiment as well, the control unit 41 may identify the vertical and lateral orientations of the card 60SA in step S432. That is, the control unit 41 may identify the vertical and lateral orientations of the card 60SA from the captured image of the capturing device 30 and also from the read result of the reader 20. In this case, the identification result of the vertical and lateral orientations obtained from the captured image of capturing device 30 and the identification result of the vertical and lateral directions obtained from the read result of the reader 20 may be compared to improve the accuracy of the identification result of the vertical and lateral directions.

[2-4-4] In the embodiment described above, the sleeve 70A (back portion 72A) includes the first IC tag 70A-1 and the second IC tag 70A-2, although a sheet-like object housed in the sleeve 70A together with the card 60, such as a physical object 80 shown in FIG. 20, may include the first IC tag 70A-1 and the second IC tag 70A-2. In this case, the seat-like object and the card 60 housed in the sleeve 70A correspond to the card 60SA.

[2-4-5] The card 60 itself (e.g., back side 62) may include the first IC tag 70A-1 and the second IC tag 70A-2.

Figure 28:
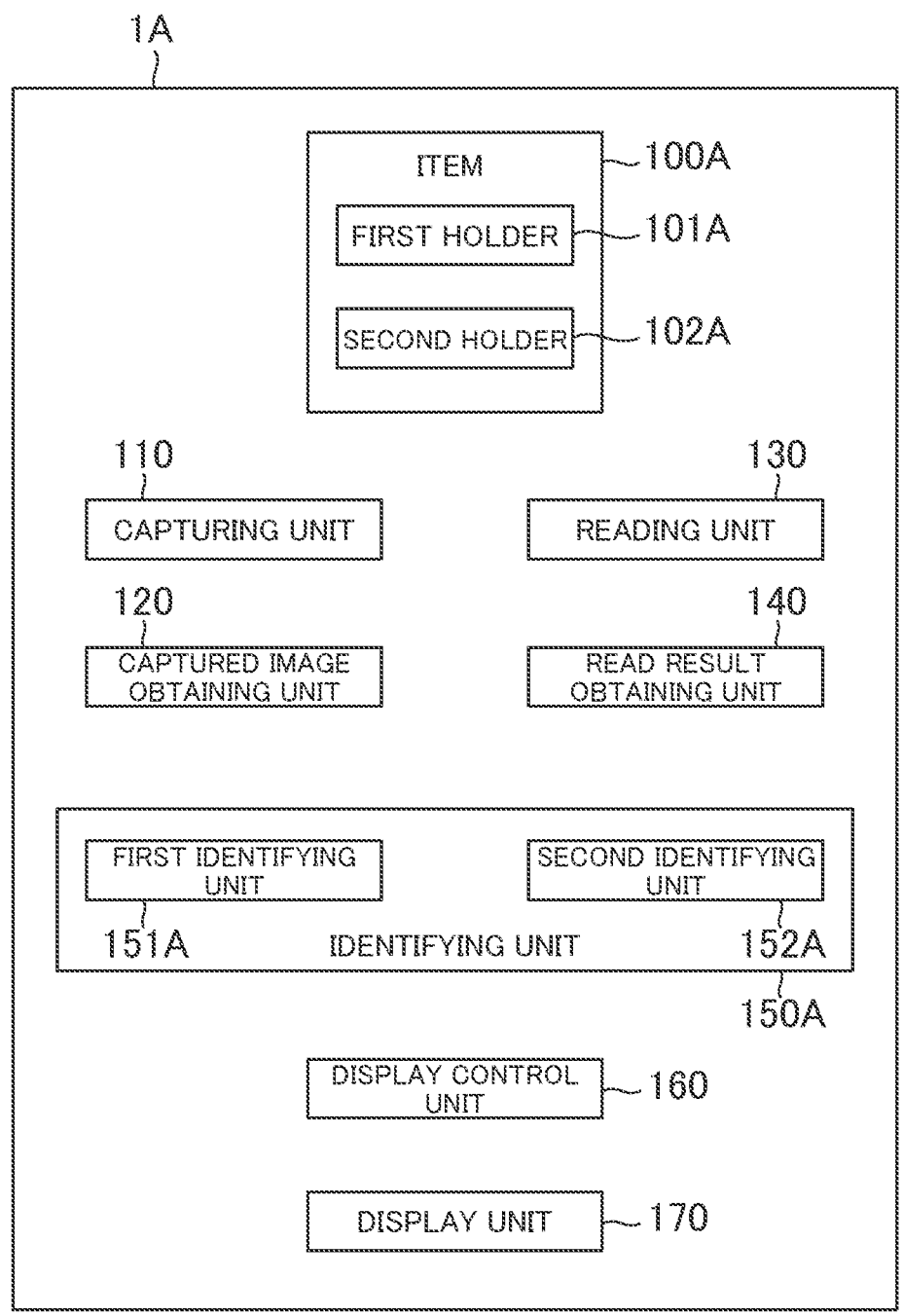
FIG. 28 is a functional block diagram showing functional elements of the system according to the second embodiment.

[2-5. Functional elements] FIG. 28 is a functional block diagram for showing functional elements included in the system LA according to the second embodiment. In FIG. 28, the functional elements the same as those in the first embodiment, such as a capturing unit 110, a captured image obtaining unit 120, a reading unit 130, a read result obtaining unit 140, a display control unit 160, and a display unit 170, are denoted by the same reference numerals as those in FIG. 22, and descriptions of these functional elements will be omitted and an item 100A and an identifying unit 150A will be described. The explanation of the wording that overlaps with the first embodiment is also omitted.

[2-5-1] First, an item 100A will be described. Here, the difference between the item 100A and the item 100 in first embodiment will be described.

The item 100A includes a first holder 101A and a second holder 102A, which is provided so as to have a predetermined positional relationship with the first holder 101A. The first holder 101A and the second holder 102A have a positional relationship such that, if the positions of the first holder 101A and the second holder 102A of the item 100A placed on the surface can be identified, the orientation of the item 100A can be identified from their positions. For example, the positions of the first holder 101A and the second holder 102A are determined such that the positional relationship between the first holder 101A and the second holder 102A on the surface is a first positional relationship when the item 100A in a first orientation is placed on the surface, and the positional relationship between the first holder 101A and the second holder 102A on the surface is a second positional relationship different from the first positional relationship when the item 100A is placed on the surface in a second orientation different from the first orientation.

Identifying information for identifying the type or state of the item 100A placed on the surface is stored in the first holder 101A and the second holder 102A. The information stored in the first holder 101A and the second holder 102A is read by the reading unit 130. In this embodiment, the first IC tag 73A-1 corresponds to the first holder 101A, and the second IC tag 73A-2 corresponds to the second holder 102A.

[2-5-2] The identifying unit 150A will be described. The identifying unit 150A includes a first identifying unit 151A and a second identifying unit 152A.

The first identifying unit 151A identifies the position and orientation of the item 100A based on a captured image of the capturing unit 110. For example, the first identifying unit 151A identifies the position and the front and back sides of the item 100A in the same manner as the first identifying unit 151 in the first embodiment.

The second identifying unit 152A identifies the position, type, and orientation of the item 100A based on the read result of the reading unit 130.

The second identifying unit 152A identifies the type of the item 100A in the same manner as the second identifying unit 152 in the first embodiment.

As described above, in the second embodiment, the reading unit 130 includes a plurality of antennas (a plurality of first antennas 21 and a plurality of second antennas 22), which receive signals from the first holder 101A (first IC tag 73A-1) and the second holder 102A (second IC tag 73A-2) and are installed so as to correspond to a plurality of positions on the game field F.

The second identifying unit 152A identifies the position and orientation of the item 100A placed on the surface based on which of the antennas has received the signals transmitted from the first holder 101A (first IC tag 73A-1) and the second holder 102A (second IC tag 73A-2) of the item 100A placed on the surface.

The first holder 101A and the second holder 102A include different information and the signals transmitted from the first holder 101A and the second holder 102A include different information so as to distinguish the signal received by the antennas is transmitted from the first holder 101A or the second holder 102A. For example, identification information (tag ID of first IC tag 73A-1) of the first holder 101A is stored in the first holder 101A (first IC tag 73A-1), and identification information (tag ID of second IC tag 73A-2) of the second holder 102A is stored in the second holder 102A (second IC tag 73A-2).

[2-5-3] In the example of the card game described above, the card 60SA corresponds to the item 100A. In the variation in which the card 60 itself includes the first IC tag 73A-1 and the second IC tag 73A-2, the card 60 alone corresponds to the item 100A.

The second identifying unit 152A identifies a combination of the first antenna 21 and the second antenna 22 that have received the signal (the tag ID of first IC tag 73A-1) from the first IC tag 73A-1 of the card 60SA placed on the game field F (i.e., a combination of the first antenna 21 and the second antenna 22 that have received the strongest strength of the signal from the first IC tag 73A-1), thereby identifying the position of the first IC tag 73A-1 on the game field F. Similarly, the second identifying unit 152A identifies a combination of the first antenna 21 and the second antenna 22 that have received the signal (the tag ID of second IC tag 73A-2) from the second IC tag 73A-2 of the card 60SA placed on the game field F (i.e., a combination of the first antenna 21 and the second antenna 22 that have received the strongest strength of the signal from the second IC tag 73A-2), thereby identifying the position of the second IC tag 73A-2 on the game field F. Then, second identifying unit 152A identifies the vertical and lateral orientations of the card 60SA based on the positional relationship between the first IC tag 73A-1 and the second IC tag 73A-2 on the game field F.

As described above, in the second embodiment, the positions of the first IC tag 73A-1 and the second IC tag 73A-2 on the game field F are identified based on the tag ID of the first IC tag 73A-1 stored in the first IC tag 73A-1 and the tag ID of the second IC tag 73A-2 stored in the second IC tag 73A-2, and the vertical and lateral directions of the card 60SA are identified based on the positional relationship between the first IC tag 73A-1 and the second IC tag 73A-2 on the game field F. As such, the tag ID of the first IC tag 73A-1 and the tag ID of the second IC tag 73A-2 correspond to "information as the basis of identifying the state of the item 100A."

[3. Third embodiment] The third embodiment of the present invention will be described.

The third embodiment is different from the first embodiment in that the orientation of a card (front and back sides) is identified based on information stored in the IC tag. In the following, the differences from the first embodiment will be described. In the following, the same elements as the first embodiment elements will be denoted the same reference numeral and the description thereof will be omitted.

Figure 29:
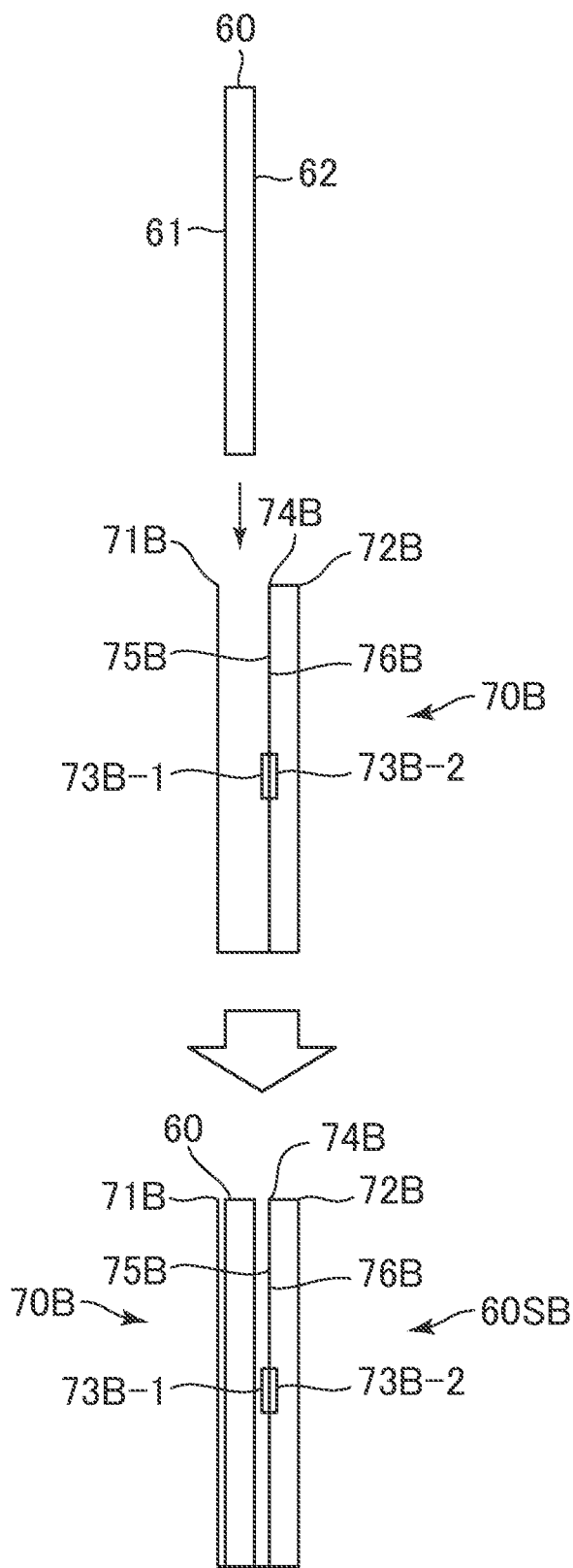
FIG. 29 is a diagram illustrating an example of a sleeve according to the third embodiment.

[3-1. Overview] FIG. 29 shows an example of the sleeve 70B of the third embodiment. FIG. 29 shows a cross-sectional view of the sleeve 70B viewed from the side. Similarly to the sleeve 70 of the first embodiment, the front portion 71B of the sleeve 70B is transparent so that the front side 61 of the card 60 contained in the sleeve 70B is visible from outside the sleeve 70B. Further, similarly to the sleeve 70 of the first embodiment, the back portion 72B of the sleeve 70B is not transparent and all the sleeves 70B have the common appearance.

As shown in FIG. 29, the sleeve 70B includes a first IC tag 73B-1, a second IC tag 73B-2, and a blocking surface portion 74B. For example, the blocking surface portion 74B has the same or substantially the same shape and size as the back portion 72B of the sleeve 70B. The upper end and the lower end of the blocking surface portion 74B are connected to the upper end and the lower end of the back portion 72B, and the blocking surface portion 74B is fixed to the sleeve 70B.

A first surface 75B of the blocking surface portion 74B faces the front portion 71B of the sleeve 70B. The first surface 75B includes the first IC tag 73B-1. As such, the first IC tags 73B-1 faces the front portion 71B of the sleeve 70B. A second surface 76B of the blocking surface portion 74B faces the back portion 72B of the sleeve 70B. The second surface 76B includes the second IC tag 73B-2. As such, the second IC tags 73B-2 faces the back portion 72B of the sleeve 70B.

The first IC tag 73B-1 stores a tag ID of the first tag 73B-1 and the second IC tag 73B-2 stores a tag ID of the second IC tag 73B-2. The first IC tag 73B-1 and the second IC tag 73B-2 are different IC tags, and thus these tag IDs are different from each other.

The blocking surface portion 74B is formed of a material that interferes with signals between the first IC tag 73B-1 and the second IC tag 73B-2 and the reader 20 (e.g., magnetic material). As such, the signal from the second surface 76B (back portion 72B) to the first IC tag 73B-1 and the signal from the first IC tag 73B-1 to the second surface 76B (back portion 72B) are blocked by the blocking surface portion 74B. Similarly, the signal from the first surface 75B (front portion 71B) to the second IC tag 73B-2 and the signal from the second IC tag 73B-2 to the first surface 75B (front portion 71B) are blocked by the blocking surface portion 74B.

The card 60 is accommodated in the space between the front portion 71B and the blocking surface 74B of the sleeve 70B. In the following, the card 60 housed in the sleeve 70B is described as a "card 60SB" for convenience in order to be distinguished from the card 60 alone. In other words, when the card 60 is housed in the sleeve 70B, the card 60 and the sleeve 70B are regarded as a single physical object and described as "card 60SB."

If the card 60SB is placed in the zone Z by face up, the card 60SB is placed such that the back portion 72B of the card 60SB and the game field F are in contact with each other. In this case, the transmission and reception of signals between the reader 20 below the zone Z and the first IC tag 73B-1 are blocked by the blocking surface portion 74B (e.g., magnetic material), and thus the information (e.g., tag ID) stored in the first IC tag 73B-1 is not read by the reader 20. As a result, the information is read by the reader 20 only from the second IC tag 73B-2.

On the other hand, if the card 60SB is placed in the zone Z by face down, the card 60SB is placed such that the front portion 71B of the card 60SB and the game field F are in contact with each other. In this case, the transmission and reception of signals between the reader 20 under the zone Z and the second IC tag 73B-2 are blocked by the blocking surface portion 74B (e.g., magnetic material), and thus the tag ID stored in the second IC tag 73B-2 is not read by the reader 20. As a result, the information (e.g., tag ID) is read by the reader 20 only from the first IC tag 73B-1.

If the card 60SB is placed face up in this manner, the information is read by the reader 20 only from the second IC tag 73B-2. Similarly, if the card 60SB is placed face down, the information is read by the reader 20 only from the first IC tag 73B-1. As such, the front and back sides of the card 60SB can be identified based on from which of the first IC tag 73B-1 and the second IC tag 73B-2 the stored information is read.

[3-2. Processing] The processing executed by the system 1B according to the third embodiment will be described.

Figure 30:
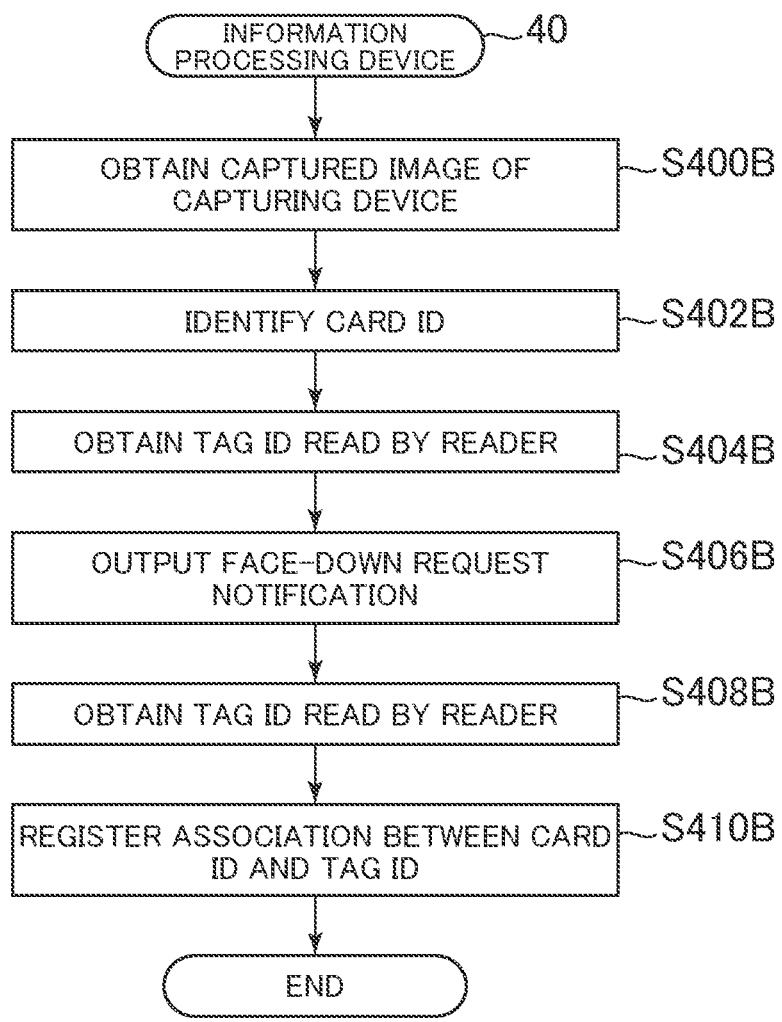
FIG. 30 is a diagram illustrating an example of association processing according to the third embodiment.

[3-2-1] FIG. 30 shows an example of the association processing of the third embodiment. In the third embodiment, the association processing shown in FIG. 30 is executed instead of the association processing shown in FIG. 10.

For example, a player places a card 60SB from his or her deck in a predetermined zone Z in the game field F, such as the zone Z11, in a vertical and face up orientation. In this condition, the association processing shown in FIG. 30 is executed.

As shown in FIG. 30, the control unit 41 of the information processing device 40 obtains a captured image of the capturing device 30 (S400B). The control unit 41 then identifies a card ID of a card 60SB in the captured image (S402B). The steps S400B and S402B are the same as the steps S400 and S402 in FIG. 10.

The control unit 41 also obtains a tag ID read by the reader 20 (S404B). If the card 60SB is placed face up, a tag ID stored in the second IC tag 73B-2 is read by the reader 20, and the read tag ID is supplied to the information processing device 40. The control unit 41 obtains the tag ID supplied in this way.

After the step S404B is executed, the control unit 41 outputs a face-down request notification that requests the player to put the card 60SB face down (S406B). For example, the control unit 41 displays an image indicating the face-down request notification on the display unit 45. Alternatively, the control unit 41 outputs sound indicating the face-down request notification from the audio output unit 46.

In response to the face-down request notification, the player turns over the card 60SB placed in the zone Z to put such a card 60SB face down. In this state, the processing from S408B onward is executed.

That is, the control unit 41 obtains the tag ID read by the reader 20 (S408B). If the card 60SB is placed face down, a tag ID stored in the first IC tag 73B-1 is read by the reader 20, and the read tag ID is supplied to the information processing device 40. The control unit 41 obtains the tag ID supplied in this way.

The control unit 41 registers the association between the card ID identified in the step S402B and the tag ID obtained in the steps S404B and S408B in the association data D1B (S410B).

FIG. 31 shows an example of the association data D1B. As shown in FIG. 31, the association data D1B includes "card ID" and "tag ID" fields. The "card ID" field is similar to the "card ID" field of the association data D1 in the first embodiment. The "tag ID" field includes "face up" and "face down" fields as subfields. The "face up" field is used to register a tag ID obtained when a card 60SB is placed face up (i.e., a tag ID of the second IC tag 73B-2). The "face down" field is used to register a tag ID obtained when a card 60SB is placed face down (i.e., a tag ID of the first IC tag 73B-1).

In step S410B, the control unit 41 adds a new record to the association data D1B, registers the card ID identified in the step S402B in the "card ID" field, registers the tag ID obtained in the step S404B in the "face up" field, and registers the tag ID obtained in the step S408B in the "face down" field.

After step S410B is executed, a completion notification indicating that the association processing is completed is output, and the player removes the card 60SB placed in the zone Z, and places the next card 60SB from his or her deck in the zone Z in the vertical and face up orientation. In this state, the association processing shown in FIG. 30 is executed again.

The association processing shown in FIG. 30 is executed for each card 60SB included in the deck of the first player, and the information of all the cards 60SB included in the deck of the first player is thereby registered in the association data D1B. The association processing shown in FIG. 30 is also executed for each card 60SB included in the deck of the second player, and the information of all the cards 60SB included in the deck of the second player is thereby registered in the association data D1B.

Figure 32:
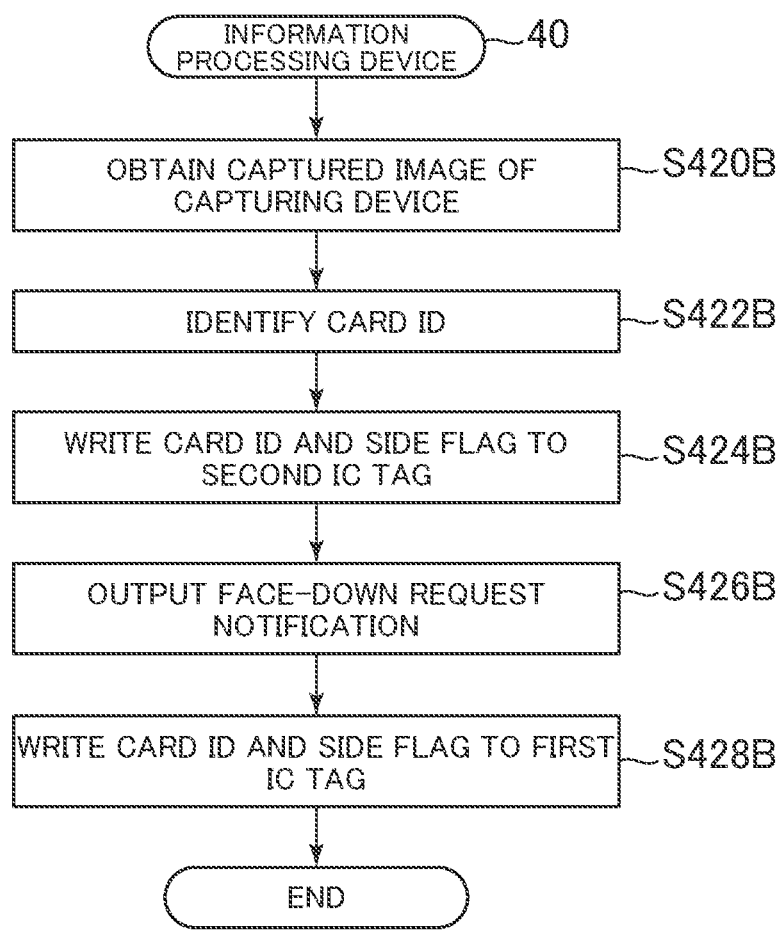
FIG. 32 is a diagram illustrating another example of association processing according to the third embodiment.

[3-2-2] FIG. 32 shows another example of the association processing of the third embodiment. The association processing shown in FIG. 32 may be executed instead of the association processing shown in FIG. 30.

The association processing shown in FIG. 32 is based on the assumption that an IC tag writer for writing information to the first IC tag 73B-1 and the second IC tag 73B-2 is installed under the zone Z. In the following, a case will be described in which the reader 20 is an IC tag reader/writer having both functions of an IC tag reader and an IC tag writer.

As shown in FIG. 32, the control unit 41 obtains a captured image of the capturing device 30 (S420B). The control unit 41 then identifies a card ID of a card 60SB in the captured image (S422B). The processing of steps S420B and S422B is the same as that of steps S400 and S402 in FIG. 10.

After step S422B is executed, the control unit 41 writes the card ID identified in step S422B and the side flag to the second IC tag 73B-2 of the card 60SB placed in the zone Z (S424B).

The side flag indicates whether the card 60SB is placed face up or face down. For example, a value "0" or "1" is set as a side flag. The value "0" indicates that the card 60SB is placed face up, and the value "1" indicates that the card 60SB is placed face down. In step S424B, the value "0" indicating face up is written as a side flag.

The control unit 41 sends a write instruction of the card ID identified in step S422B and the side flag (0) to the reader 20 (IC-tag reader/writer) placed under the zone Z. In response to the write instruction, the reader 20 writes the card ID and the side flag (0) to the second IC tag 73B-2 of the card 60SB placed in the zone Z. In this case, the transmission and reception of signals between the first IC tag 73B-1 and the reader 20 are blocked by the blocking surface portion 74B (e.g., magnetic material), and thus writing to the first IC tag 73B-1 is not performed at this point.

After step S424B is executed, the control unit 41 outputs a face-down request notification that requests the player to put the card 60SB face down (S426B). The processing of step S426B is the same as that of step S406B in FIG. 30.

In response to the face-down request notification, the player turns over the card 60SB placed in the zone Z to put such a card 60SB face down. In this state, the processing of S428B is executed.

That is, the control unit 41 writes the card ID identified in step S422B and the side flag to the first IC tag 73B-1 of the card 60SB placed in the zone Z (S428B). In this case, the value "1" indicating face down is written as a side flag.

Specifically, the control unit 41 sends a write instruction of the card ID identified in step S422B and the side flag (1) to the reader 20 (IC-tag reader/writer) placed under the zone Z. In response to the write instruction, the reader 20 writes the card ID and the side flag (1) to the first IC tag 73B-1 of the card 60SB placed in the zone Z. In this case, the transmission and reception of signals between the second IC tag 73B-2 and the reader 20 are blocked by the blocking surface portion 74B (e.g., magnetic material), and thus writing to the second IC tag 73B-2 is not performed at this point.

After step S428B is executed, a completion notification indicating that the association processing is completed is output, and the player removes the card 60SB placed in the zone Z, and places the next card 60SB from his or her deck in the zone Z in the vertical and face up orientation. In this state, the association processing shown in FIG. 32 is executed again.

The association processing shown in FIG. 32 is executed for each card 60SB included in the deck of the first player, and a card ID and a side flag are thereby stored in a first IC tag 73B-1 and a second IC tag 73B-2 of each card 60SB included in the deck of the first player. Further, the association processing shown in FIG. 32 is also executed for each card 60SB included in the deck of the second player, and a card ID and a side flag are thereby stored in a first IC tag 73B-1 and a second IC tag 73B-2 of each card 60SB included in the deck of the second player.

[3-2-3] In the third embodiment as well, the identifying processing similar to the identifying processing shown in FIG. 13 is executed. Here, referring to FIG. 13, the identifying processing of the third embodiment will be described. Here, assume that the association data D1B shown in FIG. 31 is stored in the storage unit 42.

In the third embodiment, in step S432, the control unit 41 identifies the position and the vertical and lateral orientations of the card 60SB, and does not identify the front and back orientations of the card 60SB. In this case, the identification result in step S432 is registered in the first identification result data D2B.

FIG. 33 shows an example of the first identification result data D2B. As shown in FIG. 33, the first identification result data D2B includes "area ID" and "orientation flag" fields. The "area ID" and "orientation flag" fields are similar to the "area ID" and "orientation flag" fields of the first identification result data D2 in the first embodiment.

In the third embodiment, in step S436, the control unit 41 identifies the card ID, position, and front and back orientations of the card 60SB placed on the game field F.

For example, if the card 60SB is placed in the zone Z10 face up, the tag ID stored in the second IC tag 73B-2 is read by the reader 20-10 and supplied to the information processing device 40 as the read result data of the reader 20-10. In this case, the transmission and reception of signals between the first IC tag 73B-1 and the reader 20-10 are blocked by the blocking surface portion 74B, and thus the tag ID stored in the first IC tag 73B-1 is not read by the reader 20-10.

The control unit 41 identifies the card ID and the front and back orientations of the card 60SB based on the tag ID read by the reader 20-10. How to identify the card ID is basically the same as step S436 of the first embodiment except that the association data D1B is referred to instead of the association data D1.

The control unit 41 refers to the association data D1B and determines whether the tag ID read by the reader 20-10 is registered in "face up" or "face down" field. If the tag ID read by the reader 20-10 is registered in the "face up" field, the control unit 41 identifies that the card 60SB is face up. On the other hand, if the tag ID read by the reader 20-10 is registered in the "face down" field, the control unit 41 identifies that the card 60SB is face down.

In this case, the identification result in step S426 is registered in the second identification result data D3B. FIG. shows an example of the second identification result data D3B. As shown in FIG. 34, the second identification result data D3B includes "reader ID," "card ID", and "side flag" fields. The "reader ID" and "card ID" fields are the same as the "reader ID" and "card ID" fields of the second identification result data D3 in the first embodiment, and the "side flag" field is the same as the "side flag" field of the first identification result data D2 in the first embodiment.

For example, if the tag ID is read by the reader 20-10, the control unit 41 registers the card ID and the front and back orientations identified from such a tag ID in the "card ID" and "side flag" fields of the record of the reader ID "R10."

The above description is based on a precondition that the association data D1B shown in FIG. 31 is stored in the storage unit 42 by the association processing shown in FIG. 30. In this regard, if the card ID and the side flag are stored in the first IC tag 73B-1 and the second IC tag 73B-2 of the card 60SB by the association processing shown in FIG. 32, the card ID and the side flag are read by the reader 20-10, and thus, in step S436, the control unit 41 registers the card ID and side flag read by the reader 20-10 in the "card ID" and "side flag" fields of the record of reader ID "R10."

In the third embodiment, in step S438, the control unit 41 generates game field status data D4 based on the first identification result data D2B and the second identification result data D3B. The game field status data D4 is the same as in the first embodiment. The processing in step S438 in this case is the same as step S438 in the first embodiment except that the side flag registered in the "side flag" field of the second identification result data D3B is registered in the "side flag" field of the game field status data D4.

In the state shown in FIG. 7, a card set 600-1 (i.e., a plurality of cards 60SB piled face down) is placed in the zone Z7. In this regard, in the third embodiment, only the ID tag stored in the first IC tag 73B-1 of the lowest card 60SB in the card set 600-1 is read due to the blocking surface portion 74B. As a result, only the card ID of the lowest card 60SB in the card set 600-1 placed in the zone Z7 is registered in the record of the reader ID "R7" of the second identification result data D3B and the "card ID" field of the record of the zone ID "Z7" of the game field status data D4. The same applies to the zones Z1, Z15, and Z21.

[3-2-4] In the third embodiment as well, the display control processing shown in FIG. 18 and the processing shown in FIG. 19 are executed. However, in the parts PA-1 to PA-4 of the game field image G in the third embodiment, a numerical value indicating the number of cards 60SB included in the card sets 600-1 to 600-4 is not displayed.

[3-3. Effect] According to the third embodiment, the front and back sides of the card 60SB placed on the game field F is identified based on the read result of the reader 20.

In the third embodiment, if the card 60SB is placed face up, it is necessary to ensure that the information stored in the first IC tag 73B-1 is not read by the reader 20, and if the card 60SB is placed face down, it is necessary to ensure that the information stored in the second IC tag 73B-2 is not read by the reader 20.

For example, if the distance between the first IC tag 73B-1 and the reader 20 when the card 60SB is placed face up increases (i.e., if the distance is increased enough to the extent that the information stored in the first IC tag 73B-1 is not to be read by the reader 20), and the distance between the second IC tag 73B-2 and the reader 20 when the card 60SB is placed face down also increases (i.e., if the distance is increased enough to the extent that the information stored in the second IC tag 73B-2 is not read by the reader 20), there is no particular need to do something to ensure the above matters. However, the card 60 and the sleeve 70 are thin and the distance does not increase, and thus it is necessary to perform procedures to ensure the above matters. In this regard, in the third embodiment, the above ensuring procedures are performed by providing the blocking surface portion 74B in the sleeve 70B.

[3-4. Variation] A variation of the third embodiment will be described.

[3-4-1] In the embodiment described above, the second IC tag 73B-2 is installed on the second surface 76B of the blocking surface portion 74B, although the second IC tag 73B-2 may be installed on the inner surface of the back portion 72B of the sleeve 70B.

[3-4-2] In the embodiment described above, the blocking surface portion 74B is fixed to the sleeve 70B, although the blocking surface portion 74B may be a sheet-like object housed in the sleeve 70B together with the card 60, such as the physical object 80 shown in FIG. 20.

[3-4-3] In the embodiment described above, the blocking surface portion 74B is formed of a magnetic material, although the blocking surface portion 74B may be formed of a material other than a magnetic material. Any material can be employed for the blocking surface portion 74B if the material prevents transmission and reception of signals between the first IC tag 73B-1 and the reader 20 through the back portion 72B of the sleeve 70B or prevents transmission and reception of signals between the second IC tag 73B-2 and the reader 20 through the front portion 71A of the sleeve 70B.

[3-4-4] In the third embodiment as well, the control unit 41 may identify the front and back sides of the card 60SB in step S422. That is, the control unit 41 may identify the front and back sides of the card 60SB from the captured image of the capturing device 30 and also identify the front and back sides of the card 60SB from the read result of the reader 20. In this case, the identification result of the front and back sides obtained from the captured image of the capturing device 30 may be compared with the identification result of the front and back sides obtained from the read result of the reader 20 so as to improve the accuracy of identification result of the front and back sides.

Figure 35:
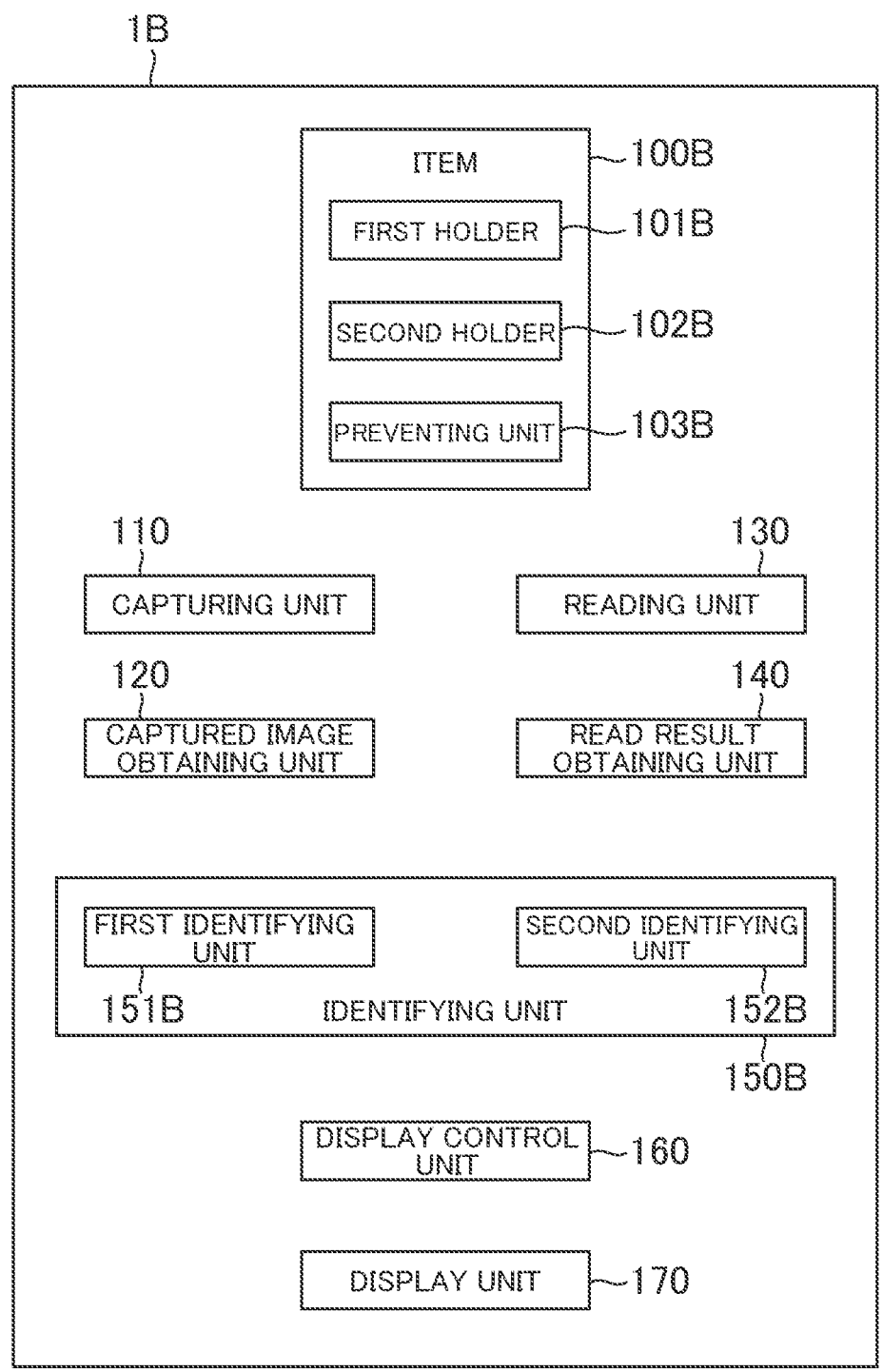
FIG. 35 is a functional block diagram showing functional elements of the system according to the third embodiment.

[3-5. Functional elements] FIG. 35 is a functional block diagram for explaining functional elements included in the system 1B according to the third embodiment. In FIG. 35, the functional elements the same as those in the first embodiment, such as a capturing unit 110, a captured image obtaining unit 120, a reading unit 130, a read result obtaining unit 140, a display control unit 160, and a display unit 170, are denoted by the same reference numerals as those in FIG. 22, and descriptions of these functional elements will be omitted and an item 100B and an identifying unit 150B will be described. The explanation of the wording that overlaps with the first embodiment is also omitted.

[3-5-1] First, an item 100B will be described. Here, the difference between the item 100B and the item 100 in first embodiment will be described.

The item 100B includes a first surface portion and a second surface portion. The first surface portion and the second surface portion are the same as the first surface portion and the second surface portion described as being included in the item 100 of the first embodiment.

The item 100B also includes a first holder 101B and second holder 102B. The first holder 101B and the second holder 102B have identifying information for identifying the type and state of the item 100B placed on the surface. In this case, the identifying information includes information as the basis for identifying the type of the item 100B and information as the basis for identifying the state of the item 100B. If the item 100B is a physical object that is a playing medium housed in a case, the information as the basis for identifying the type or state of the playing medium housed in the case and placed on the surface corresponds to "the information as the basis for identifying the type or the state of the item 100B."

The information held in the first holder 101B and the information held in the second holder 102B are read by reading unit 130. In order to distinguish whether the information read by the reading unit 130 is held in the first holder 101B or the second holder 102B, the first holder 101B and the second holder 102B include different information. For example, the identification information of the first holder 101B is held in the first holder 101B, the identification information of the second holder 102B is held in the second holder 102B. In the third embodiment, the front and back sides of the item 100B are identified based on the different information held in each of the first holder 101B and the second holder 102B, and thus the different information corresponds to "information as the basis for identifying the state of the item 100B."

Further, the item 100B includes a preventing unit 103B. The preventing unit 103B prevents the reading unit 130 from reading the information held in the second first holder 101B through the second surface portion of the item 100B, and prevents the reading unit 130 from reading the information held in the second holder 102B through the first surface portion of item 100B.

For example, the first holder 101B is a first IC tag installed so as to communicate with the reading unit 130 (IC tag reader) through the first surface portion of the item 100B. In other words, the first holder 101B is a first IC tag that is restricted from communicating with the reading unit 130 (IC tag reader) through the second surface portion of the item 100B.

Further, the first second holder 102B is a second IC tag installed so as to communicate with the reading unit 130 (IC tag reader) through the second surface portion of the item 100B. In other words, the second holder 102B is a second IC tag that is restricted from communicating with the reading unit 130 (IC tag reader) through the first surface portion of the item 100B.

The first IC tag is disposed so as to face the first surface portion of the item 100B. Alternatively, the first IC tag is disposed on the inner surface of the first surface portion of the item 100B. Further, the first IC tag is disposed closer to the first surface portion of the item 100B than the second IC tag. The second IC tag is disposed so as to face the second surface portion of the item 100B. Alternatively, the second IC tag is disposed on the inner surface of the second surface portion of the item 100B. Further, the second IC tag is disposed closer to the second surface portion of the item 100B than the first IC tag.

The first IC tag is disposed between the first surface portion of the item 100B and the preventing unit 103B, and the second IC tag is disposed between the second surface portion of the item 100B and the preventing unit 103B. The preventing unit 103B prevents the communication between the reader 20, which is for reading information held in the first IC tag or the second IC tag, and the first IC tag through the second surface portion of item 100B, and prevents the communication between the reader 20 and the second IC tag through the first surface portion of the item 100B.

For example, the preventing unit 103B includes a magnetic material provided between the first IC tag and the second surface portion of the item 100B. The preventing unit 103B includes a magnetic material provided between the second IC tag and the first surface portion of the item 100B. In other words, the preventing unit 103B includes a magnetic material provided between the first IC tag and the second IC tag. Any material can be employed for the preventing unit 103B if a signal (radio wave) from the first IC tag through the second surface portion of the item 100B can be blocked or a signal (radio wave) from the second IC tag through the first surface portion of the item 100B can be blocked.

[3-5-2] The identifying unit 150B will be described. The identifying unit 150B includes a first identifying unit 151B and a second identifying unit 152B.

The first identifying unit 151B identifies the position and orientation of the item 100B based on a captured image of the capturing device 30. For example, the first identifying unit 151B identifies the position and the vertical and lateral orientations of the item 100B in the same manner as the first identifying unit 151 in the first embodiment.

The second identifying unit 152B identifies the position, type, and orientation of the item 100B based on the read result of the reader 20. The second identifying unit 152B identifies the position and type of the item 100B in the same manner as the second identifying unit 152 in the first embodiment.

The second identifying unit 152B also identifies the front and back sides of the item 100B. That is, the second identifying unit 152B identifies whether the first surface portion and the second surface portion of the item 100B is placed on the surface so as to face the surface based on the read result of the reader 20 regarding the information stored in the first holder 101B (first IC tag) or the second holder 102B (second IC tag).

For example, if the information stored in the first holder 101B (first IC tag) is read by the reading unit 130, the second identifying unit 152B determines that the first surface portion of the item 100B faces the reading unit 130. For example, if the reading unit 130 is disposed under the surface, the second identifying unit 152B determines that the first surface portion of the item 100B faces the surface. If the reading unit 130 is disposed above the surface, the second identifying unit 152B determines that the second surface portion of the item 100B faces the surface.

On the other hand, if the information stored in the second holder 102B (second IC tag) is read by the reading unit 130, the second identifying unit 152B determines that the second surface portion of the item 100B faces the reading unit 130. For example, if the reading unit 130 is disposed under the surface, the second identifying unit 152B determines that the second surface portion of the item 100B faces the surface. If the reading unit 130 is disposed above the surface, the second identifying unit 152B determines that the first surface portion of the item 100B faces the surface.

[3-5-3] In the example of the card game described above, the card 60SB corresponds to an example of the item 100B. The front portion 71B and the back portion 72B of the sleeve 70B respectively correspond to examples of "first surface portion" and "second surface portion." The first IC tag 73B-1 and the second IC tag 73A-2 of the sleeve 70B respectively correspond to examples of the first holder 101B (first IC tag) and the second holder 102B (second IC tag). The blocking surface portion 74B of the sleeve 70B corresponds to an example of the preventing unit 103B.

For example, if the information stored in the first IC tag 73B-1 of the card 60SB is read by the reader 20, the second identifying unit 152B identifies that the card face is placed face down. On the other hand, if the information stored in the second IC tag 73B-2 of the card 60SB is read by the reader 20, the second identifying unit 152B identifies that the card face is placed face up.

[4. Fourth embodiment] The fourth embodiment of the present invention will be described.

The fourth embodiment is different from the first embodiment in that a code printed on the sleeve with invisible ink is read to identify the type or state of the card. In the following, the differences from the first embodiment will be described. In the following, the same elements as the first embodiment elements will be denoted the same reference numeral and the description thereof will be omitted.

Figure 36:
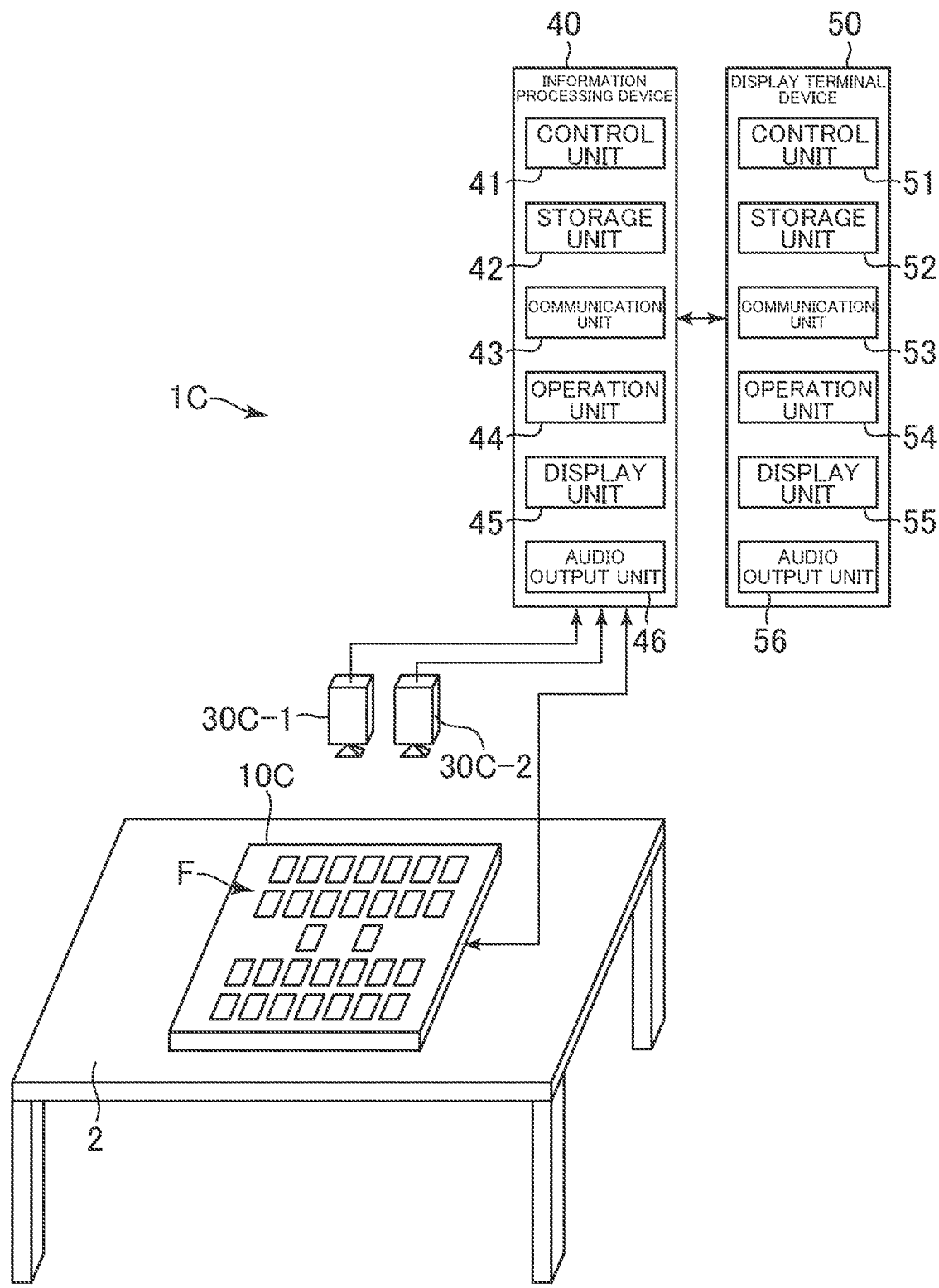
FIG. 36 shows an example of a configuration of a system according to the fourth embodiment.

[4-1. Overview] FIG. 36 shows a configuration of a system 1C according to the fourth embodiment. As shown in FIG. 36, the system 1C includes a game board 10C, a first capturing device 30 C-1, a second capturing device 30 C-2, an information processing device 40, and a display terminal device 50. The information processing device 40 and the display terminal device 50 are the same as those in the first embodiment.

The game board 10C is basically the same as the game board 10 in the first embodiment except that the game board 10C does not include the reader 20 (IC tag reader).

The first capturing device 30 C-1 corresponds to the capturing device 30 in the first embodiment and is a visible light camera. The second capturing device 30C-2 is an invisible light camera (e.g., infrared-ray camera). The second capturing device 30C-2 is used to read a code printed with invisible ink. "Invisible ink" is ink (e.g., infrared ink) recognizable by an image sensor by irradiating invisible light (e.g., infrared light).

Figure 37:
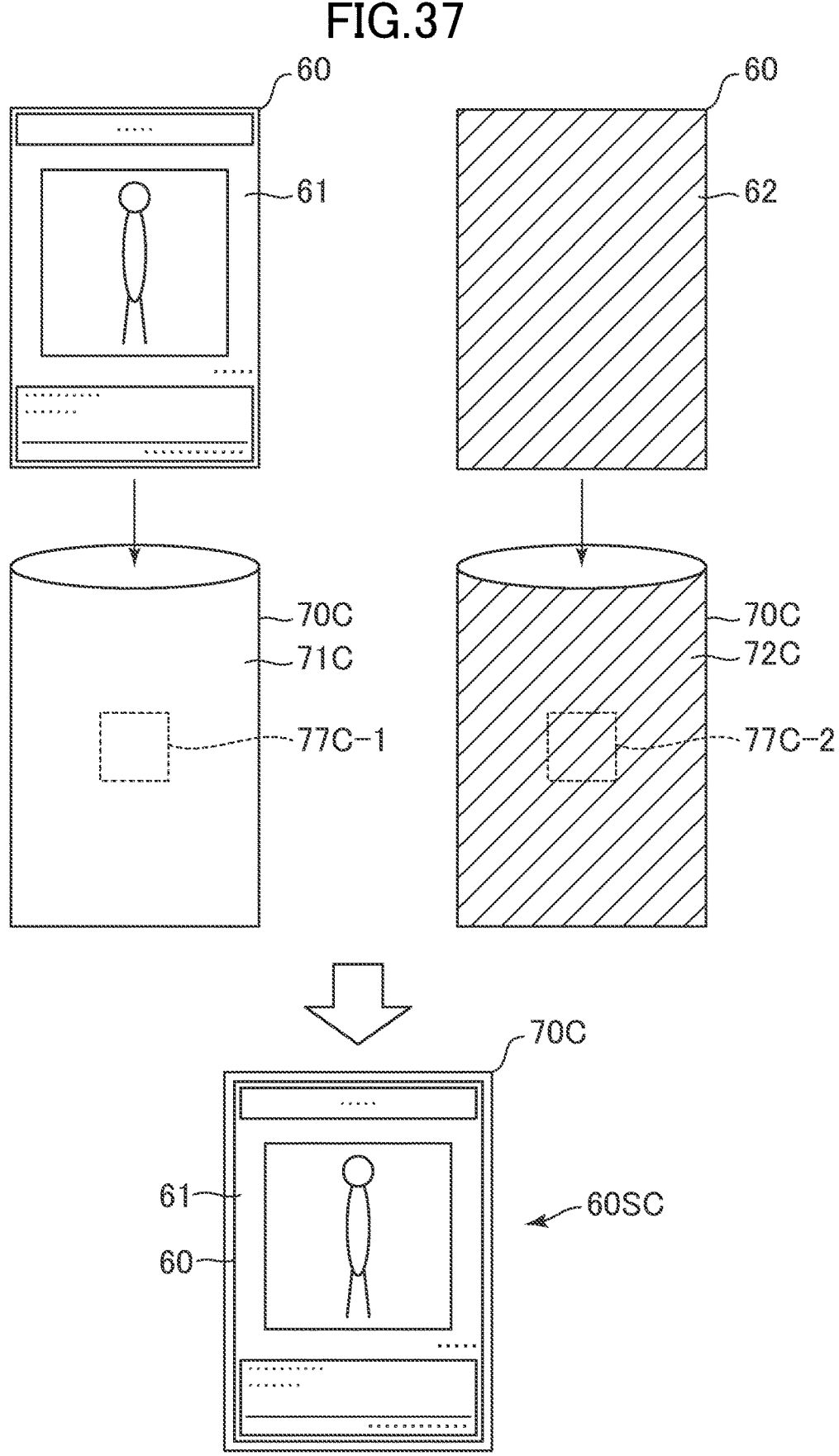
FIG. 37 is a diagram illustrating an example of a sleeve according to the fourth embodiment.

FIG. 37 is a diagram for explaining an example of the sleeve 70C of the fourth embodiment. Similarly to the sleeve 70 of the first embodiment, the front portion 71C of the sleeve 70C is transparent so that the front side 61 of the card 60 housed in the sleeve 70C is visible from outside the sleeve 70C. Further, similarly to the sleeve 70 of the first embodiment, the back portion 72C of the sleeve 70C is not transparent and the appearance of the back portion 72C visible to human eyes is the same for all sleeves 70C.

The front portion 71C of the sleeve 70C includes a first code 77C-1. The first code 77C-1 is printed with invisible ink on the outer surface of the front portion 71C. In FIG. 37, the first code 77C-1 is printed at the center of the front portion 71C, although the first code 77C-1 may be printed at a position other than the center. The first code 77C-1 is a code in which a sleeve ID of the sleeve 70C is embedded. That is, the first code 77C-1 is obtained by encoding the sleeve ID of the sleeve 70C in accordance with predetermined standards (rules). In other words, the first code 77C-1 is a code including a pattern generated based on the sleeve ID of the sleeve 70C (a pattern unique to the sleeve ID). The first code 77C-1 is, for example, a two-dimensional code (QR code (registered trademark)). The sleeve ID is information for uniquely identifying individual sleeves 70C.

The back portion 72C of the sleeve 70C includes a second cord 77C-2. The second code 77C-2 is printed with invisible ink on the outer surface of the back portion 72C. Similarly to the first code 77C-1, the second code 77C-2 is also a code in which a sleeve ID of the sleeve 70C is embedded. That is, the sleeve ID of the sleeve 70C is embedded in both the first code 77C-1 and the second code 77C-2.

Hereinafter, the first code 77C-1 and the second code 77C-2 may be collectively referred to as "code 77C." Further, in the following, the card 60 housed in the sleeve 70C is referred to as a "card 60SC" for convenience in order to distinguished from the card 60 alone. In other words, when the card 60 is housed in the sleeve 70C, the card 60 and the sleeve 70C are regarded as a single physical object and described as "card 60SC."

Similarly to the first capturing device 30 C-1, the second capturing device 30 C-2 is fixed above the game field F. The captured image of the second capturing device 30C-2 also includes at least zones Z1 to Z30 of the game field F.

For example, the second capturing device 30C-2 includes a light source that illuminates the game field F with invisible light and an image sensor, which captures light reflected by the game field F or the card 60SC placed on the game field F, converts the reflected light into an electronic image signal, and outputs the signal. The reflected light from which visible light (disturbance light) is removed is input to the image sensor. The second capturing device 30C-2 is used to read the first code 77C-1 or the second code 77C-2 of the card 60SC placed in the game field F.

The second capturing device 30C-2 and the information processing device 40 are connected via a cable according to a predetermined interface standard. Alternatively, the second capturing device 30C-2 and the information processing device 40 can communicate with each other over a communication network. The second capturing device 30 C-2 captures the game field F at predetermined intervals, and the captured image is supplied to the information processing device 40 via the cable or the communication network.

If the card 60SC is placed face up on the game field F, the captured image of the second capturing device 30C-2 includes the first code 77C-1 of the front portion 71C of the card 60SC, and the information (sleeve ID) embedded in the first code 77C-1 is obtained based on the captured image. If the card 60SC is placed face down on the game field F, the captured image of the second capturing device 30C-2 includes the second code 77C-2 of the back portion 72C of the card 60SC, and the information (sleeve ID) embedded in the second code 77C-2 is obtained based on the captured image.

[4-2. Processing] Processing executed by the system 1C according to the fourth embodiment will be described.

Figure 38:
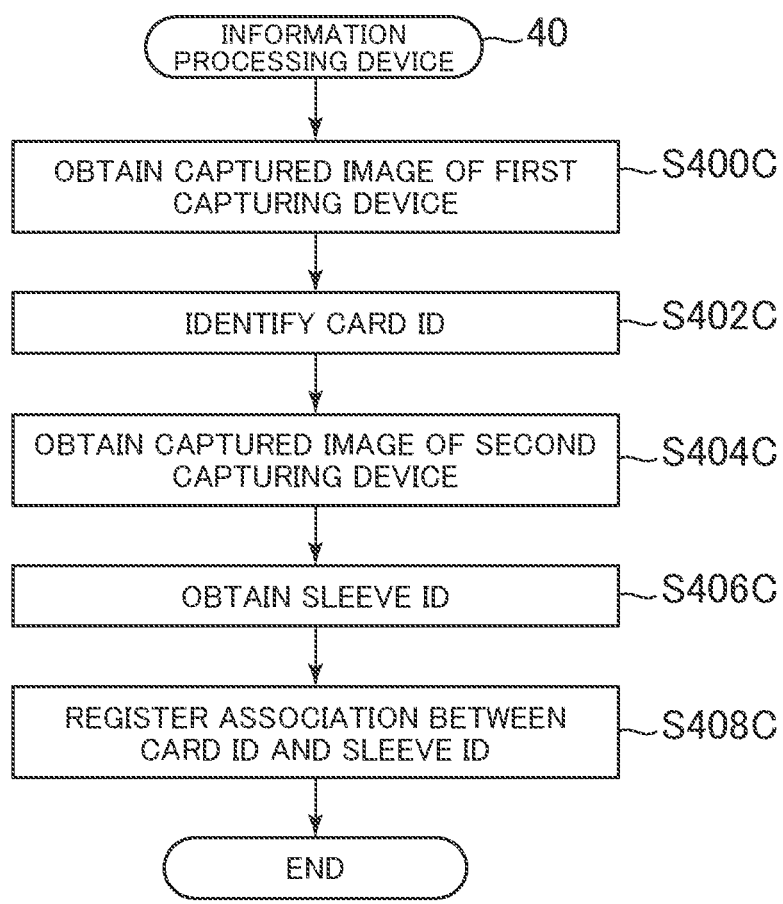
FIG. 38 is a diagram illustrating an example of association processing according to the fourth embodiment.

[4-2-1. Processing] FIG. 38 shows an example of the association processing of the fourth embodiment. For example, a player places a card 60SC from his or her deck in a predetermined zone Z in the game field F, such as the zone Z11, in a vertical and face up orientation. In this condition, the association processing shown in FIG. 38 is executed.

As shown in FIG. 38, the control unit 41 of the information processing device 40 obtains a captured image of the first capturing device 30C-1 (S400C). The control unit 41 then identifies a card ID of a card 60SC in the captured image (S402C). The steps S400C and S402C are the same as the steps S400 and S402 in FIG. 10.

The control unit 41 also obtains a captured image of the second capturing device 30C-2 (S404C). The control unit 41 then obtains a sleeve ID from a first code 72C-1 in the captured image (S406C). Subsequently, the control unit 41 registers the association between the card ID identified in step S402C and the sleeve ID obtained in step S406C in association data D1C (S408C).

Figure 39:
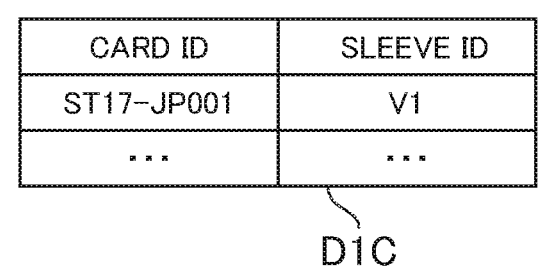

FIG. 39 shows an example of the association data D1C in the fourth embodiment. As shown in FIG. 39, the association data D1C includes "card ID" and "sleeve ID" fields. The "card ID" field is similar to the "card ID" field of the association data D1 in the first embodiment. The "sleeve ID" field is a field for registering a sleeve ID.

In step S408C, the control unit 41 adds a new record to the association data D1C and registers the card ID identified in step S402C and the sleeve ID obtained in step S406C in the "card ID" and "sleeve ID" fields of such a record.

After step S408C is executed, a completion notification indicating that the association processing is completed is output. The player removes the card 60SC placed in the zone Z and places the following card 60SC vertically and face up from his or her deck in the zone Z. In this state, the association processing shown in FIG. 38 is executed again.

The association processing shown in FIG. 38 is executed for each card 60SC included in the deck of the first player, and information of all the cards 60SC included in the deck of the first player is thus registered in the association data D1C. Further, the association processing shown in FIG. 38 is executed for each card 60SC included in the deck of the second player, and information of all the cards 60SC included in the deck of the second player is thus registered in the association data D1C.

Figure 40:
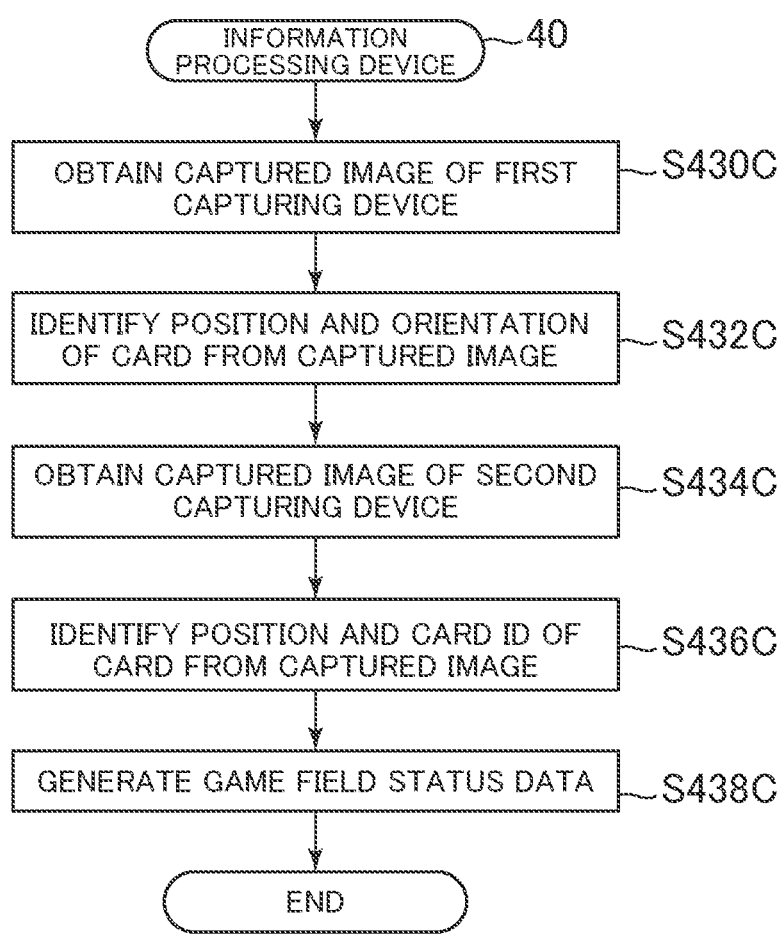
FIG. 40 is a diagram illustrating an example of identifying processing according to the fourth embodiment.

[4-2-2] FIG. 40 shows an example of identifying processing of the fourth embodiment. As shown in FIG. 40, the control unit 41 of the information processing device 40 obtains a captured image of first capturing device 30C-1 (S430C). The control unit 41 then identifies the position and orientation of the card 60SC from the captured image (S432C). The processing of steps S430C and S432C is the same as that of steps S430 and S432 in FIG. 13. The identification result in step S432C is registered in the first identification result data D2. The first identification result data D2 is the same as in the first embodiment.

After step S432C is executed, the control unit 41 obtains a captured image of the second capturing device 30C-2 (S434C), and the control unit 41 identifies the position and the card ID of the card 60SC from the captured image (S436C).

For example, the control unit 41 determines whether a code 77C (first code 77C-1 or second code 77C-2) is captured in each of areas A1 to A30 in the captured image. Further, the control unit 41 obtains a sleeve ID from the captured code 77C.

The identification result in step S436C is registered in the second identification result data D3C. FIG. 41 shows an example of the second identification result data D3C. As shown in FIG. 41, the second identification result data D3C includes "area ID" and "card ID" fields. The "area ID" field is the same as the "area ID" field of the first identification result data D2 in the first embodiment, and the "card ID" field is the same as the "card ID" field of the second identification result data D3 in the first embodiment.

For example, if the code 77C is captured in the area A10, the control unit 41 registers the sleeve ID obtained from the code 77C in the "card ID" field of the record of the area ID "A10."

After step S436C is executed, the control unit 41 generates game field status data D4 based on the first identification result data D2 and the second identification result data D3C (S438C). The game field status data D4 is the same as in the first embodiment.

In the situation shown in FIG. 7, the card set 600-1 (i.e., a plurality of cards 60SC piled face down) is placed in the zone Z7, although in the fourth embodiment, only the second code 77C-2 of the uppermost card 60SC of the card set 600-1 placed in the zone Z7 is captured in the captured image of the second capturing device 30 C-2. As such, only the card ID of the uppermost card 60SC in the card set 600-1 placed in the zone Z7 is registered in the record of the area ID "A7" of the second identification result data D3C and in the "card ID" field of the record of the zone ID "Z7" of the game field status data D4. The same applies to the zones Z1, Z15, and Z21.

[4-2-3] In the fourth embodiment as well, the display control processing shown in FIG. 18 and the processing shown in FIG. 19 are executed. However, in the parts PA-1 to PA-4 of the game field image G in the fourth embodiment, a numerical value indicating the number of cards 60SC included in the card sets 600-1 to 600-4 is not displayed.

[4-3. Effect] According to the fourth embodiment, if the card 60SC is placed face up on the game field F, the first code 77C-1 of the front portion 71C of the card 60SC is captured by the second capturing device 30 C-2 so that the information embedded in the first code 77C-1 can be read. As a result, the card ID of the card 60SC can be obtained. If the card 60SC is placed face down on the game field F, the second code 77C-2 of the back portion 72C of the card 60SC is captured by the second capturing device 30 C-2 so that the information embedded in the second code 77C-2 can be read. As a result, the card ID of the card 60SC can be obtained. As described above, according to the fourth embodiment, the card ID of the card 60SC can be obtained in either case where the card 60SC is placed face up or face down.

According to the fourth embodiment, even if the card 60SC is placed face down on the game field F (i.e., if the card 60SC is placed on the game field F with the front side 61 not visible), the information (e.g., name and performance of the card 60) written on the front side 61 of the card 60 can be identified based on the information held in the second code 77C-2 of the back portion 72C of the card 60SC.

According to the fourth embodiment, the code 77C is printed on the sleeve 70C, and thus, even if the code 77C is not printed on the card 60, the type and state of the card 60 can be identified based on the captured image of the second capturing device 30 C-2 by using the card 60 housed in the sleeve 70C. That is, the code 77C needs not be printed on the card 60 itself, and thus, for example, a pre-existing card 60 on which the code 77C is not printed can be used.

According to the fourth embodiment, the code 77C is printed in an invisible manner to human eyes, and thus the appearance of the card 60SC (card 60) viewed from the human can be prevented from being damaged. Further, in a case where the card 60SC is placed face down on the game field F, it is possible to prevent the opponent player from relying on the second code 77C-2 printed on the back portion 72C to find out the name or performance of the card 60, which should be impossible to grasp originally.

[4-4. Variation] A variation of the fourth embodiment will be described.

[4-4-1] For example, information indicating that the first code 77C-1 is a code printed on the front portion 71C may be embedded in the first code 77C-1 together with the sleeve ID. Further, information indicating that the second code 77C-2 is a code printed on the back portion 72C may be embedded in the second code 77C-2 together with the sleeve ID.

Specifically, "0", which indicates a table, may be embedded in the first code 77C-1 as a side flag together with the sleeve ID, and "1", which indicates a back side, may be embedded in the second code 77C-2 as a side flag together with the sleeve ID. The side flag may be obtained together with the sleeve ID from the code 77C captured in the captured image of the second capturing device 30 C-2.

In this manner, if the card 60SC is placed face up, "0" is obtained as a side flag from the first code 77C-1, and thus it is possible to identify that the card 60SC is placed face up. If the card 60SC is placed face down, "1" is obtained as a side flag from the second code 77C-2, and thus it is possible to identify that the card 60SC is placed face down. That is, the front and back sides of the card 60SC can be identified based on the captured image of the second capturing device 30C-2. In other words, the state of the card 60SC can be identified based on the captured image of the second capturing device 30C-2.

[4-4-2] For example, similarly to the first IC tag 73-1 and the second IC tag 73C-2 in the second embodiment, a plurality of codes 77C having a predetermined positional relationship may be printed on the back portion 72C. If the card 60SC is placed face down, the vertical and lateral orientations of the card 60SC may be identified based on the positional relationship of the plurality of codes 77C captured in the captured image of the second capturing device 30C-2.

Further, a plurality of codes 77C having a predetermined positional relationship may also be printed on the front portion 71C. If the card 60SC is placed face up, the vertical and lateral orientations of the card 60SC may be identified based on the positional relationship of the plurality of codes 77C captured in the captured image of the second capturing device 30 C-2.

In this manner, the vertical and lateral orientations of the card 60SC can be identified based on the captured image of the second capturing device 30C-2.

[4-4-3] Further, for example, the card ID of the card 60 may be embedded in the first code 77C-1 and the second code 77C-2.

Figure 42:
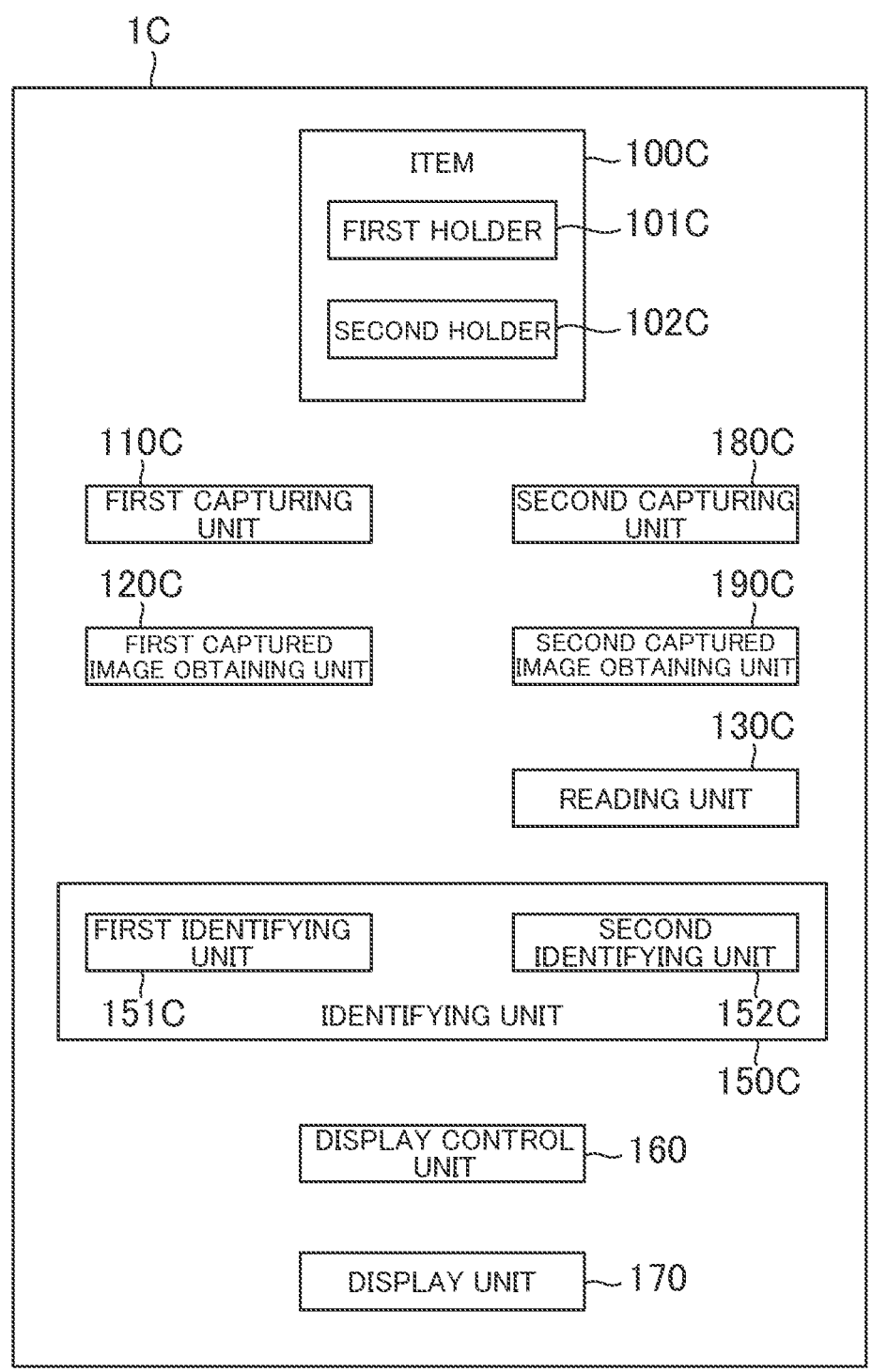
FIG. 42 is a functional block diagram showing functional elements of the system according to the fourth embodiment.

[4-5. Functional elements] FIG. 42 is a functional block diagram for showing functional elements included in the system 1C according to the fourth embodiment. In FIG. 42, the functional elements the same as those in the first embodiment, such as the display control unit 160 and the display unit 170, are denoted by the same reference numerals as those in FIG. 22, and descriptions of these functional elements will be omitted. The explanation of the wording that overlaps with the first embodiment is also omitted.

[4-5-1] First, an item 100C will be described. The item 100C is a physical object that is a playing medium housed in a case.

The playing medium has a surface having an appearance corresponding to a type of the playing medium (hereinafter, referred to as a "characteristic surface" for convenience). For example, the characteristic surface is a surface having an appearance unique to the type of playing medium. Further, for example, the characteristic surface is a surface on which texts or patterns corresponding to the type of playing medium are described.

The case includes a first surface portion and a second surface portion. The first surface portion and the second surface portion are the same as the first surface portion and the second surface portion described as being included in the case (item 100) in the first embodiment. When the playing medium is housed in the case, the first surface portion (the inner surface of first surface portion) is opposed to the characteristic surface of the playing medium. For example, all or a part of the first surface portion is formed of a transparent material, such as a transparent film, and the first surface portion is configured so that the characteristic surface of the playing medium housed in the case is visible from outside the case through the first surface portion.

The item 100C includes a first holder 101C and a second holder 102C. The first holder 101C is provided on the first surface portion of the case. The first holder 101C holds first identifying information for identifying the type or the state of the playing medium housed in the case.

For example, first identifying information is written in the first surface portion of the item 100C (case) in an invisible manner to human eyes. In this regard, the portion in which the first identifying information is described in the invisible manner corresponds to the first holder 101C. For example, the first identifying information is described in the first surface portion with invisible inks. For example, the first identifying information is described in the outer surface of the first surface portion.

The "first identifying information" is information used as a basis for identifying at least one of the type and the state of the playing medium housed in the case. In other words, "first identifying information" includes at least one of information as a basis for identifying the type of the playing medium housed in the case and information as a basis for identifying the state of the playing medium housed in the case.

For example, in a case where there is data associating a case ID for uniquely identifying a case with a playing medium ID of the playing medium housed in the case and the type of the playing medium housed in the case can be identified based on the case ID, "first identifying information" includes the case ID as "information as a basis for identifying the type of the playing medium housed in the case." For example, "first identifying information" may include a playing medium ID for uniquely identifying the type of the playing medium.

For example, the "first identifying information" may include first identification information for identifying the first holder 101C as "information as a basis for identifying the state of the playing medium housed in the case." For example, if the first identification information stored in the first holder 101C of the first surface portion is read, it is identified that the item 100C is placed on the surface such that the second surface portion is in contact with the surface. As such, the "first identifying information" may include the first identification information for identifying the first holder 101C as the "information as a basis for identifying the arrangement of the item 100C (whether the item 100C is placed on the surface such that the second surface portion is in contact with the surface)."

On the other hand, the second holder 102C is provided on the second surface portion of the case. The second holder 102C holds second identifying information for identifying the type or the state of the playing medium housed in the case.

For example, second identifying information is written in the second surface portion of the item 100C (case) in an invisible manner to human eyes. In this regard, the portion in which the second identifying information is described in the invisible manner corresponds to the second holder 102C. For example, the second identifying information is described in the second surface portion with invisible inks. For example, the second identifying information is written in the outer surface of the second surface portion.

Similarly to the first identifying information, the "second identifying information" is information used as a basis for identifying at least one of the type and the state of the playing medium housed in the case.

For example, the "second identifying information" includes a case ID or a playing medium ID of the playing medium housed in the case as "information as a basis for identifying the type of the playing medium housed in the case."

Further, for example, "the second identifying information" may include the second identification information for identifying the second holder 102C as "information as a basis for identifying the state of the item 100C." For example, if the second identification information stored in the second holder 102C of the second surface portion is read, it is identified that the item 100C is placed on the surface such that the first surface portion is in contact with the surface. As such, the "second identifying information" may include the second identification information for identifying the second holder 102C as the "information as a basis for identifying the arrangement of the item 100C (whether the item 100C is placed on the surface such that the first surface portion is in contact with the surface)."

In a case where each of the first identifying information and the second identifying information includes only "information as a basis for identifying the type of the playing medium housed in the case", the first identifying information and the second identifying information are the same information.

The first surface portion and the second surface portion of the case have such a positional relationship that, when the item 100C is placed on the surface such that the outer surface of the first surface portion is in contact with the surface, the reading unit 130C can read the second identifying information stored in the second holder 102C of the second surface portion, and when the item 100C is placed on the surface such that the outer surface of the second surface portion is in contact with the surface, the reading unit 130C can read the first identifying information stored in the first holder 101C of the first surface portion.

For example, the first surface portion and the second surface portion of the case have such a positional relationship that, when the item 100C is placed on the surface such that the outer surface of the first surface portion is in contact with the surface, the outer surface of the second surface portion is turned upwards and the second identifying information stored in the second holder 102C of the second surface portion can be read through the device installed above the surface, and when the item 100C is placed on the surface such that the outer surface of the second surface portion is in contact with the surface, the outer surface of the first surface portion is turned upwards and the first identifying information stored in the first holder 101C of the first surface portion can be read through the device installed above the surface.

In the example of the card game described above, the card 60SC corresponds to an example of the item 100C, the card 60 corresponds to an example of the "playing medium", and the sleeve 70C corresponds to an example of the "case." The front portion 71C and the back portion 72C of the sleeve 70C correspond to examples of "first surface portion" and "second surface portion."

Further, the first code 77C-1 and the second code 77C-2 correspond to examples of the first holder 101C and the second holder 102C. The sleeve ID corresponds to an example of "first identifying information" and "second identifying information." In the variation in which a side flag is embedded in each of the first code 77C-1 and the second code 77C-2, the side flag also corresponds to an example of "first identifying information" and "second identifying information."

[4-5-2] The first capturing unit 110C is implemented by the first capturing device 30 C-1. The first capturing unit 110C captures the surface on which the item 100C is placed. For example, the first capturing unit 110C captures the surface from above the surface. The first capturing unit 110C may be capable of capturing the entire surface, or capturing only an area of the surface on which the item 100C is likely to be placed. A first captured image obtaining unit 120C obtains a captured image of the first capturing unit 110C.

[4-5-3] The second capturing unit 180C is implemented by the second capturing device 30 C-2. The second capturing unit 180C captures the surface on which the item 100C is placed. The second capturing unit 180C includes a light source that illuminates the surface with invisible light and an image sensor that captures and outputs reflected light (invisible light) reflected by the item 100C placed on the surface and converts the light into an electronic image signal. For example, the second capturing unit 180C captures the surface from above the surface. The second capturing unit 180C may be capable of capturing the entire surface, or capturing only an area of the surface on which the item 100C is likely to be placed. A second captured image obtaining unit 190C obtains a captured image of the second capturing unit 180C.

[4-5-4] The reading unit 130C reads the first identifying information held in the first holder 101C. The reading unit 130C reads the first identifying information based on the captured image of the second capturing unit 180C. The reading unit 130C also reads the second identifying information held in the second holder 102C. The reading unit 130C reads the second identifying information based on the captured image of the second capturing unit 180C.

In a case where the item 100C is placed on the surface such that the first surface portion of the item 100C (case) is in contact with the surface, the reading unit 130C can read the second identifying information held by the second holder 102C of the second surface portion of the item 100C. In a case where the item 100C is placed on the surface such that the second surface portion of the item 100C (case) is in contact with the surface, the reading unit 130C can read the first identifying information held by the first holder 101C of the first surface portion of the item 100C.

In the example of the card game described above, when the card 60SC is placed face up, the first code 77C-1 is captured in the captured image of the second capturing device 30C-2, and thus the reading unit 130C reads the sleeve ID (or side flag) embedded in the first code 77C-1. When the card 60SC is placed face down, the second code 77C-2 is captured in the captured image of the second capturing device 30C-2, and thus the reading unit 130C reads the sleeve ID (or side flag) embedded in the second code 77C-2.

[4-5-5] The identifying unit 150C identifies the position and state of the item 100C based on the captured image of the first capturing unit 110C and the read result of the reading unit 130C. The identifying unit 150C includes a first identifying unit 151C and a second identifying unit 152C.

For example, the first identifying unit 151C identifies the position and orientation of the item 100C based on the captured image of the first capturing unit 110C. The second identifying unit 152C identifies the position and type of the item 100C based on the read result of the reading unit 130C. The second identifying unit 152C may identify the position, type, and orientation of the item 100C based on the read result of the reading unit 130C.

In the example of the card game described above, the first identifying unit 151C identifies the position, vertical and lateral orientations, and front and back sides of the card 60SC based on the captured image of the first capturing unit 110C. The second identifying unit 152C identifies the position and the card ID of the card 60SC based on the read result of the reading unit 130C.

[4-5-6] The second surface portion of the item 100C (case) may include a third holder provided so as to have a predetermined positional relationship with the second holder 102C.

That is, as in the variation described above, similarly to the first IC tag 73A-1 and second IC tag 73A-2 in the second embodiment, a plurality of codes 77C may be printed on the back portion 72C. In other words, in addition to the second code 77C-2, the back portion 72C may include a third code (an example of the third holder) having a predetermined positional relationship with the second code 77C-2.

In this case, similarly to the first IC tag 73A-1 and the second IC tag 73A-2 in the second embodiment, the second code 77C-2 and the third code are disposed at different positions on the outer surface of the back portion 72C. The second code 77C-2 and the third code are disposed at positions where the orientation of the card 60SC can be identified from the positional relationship between the second code 77C-2 and the third code when the card 60SC is placed face up on the game field.

In this manner, if the card 60SC is placed face down, the vertical and lateral orientations of the card 60SC can be identified based on the positional relationship between the second code 77C-2 and the third code. The same applies to the front portion 71C.

[5. Variation] The present invention is not limited to the first to fourth embodiments described above.

[5-1] For example, the second embodiment and the third embodiment may be combined. That is, one sleeve may be provided with an IC tag for identifying the vertical and lateral orientations in addition to the IC tag for identifying the front and back sides. For example, three or four or more IC tags may be provided in one sleeve. In this case, the capturing device 30 is not necessarily required to identify the position and state of the card 60 (position, vertical and lateral orientations, front and back sides).

For example, as the sleeve 70A shown in FIG. 23, first IC tag and the second IC tag corresponding to the first IC tag 73A-1 and the second IC tag 73A-2 may be provided on the inner surface of the back portion of the sleeve. Further, the blocking surface portion corresponding to only the lower half of the blocking surface portion 74B shown in FIG. 29 may also be provided in the sleeve, and the third IC tag corresponding to the first IC tag 73B-1 shown in FIG. 29 may be provided on the blocking surface portion corresponding to the first surface 75B shown in FIG. 29.

In this case, there is the blocking surface between the second IC tag and the third IC tag in the lower half of the sleeve, if the card 60 housed in the sleeve is placed face up on the game field F, the reader 20 receives a signal from the second IC tag and does not receive a signal from the third IC tag. If the card 60 housed in the sleeve is placed face down on the game field F, the reader 20 receives a signal from the third IC tag and does not receive a signal from the second IC tag. As a result, depending on whether a signal from the second IC tag or the third IC tag has been received by the reader 20, it is possible to determine whether the card 60 housed in the sleeve is placed face up or face down.

In this case, the first IC tags on the upper half of the sleeve is not affected by the blocking surface, and thus a signal from the first IC tags is received by the reader 20 whether the card 60 housed in the sleeve is placed face up or face down on the game field F. As a result, if the card 60 housed in the sleeve is placed face up, the signals from the first IC tag and the second IC tag are received by the reader 20, and the positions of the first IC tag and the second IC tag can be identified. As such, the vertical and lateral orientations of the card 60 can be identified from the positional relationship between the first IC tag and the second IC tag. If the card 60 housed in the sleeve is placed face down, the signals from the first IC tag and the third IC tag are received by the reader 20, and the positions of the first IC tag and the third IC tag can be identified. As such, the vertical and lateral orientations of the card 60 can be identified from the positional relationship between the first IC tag and the third IC tag.

In this manner, the sleeve having the three IC tags (first to third IC tags) as described above enables to identify the front and back sides of the card 60 placed on the game field F based on the read result of the reader 20, and identify the vertical and lateral orientations of the card 60 based on the read result of the reader 20 whether the card 60 is placed either face up or face down.

For example, the first surface 75B and the second surface 76B (or the inner surface of the back portion 72B of the sleeve 70B) of the blocking surface portion 74B in the sleeve 70B shown in FIG. 29 may respectively have IC tags corresponding to the first IC tag 73A-1 and the second IC tag 73A-2 shown in FIG. 23, and four IC tags may thereby be provided in one sleeve. In this manner as well, the front and back sides of the card 60 placed on the game field F can be identified based on the read result of the reader 20, and, whether the card 60 is placed either face up or face down, the vertical and lateral orientations of the card 60 can be identified based on the read result of the reader 20.

[5-2] For example, any one of first to third embodiments may be combined with the fourth embodiment. That is, the sleeve (or the card 60) may have both the IC tag and the invisible code.

[5-3] In the above, the card game has been mainly described, although the present invention may be applied to a game other than the card game. The present invention may be applied to a game performed using an item placed on a surface.

[6. Appendixes] From the foregoing, the present invention will be understood as described below, for example. In the following, the numerals given in accompanying drawings are shown in parentheses for the purpose of easier understanding, although the invention is not limited to the embodiments shown in the drawings.

A1) An identification system (1, 1A, 1B) according to an aspect of the present invention is for identifying a type and a state of an item (100, 100A, 100B) placed on a surface (e.g., game field F) in a game that is performed by using the item placed on the surface includes capturing means (110) that captures the surface on which the item is placed, reading unit (130) that reads information stored in an IC tag (73, 73A-1, 73A-1, 73B-1, 73B-2) provided to the item, and identifying unit (150, 150A, 150B) that identifies a type and a state of the item placed on the surface based on the captured image of the capturing means and the read result of the reading unit.

A12) An identification device (40) according to an aspect of the present invention is for identifying a type and a state of an item (100, 100A, 100B) placed on a surface (e.g., game field F) in a game that is performed by using the item placed on the surface includes captured image obtaining unit (120) for obtaining a captured image of the capturing means (110) that captures the surface on which the item is placed, read result obtaining unit (140) for obtaining a read result of the reading unit (130) that reads information stored in an IC tag (73, 73A-1, 73A-1, 73B-1, 73B-2) provided to the item, and identifying unit (150) that identifies a type and a state of the item placed on the surface based on the captured image of the capturing means and the read result of the reading unit.

A13) A program according to an aspect of the present invention is a program for causing a computer to function as an identification system (1) described in any one of A1) to A11) or an identification device described in (40).

A14) An identification method according to an aspect of the present invention is for identifying a type and a state of an item (100, 100A, 100B) placed on a surface (e.g., game field F) in a game that is performed by using the item placed on the surface includes a step (S430) of obtaining a captured image of the capturing means (110) that captures the surface on which the item is placed by a captured image obtaining unit (120), a step (S434) of obtaining a read result of the reading unit (130) that reads information stored in an IC tag (73, 73A-1, 73A-1, 73B-1, 73B-2) provided to the item by the read result obtaining unit (140), and identifying steps (S432, S436) of identifying a type and a state of the item placed on the surface based on the captured image of the capturing means and the read result of the reading unit by the identifying unit (150).

A15) An information storage medium according to an aspect of the present invention is an information storage medium that is readable by a computer that stores the program described in A13).

A2) In an aspect of the present invention, means (160) for displaying an object (e.g., PB-1, PB-2) corresponding to the type of the item identified by the identifying unit (150, 150A, 150B) on the display means (170) in a state corresponding to the state of the item identified by the identifying unit (150, 150A, 150B) may further be provided.

A3) In an aspect of the present invention, means (160) for displaying an object corresponding to the state of the item identified by the identifying unit (150, 150A, 150B) on the display means (170) according to a state corresponding to the state of the item identified by the identifying unit (150, 150A, 150B) may further be provided.

A4) In an aspect of the present invention, the item may include a description surface (e.g. 61), on which the information is described, and the identifying unit (150, 150A, 150B) may identify a type of the item placed on the surface based on the information read by the reading unit (130), and identify the information described on the description surface of the item placed on the surface based on such an identification result. A display control unit (160) may be also included for displaying, on the display means (170), a display according to the identified information described on the description surface of the item in a case where the item is placed on the surface such that the description surface faces the surface.

A5) In an aspect of the present invention, the display control unit (160) may include means for displaying an object (e.g., PB-1, PB-2) corresponding to the item placed on the surface on the display means (170), and when a predetermined operation relating to the object corresponding to the item is received in a state where the item is placed on the surface such that the description surface faces the surface, a display (e.g., PC) according to the information described on the description surface of the item may be displayed on the display means (170).

A6) In an aspect of the present invention, the identifying unit (150, 150A, 150B) may identify a type of a first item placed on the surface while a second item is piled on the first item based on the information read by the reading unit (130) from the IC tag of the first item.

A7) In one aspect of the present invention, the reading unit (130) may include a plurality of antennas (e.g., 20-10 to 20-30 or 21 and 22) that receive a signal from the IC tag and are disposed so as to respectively correspond to a plurality of positions on the surface, and the identifying unit (150) may identify a position of the item placed on the surface based on which of the plurality of antennas has received a signal from the IC tag of the item placed on the surface.

A8) In one aspect of the present invention, the item (100B) includes a first surface portion (e.g., 71B) and a second surface portion (e.g., 72B), the item includes a first IC tag (e.g., 73B-1), a second IC tag (e.g., 73B-2), and a preventing unit (103B) that prevents communication between the first IC tag and the reading unit (130) through the second surface portion and communication between the second IC tag and the reading unit through the first surface portion. The first IC tag is disposed between the first surface portion and the preventing unit, the second IC tag is disposed between the second surface portion and the preventing unit. The identifying unitidentifying unit (150B) may identify which of the first surface portion and the second surface portion faces the surface when the item is placed on the surface based on the read result of the information of the reading unit stored in the first IC tag or the second IC tag.

A9) In one aspect of the present invention, the item (100A) may include a first IC tag (e.g., 73A-1) and a second IC tag (e.g., 73A-2) that is provided so as to have a predetermined positional relationship with the first IC tag. The reading unit (130) may include a plurality of antennas (e.g., 21 and 22) that receive signals from the first IC tag and the second IC tag and are disposed so as to respectively correspond to a plurality of positions on the surface. The identifying unitidentifying unit (150A) may identify an orientation of the item placed on the surface based on which of the plurality of antennas has received the signals from the first IC tag and the second IC tag of the item placed on the surface.

A10) In one aspect of the present invention, the identifying unitidentifying unit (150, 150A, 150B) may include first identifying unitidentifying unit (151, 151A, 151B) that identifies a position and an orientation of the item placed on the surface based on the captured image of the capturing means (110) and second identifying unitidentifying unit (152, 152A, 152B) that identifies a position and a type of the item placed on the surface based on the read result of the reading unit (130), and identify a combination of an identification result of the first identifying unitidentifying unit and an identification result of the second identifying unitidentifying unit regarding the same item on the surface based on the position identified by the first identifying unitidentifying unit and the position identified by the second identifying unitidentifying unit.

A11) In one aspect of the present invention, the item may be a playing medium (e.g., 60) that is housed in a case (e.g., 70, 70A, 70B) provided with the IC tag or an object (e.g., 80) provided with the IC tag and the playing medium (e.g., 60) that are housed in the case.

B1) A display control system (1, 1A, 1B, 1C) according to another aspect of the present invention controls display means (170) to display a display (e.g., PC) relating to an item (100, 100A, 100B, 100C) placed on a surface (e.g., game field F) in a game that is performed by using the item placed on the surface, wherein the item includes a description surface (e.g., 61) on which information is described, and a holder (101, 101A, 102A, 101B, 102B) that holds identifying information (e.g., tag ID, card ID, sleeve ID) for identifying the information described on the description surface. The display control system includes reading unit (130) that reads the identifying information held in the holder of the item placed on the surface, the identifying unitidentifying unit (150, 150A, 150B, 150C) that identifies the information described on the description surface of the item placed on the surface based on the identifying information read by the reading unit, and display control unit (160) that displays, on the display means (170), a display (e.g., PC) according to the information that is identified by the identifying unitidentifying unit and described on the description surface of the item in a case where the item is placed on the surface such that the description surface faces the surface.

B7) A display control device (40 or 50) according to another aspect of the present invention controls display means (170) to display a display (e.g., PC) relating to an item (100, 100A, 100B, 100C) placed on a surface (e.g., game field F) in a game that is performed by using the item placed on the surface, wherein the item includes a description surface (e.g., 61) on which information is described, and a holder (101, 101A, 102A, 101B, 102B) that holds identifying information (e.g., tag ID, card ID, sleeve ID) for identifying the information described on the description surface. The display control device includes obtaining unit (140, 150C) for obtaining a reading result of reading unit (130, 130C) that reads the identifying information held in the holder of the item placed on the surface, the identifying unitidentifying unit (150, 150A, 150B, 150C) that identifies the information described on the description surface of the item placed on the surface based on the identifying information read by the reading unit, and display control unit (160) that displays, on the display means (170), a display (e.g., PC) according to the information that is identified by the identifying unitidentifying unit and described on the description surface of the item in a case where the item is placed on the surface such that the description surface faces the surface.

B8) A program according to another aspect of the present invention is a program for causing a computer to function as the display control system (1) described in any one of B1) to B6) or the display control device (40 or 50) described in B7).

B9) A display control method according to another aspect of the present invention controls display means (170) to display a display (e.g., PC) relating to an item (100, 100A, 100B, 100C) placed on a surface (e.g., game field) in a game that is performed by using the item placed on the surface, wherein the item includes a description surface (e.g., 61) on which information is described, and a holder (101, 101A, 102A, 101B, 102B, 101C, 102C) that holds identifying information (e.g., tag ID, card ID, sleeve ID) for identifying the information described on the description surface. The display control method includes obtaining step (S430, S434 or S430C, S436C) of obtaining a reading result of reading unit (130, 130C) that reads the identifying information held in the holder of the item placed on the surface by the obtaining unit (140, 150C), identifying step (S432, S436 or S432C, S436C) of identifying the information described on the description surface of the item placed on the surface by the identifying unit (150, 150A, 150B, 150C) based on the identifying information read by the reading unit, and display control step (S512) of controlling, by the display control unit (160), the display means (170) to display a display (e.g., PC) according to the information that is identified by the identifying unit and described on the description surface of the item in a case where the item is placed on the surface such that the description surface faces the surface.

B10) An information storage medium according to another aspect of the present invention is an information storage medium that is readable by a computer that stores the program described in B8).

B2) In an aspect of the present invention, the display control unit (160) may include means for displaying an object (e.g., PB-1, PB-2) corresponding to the item placed on the surface on the display means (170), and when a predetermined operation relating to the object corresponding to the item is received in a state where the item is placed on the surface such that the description surface faces the surface, a display (e.g., PC) according to the information described on the description surface of the item may be displayed on the display means.

B3) In one aspect of the present invention, the holder (101, 101A-1, 101A-2, 101B-1, 101B-2) may include an IC tag (73, 73A-1, 73A-2, 73B-1, 73B-2) that stores the identifying information, and the reading unit (130) may read the identifying information stored in the IC tag.

B4) In one aspect of the present invention, the item (100B, 100C) may include the description surface (e.g., 61) and a holding surface (e.g., 76B, 72C) provided with the holder (101B-2, 101C-2), and the reading unit (130, 130C) may read the identifying information held in the holder of the holding surface of the item placed on the surface such that the description surface faces the surface.

B5) One aspect of the present invention may include capturing means (110, 110C) for capturing the surface on which the item is placed. The identifying unit (150B, 150C) may include first identifying unit (151B, 151C) that identifies a position of the item placed on the surface and whether the item is placed on the surface such that the description surface faces the surface based on the captured image of the capturing means and second identifying unit (152B, 152C) that identifies a position of the item placed on the surface and the information described on the description surface based on the read result of the reading unit (130, 130C), and identify a combination of an identification result of the first identifying unit and an identification result of the second identifying unit regarding the same item on the surface based on the position identified by the first identifying unit and the position identified by the second identifying unit.

B6) In one aspect of the present invention, the item may be a playing medium (e.g., 60) that is housed in a case (e.g., 70, 70A, 70B, 70C) provided with the holder (101, 101A, 102A, 101B, 102B, 101C, 102C) or an object (e.g., 80) provided with the holder and the playing medium (e.g., 60) that are housed in the case.

C1) A case (e.g., 70, 70A, 70B) according to another aspect of the present invention is for housing a playing medium (e.g., 60) placed on a surface (e.g., game field) and used in a game that is performed by using the playing medium placed on the surface, and includes an IC tag (73, 73A-1, 73A-2, 73B-1, 73B-2) for holding identifying information (e.g., Tag ID or card ID) for identifying a type or a state of the playing medium that is housed in the case and placed on the surface.

C2) In one aspect of the present invention, the playing medium (e.g., 61) includes a description surface (e.g., 61) on which information is described, and the case (e.g., 70, 70A, 70B) includes a facing surface portion (e.g., 71, 71A, 71B) that faces the description surface when the playing medium is housed in the case and that is configured such that the description surface of the playing medium housed in the case is visible from outside the case through the facing surface portion, and the IC tag (73, 73A-1, 73A-2, 73B-1, 73B-2) is provided at a position other than the facing surface portion.

C3) In one aspect of the present invention, the case (e.g., 70, 70A, 70B) may include an opposite surface portion (e.g., 72, 72A, 72B) that is provided at a side opposite to the facing surface portion, and the IC tag (73, 73A-1, 73A-2, 73B-1, 73B-2) may be provided in the opposite surface portion.

C4) In one aspect of the present invention, the opposite surface portion (e.g., 72, 72A, 72B) may have a common appearance with opposite surface portions of other cases.

C5) One aspect of the present invention may include a first IC tag (e.g., 73A-1) and a second IC tag (e.g., 73A-2) that is provided so as to have a predetermined positional relationship with the first IC tag.

C6) One aspect of the present invention may include a first surface portion (e.g., 71B), a second surface portion (e.g., 72B), a first IC tag (e.g., 73B-1), a second IC tag (e.g., 73B-2), and a preventing unit (103B: e.g., 74B) that prevents communication between reading unit (130: e.g., 20-1 to 20-30) and the first IC tag through the second surface portion and communication between the reading unit (130) and the second IC tag through the first surface portion, the reading unit reading the identifying information stored in the first IC tag or the second IC tag. The first IC tag may be provided between the first surface portion and the preventing unit, and the second IC tag may be provided between the second surface portion and the preventing unit.

C7) A physical object (e.g., 80) according to another aspect of the present invention is housed in a case (e.g., 70, 70A, 70B) together with a playing medium (e.g., 60) placed on a surface (e.g., game field F) and used in a game that is performed by using the playing medium placed on the surface, and includes an IC tag (73, 73A-1, 73A-2, 73B-1, 73B-2) for holding identifying information for identifying a type or a state of the playing medium that is housed in the case and placed on the surface.

D1) A case (e.g., 70C) according to another aspect of the present invention for housing a playing medium (e.g., 60) used in a game that is performed by using the playing medium placed on a surface (e.g., game field F) includes a first surface portion (e.g., 71C), a second surface portion (e.g., 72C) that is different from the first surface portion, a first holder (e.g., 77C-1) that is provided to the first surface portion and holds first identifying information (e.g., sleeve ID or side flag) for identifying a type or a state of the playing medium housed in the case, and a second holder (e.g., 77C-2) that is provided to the second surface portion and holds second identifying information (e.g., sleeve ID or side flag) for identifying a type or a state of the playing medium housed in the case. In a case where the playing medium housed in the case is placed on the surface such that the first surface portion is in contact with the surface, reading unit (130C) can read the second identifying information held in the second holder of the second surface portion, and in a case where the playing medium housed in the case is placed on the surface such that the second surface portion is in contact with the surface, the reading unit can read the first identifying information held in the first holder of the first surface portion.

D2) In one aspect of the present invention, the first surface portion (e.g., 71C) includes, as the first holder (e.g., 73C-1), a portion in which the first identifying information is described in an invisible manner to human eyes, and the second surface portion (e.g., 72C) includes, as the second holder (e.g., 73C-2), a portion in which the second identifying information is described in the invisible manner to human eyes.

D3) In one aspect of the present invention, the second surface portion (e.g., 72C) may further include a third holder that is provided so as to have a predetermined positional relationship with the second holder (e.g., 73C-2).

D4) A case (e.g., 70C) according to another aspect of the present invention is for housing a playing medium (e.g., 60) placed on a surface (e.g., game field) and used in a game that is performed by using the playing medium placed on the surface. The playing medium includes a face (e.g., 61) having an appearance according to a type of the playing medium. The case includes a first surface portion (e.g., 71C) that faces the face when the playing medium is housed in the case, and is configured such that the face of the playing medium housed in the case is visible from outside the case through the first surface portion, a second surface portion (e.g., 72C) that is different from the first surface portion, and a holder (e.g., 77C-2) that is provided to the second surface portion and holds identifying information for identifying a type or a state of the playing medium housed in the case. In a case where the playing medium housed in the case is placed on the surface such that the first surface portion is in contact with the surface, reading unit (130) can read the identifying information held in the holder of the second surface portion.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A system for identifying information of an item placed on a surface in a game that is performed by using the item placed on the surface, the system comprising:
   the item; and
   an identification system in communication with the item;
   the item comprising:
   a description surface on which information is described; and
   a holder that holds identifying information for identifying the information described on the description surface,
   the identification system comprising:
   a capturing unit that captures the surface on which the item is placed on the surface;
   at least one processor;
   at least one memory device that stores a plurality of instructions, which when executed by the at least one processor, causes the at least one processor to:
   read the identifying information held in the holder of the item placed on the surface;
   identify the information described on the description surface of the item placed on the surface based on the read identifying information;
   identify a state of the item placed on the surface based on a captured image of the capturing unit and the read identifying information;
   identify a position and an orientation of the item placed on the surface based on the captured image;
   identify a position of the item placed on the surface based on the read identifying information; and
   identify a combination of an identification result identified based on the captured image and an identification result identified based on the read identifying information of a same item on the surface based on the position identified based on the captured image and the position identified based on the read identifying information.

2. The system according to claim 1, wherein
   the identification system further comprising a display,
   the instructions further cause the at least one processor to, in a case where the item is placed on the surface such that the description surface faces the surface, show, on the display, an image according to the identified information described on the description surface of the item.

3. The system according to claim 1, wherein the identification system further comprises a display, wherein the item includes the description surface and a holding surface provided with the holder; and the instructions cause the at least one processor to read the identifying information held in the holder of the holding surface of the item that is placed on the surface such that the description surface faces the surface.

4. The system according to claim 1, wherein
the instructions cause the at least one processor to identify information of a first item placed on the surface while a second item is piled on the first item based on the read identifying information held in the holder of the first item.

5. The system according to claim 1, wherein
the item is an object with a playing medium and a case provided with the holder, or an object provided with the holder and the playing medium that are housed in the case.

6. The system according to claim 1 further comprising a display, wherein
the instructions further cause the at least one processor to display an object corresponding to the identified information of the item on the display in a state corresponding to the identified state of the item.

7. The system according to claim 1 further comprising a display, wherein
the instructions further cause the at least one processor to display an object corresponding to the identified information of the item on a display in response to the identified state of the item.

8. The system according to claim 1, wherein
the holder includes an IC tag that stores the identifying information, and
the instructions cause the at least one processor to read the identifying information stored in the IC tag.

9. The system according to claim 8, further comprising a plurality of antennas that receive a signal from the IC tag and are disposed so as to respectively correspond to a plurality of positions on the surface, wherein
the instructions further cause the at least one processor to identify a position of the item placed on the surface based on which of the plurality of antennas has received a signal from the IC tag of the item placed on the surface.

10. The system according to claim 8, wherein
the item comprises:
a first IC tag; and
a second IC tag that is provided so as to have a predetermined positional relationship with the first IC tag, wherein
the identification system further comprises a plurality of antennas that receive signals from the first IC tag and the second IC tag and are disposed so as to respectively correspond to a plurality of positions on the surface, and
the instructions cause the at least one processor to identify an orientation of the item placed on the surface based on which of the plurality of antennas has received the signals from the first IC tag and the second IC tag of the item placed on the surface.

11. A system for identifying information of an item placed on a surface in a game that is performed by using the item placed on the surface, the system comprising:
the item; and
an identification system in communication with the item;
the item comprising:
a description surface on which information is described; and
a holder that holds identifying information for identifying the information described on the description surface,
the identification system comprising:
a capturing unit that captures the surface on which the item is placed on the surface; and
at least one processor;
at least one memory device that stores a plurality of instructions, which when executed by the at least one processor, causes the at least one processor to:
read the identifying information held in the holder of the item placed on the surface;
identify the information described on the description surface of the item placed on the surface based on the read identifying information;
identify a state of the item placed on the surface based on a captured image of the capturing unit and the read identifying information;
identify a position of the item placed on the surface and whether the item is placed on the surface such that the description surface faces the surface based on the captured image;
identify a position of the item placed on the surface and the information described on the description surface of the item based on the read result; and
identify a combination of an identification result based on the captured image and an identification result based on the read identifying information of a same item on the surface based on the position identified based on the captured image and the position identified based on the read identifying information.

12. A system for identifying information of an item placed on a surface in a game that is performed by using the item placed on the surface, the system comprising:
the item; and
an identification system in communication with the item;
the item comprises:
a description surface on which information is described;
a holder that holds identifying information for identifying the information described on the description surface,
wherein the holder includes an IC tag that stores the identifying information;
a first surface portion;
a second surface portion;
a first IC tag;
a second IC; and
a preventing unit that prevents communication between the first IC tag and a reading unit through the second surface portion and communication between the second IC tag and the reading unit through the first surface portion, the reading unit reading the identifying information stored in the first IC tag or the second IC tag, wherein
the first IC tag is disposed between the first surface portion and the preventing unit,
the second IC tag is disposed between the second surface portion and the preventing unit;
the identification system comprising:
at least one processor; and
at least one memory device that stores a plurality of instructions, which when executed by the at least one processor, causes the at least one processor to:
read the identifying information held in the holder of the item placed on the surface;

read the identifying information stored in the IC tag;
identify the information described on the description surface of the item placed on the surface based on the read identifying information; and
identify which of the first surface portion and the second surface portion faces the surface when the item is placed on the surface based on the read result of the information stored in the first IC tag or the second IC tag.

* * * * *